(12) United States Patent
Norikane et al.

(10) Patent No.: US 8,797,373 B2
(45) Date of Patent: Aug. 5, 2014

(54) LIQUID DROPLET EJECTING METHOD, LIQUID DROPLET EJECTION APPARATUS, INKJET RECORDING APPARATUS, PRODUCTION METHOD OF FINE PARTICLES, FINE PARTICLE PRODUCTION APPARATUS, AND TONER

(75) Inventors: Yoshihiro Norikane, Kanagawa (JP); Haruo Nakamura, Tokyo (JP); Masaru Ohgaki, Kanagawa (JP); Yuko Sekiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/635,747

(22) PCT Filed: Mar. 16, 2011

(86) PCT No.: PCT/JP2011/057075
§ 371 (c)(1),
(2), (4) Date: Sep. 18, 2012

(87) PCT Pub. No.: WO2011/115303
PCT Pub. Date: Sep. 22, 2011

(65) Prior Publication Data
US 2013/0010035 A1    Jan. 10, 2013

(30) Foreign Application Priority Data

Mar. 18, 2010  (JP) .................................. 2010-063089
Mar. 18, 2010  (JP) .................................. 2010-063302
Nov. 9, 2010   (JP) .................................. 2010-250765

(51) Int. Cl.
*B41J 2/085*  (2006.01)
*B41J 2/385*  (2006.01)
*G03G 9/08*   (2006.01)

(52) U.S. Cl.
USPC ............................................. 347/158; 347/76

(58) Field of Classification Search
None
See application file for complete search history.

(56) References Cited

U.S. PATENT DOCUMENTS

| 4,746,929 A | 5/1988 | Lin et al. |
| 4,999,647 A | 3/1991 | Wood et al. |
| 5,063,393 A | 11/1991 | Clark et al. |

(Continued)

FOREIGN PATENT DOCUMENTS

| EP | 1013422 | 6/2000 |
| JP | 62-105636 | 5/1987 |

(Continued)

OTHER PUBLICATIONS

U.S. Appl. No. 06/794,729, filed Nov. 4, 1985, Culpepper, et al.

(Continued)

*Primary Examiner* — Matthew Luu
*Assistant Examiner* — Erica Lin
(74) *Attorney, Agent, or Firm* — Oblon, Spivak, McClelland, Maier & Neustadt, L.L.P.

(57) ABSTRACT

A liquid droplet ejecting method for ejecting a liquid from at least one ejection hole to form the liquid into liquid droplets, the method including: applying a vibration to the liquid in a liquid column resonance-generating liquid chamber, in which the ejection hole is formed, to form a standing wave through liquid column resonance, and ejecting the liquid from the ejection hole, which is formed in a region corresponding to an antinode of the standing wave, to form the liquid into liquid droplets.

12 Claims, 30 Drawing Sheets

(56) References Cited

U.S. PATENT DOCUMENTS

| | | | |
|---|---|---|---|
| 5,202,659 A | 4/1993 | DeBonte et al. | |
| 5,361,084 A | 11/1994 | Paton et al. | |
| 5,658,847 A | 8/1997 | Goss et al. | |
| 6,406,747 B1 | 6/2002 | Biegelsen et al. | |
| 6,422,684 B1 | 7/2002 | Ladabaum et al. | |
| 6,460,972 B1 | 10/2002 | Trauernicht et al. | |
| 7,946,683 B2 * | 5/2011 | Gao et al. | 347/48 |
| 2004/0146055 A1 | 7/2004 | Trauernicht et al. | |
| 2006/0007272 A1 | 1/2006 | Ogata et al. | |
| 2007/0146441 A1 | 6/2007 | Miyasaka et al. | |
| 2007/0200882 A1 | 8/2007 | Mataki | |
| 2008/0063971 A1 | 3/2008 | Watanabe et al. | |
| 2008/0227011 A1 | 9/2008 | Kuramoto et al. | |
| 2008/0241727 A1 | 10/2008 | Norikane et al. | |
| 2008/0248416 A1 | 10/2008 | Norikane et al. | |
| 2008/0286679 A1 | 11/2008 | Norikane et al. | |
| 2008/0286680 A1 | 11/2008 | Norikane et al. | |
| 2008/0292985 A1 | 11/2008 | Suzuki et al. | |
| 2009/0073207 A1 | 3/2009 | Takeuchi | |
| 2009/0085986 A1 | 4/2009 | Matsumoto | |
| 2009/0117486 A1 | 5/2009 | Watanabe et al. | |
| 2009/0170018 A1 | 7/2009 | Kuramoto et al. | |
| 2009/0226837 A1 | 9/2009 | Norikane et al. | |
| 2009/0239170 A1 | 9/2009 | Honda et al. | |
| 2009/0317735 A1 | 12/2009 | Ohtani et al. | |
| 2009/0317738 A1 | 12/2009 | Honda et al. | |
| 2009/0325100 A1 | 12/2009 | Watanabe et al. | |
| 2010/0003613 A1 | 1/2010 | Honda et al. | |
| 2010/0021209 A1 | 1/2010 | Watanabe et al. | |
| 2010/0055600 A1 | 3/2010 | Norikane et al. | |
| 2010/0104970 A1 | 4/2010 | Norikane et al. | |
| 2010/0227267 A1 | 9/2010 | Shitara et al. | |
| 2010/0297548 A1 | 11/2010 | Honda et al. | |
| 2010/0310982 A1 | 12/2010 | Ohtani et al. | |
| 2011/0007116 A1 | 1/2011 | Ohgaki et al. | |
| 2011/0014565 A1 | 1/2011 | Norikane et al. | |

FOREIGN PATENT DOCUMENTS

| | | |
|---|---|---|
| JP | 05-254117 | 10/1993 |
| JP | 06-055513 | 7/1994 |
| JP | 2800065 | 7/1998 |
| JP | 2001-088298 | 4/2001 |
| JP | 3207420 | 7/2001 |
| JP | 3234073 | 9/2001 |
| JP | 2003-516252 | 5/2003 |
| JP | 2003-182081 | 7/2003 |
| JP | 2003-207951 | 7/2003 |
| JP | 3569282 | 6/2004 |
| JP | 3786034 | 6/2006 |
| JP | 2007-090647 | 4/2007 |
| JP | 2007-168343 | 7/2007 |
| JP | 2007-199463 | 8/2007 |
| JP | 2007-223231 | 9/2007 |
| JP | 2009-061011 | 3/2009 |
| JP | 2009-090649 | 4/2009 |
| JP | 2009-113255 | 5/2009 |
| JP | 2009-190415 | 8/2009 |
| JP | 4355204 | 8/2009 |

OTHER PUBLICATIONS

International Search Report Issued May 17, 2011 in International Patent Application No. PCT/JP2011/057075 Filed Mar. 16, 2011.

* cited by examiner

— Distribution of Speed
----- Distribution of Pressure

— Distribution of Speed
----- Distribution of Pressure

— Distribution of Speed
----- Distribution of Pressure

— Distribution of Speed
----- Distribution of Pressure

FIG. 7E
— Distribution of Speed
----- Distribution of Pressure
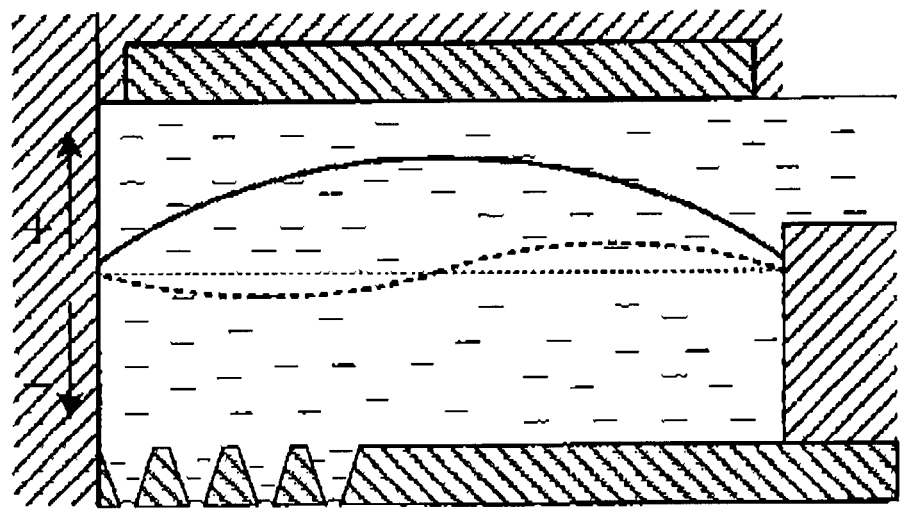
o   o   o   o
FIG. 8A                FIG. 8B
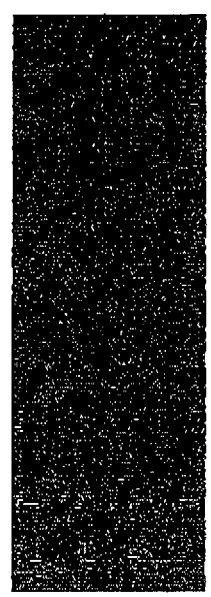   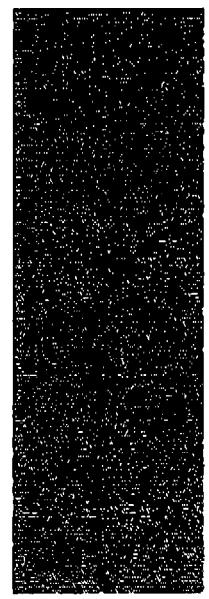

Time [μs]

Voltage applied [v]

LIQUID DROPLET EJECTING METHOD, LIQUID DROPLET EJECTION APPARATUS, INKJET RECORDING APPARATUS, PRODUCTION METHOD OF FINE PARTICLES, FINE PARTICLE PRODUCTION APPARATUS, AND TONER

TECHNICAL FIELD

The present invention relates to a liquid droplet ejecting method, a liquid droplet ejection apparatus, and an inkjet recording apparatus. The present invention also relates to a method for producing fine particles having uniform particle diameters by a spray granulation method, and a fine particle production apparatus. Further, the present invention relates to a toner produced by the production method of fine particles or the fine particle production apparatus.

BACKGROUND ART

Firstly, background art relating to an inkjet recording apparatus using a liquid droplet ejecting method, and a liquid droplet ejection apparatus will be described below.

Inkjet recording apparatuses in current use are allowed to undergo displacement of a piezoelectric element etc. provided in a liquid chamber in an ink head to eject an ink in the liquid chamber from ink nozzles, in the form of ink droplets, and to adhere onto recording paper, thereby enabling printing on the recording paper. Such inkjet recording apparatuses are widely prevalent because of their cheap costs and compactness. Most of the inkjet recording apparatuses use Helmholtz resonance vibration to eject liquid droplets, as described in PTL 1. In an inkjet head using the Helmholtz resonance vibration, Helmholtz resonance vibration is excited, by a piezoelectric body, in a pressure generation chamber constituting the head so as to eject liquid droplets from ejection holes. It is known that a resonance frequency of Helmholtz resonance vibration is set in view of a fluid compliance attributable to the compressibility of an ink in a pressure generation chamber, a rigidity compliance of materials themselves for an elastic plate and an ejection hole plate each forming the pressure generation chamber, and inertance in opening of ejection holes and an ink supply port. A resonance frequency f of Helmholtz resonance vibration in the pressure generation chamber is represented by the following Equation 1. In Equation 1, a fluid compliance attributable to the compressibility of an ink in a pressure generation chamber is represented by Ci, a rigidity compliance of materials themselves for an elastic plate and an ejection hole plate each forming the pressure generation chamber is represented by Cv, inertance in an opening of an ejection hole is represented by Mn, and inertance in an ink supply port is represented by MS.

$$f=1/(2\pi)\times\sqrt{\{(Mn+MS)/(Mn\times MS)(Ci+Cv)\}} \quad \text{Equation A}$$

Further, in a liquid droplet ejection method using Helmholtz resonance vibration, frequency components of the resonance vibration represented by Equation A are controlled to thereby control ejection of liquid droplets. That is, the resonance frequency f determined by Equation A is the maximum drive frequency of a piezoelectric body, and frequencies are controlled based on the maximum drive frequency to thereby control the operation of liquid droplet ejection.

Furthermore, besides the liquid droplet ejection, method using Helmholtz resonance vibration, a liquid droplet ejecting method proposed in PTL 2 is a liquid droplet ejecting method in which an ink in a liquid column resonance-generating liquid chamber is ejected from ejection holes in a longitudinal direction of the liquid column resonance-generating liquid chamber, by utilizing a standing wave which generates in the longitudinal direction of the liquid column resonance-generating liquid chamber.

However, according to the liquid droplet ejecting method disclosed in PTL 1 using Helmholtz resonance vibration, in order to a desired resonance frequency, the accuracy of the fluid compliance for pressure generation chamber and the rigidity compliance must be increased. Unfavorably, the processing technique for pressure generation chamber has a limitation on accuracy, and it is difficult to obtain a desired resonance frequency. In addition, it is difficult to set the resonance frequency high, and thus the liquid droplet ejecting method has a problem that the liquid droplet diameter inversely proportional to the resonance frequency cannot be made small. Further, the liquid droplet ejecting method disclosed in PTL 2 has a limit to eject microscopic liquid droplets using a high frequency, because the ejection holes are disposed in the direction of propagation of the standing wave.

Next, the following describes background art relating to production methods of fine particles and fine particles using a fine particle production apparatus, in particular, toners.

Firstly, a pulverization method, which is one of toner production methods, is described by way of conventional resin fine particles. The pulverization method is a typical toner production method that has been conventionally employed, and a method in which a toner composition is melt-kneaded by a two-roll or a biaxial extruder, and the melt-kneaded product is cooled, followed by a pulverization treatment of coarse powder, a pulverization treatment of fine powder and a classification treatment, when required, a mixing treatment of external additives such as a fluidizer by a HENSCHEL MIXER, etc. In the pulverization treatment of coarse powder, a ROTOPLEX or pulverizer can be used. In the pulverization treatment of fine powder, a jet mill or turbo mill can be used. In the classification treatment, known production apparatuses such as an ELBOWJET and a variety of air classifiers can be used.

There is a spray method as one of the conventional toner production methods other than the above-mentioned pulverization method. This spray method is a method in which a toner composition is formed into liquid droplets in a vapor phase by using a single-fluid ejection hole (pressurization type ejection hole) sprayer which sprays a liquid from ejection holes by application of pressure, a multiple-fluid spray ejection hole sprayer which sprays a liquid and compressed gases in a mixed form, a rotational disc type sprayer which forms a liquid into liquid droplets by a centrifugal force using a rotating disc, or the like. In the spray method, as a spray-dry system configured to simultaneously perform spraying and drying, a commercially available device can be used, however, when an ink cannot be sufficiently dried, secondary drying such as fluidized bed drying is performed, and when necessary, mixing of external additives such as a fluidizer is performed using a HENSCHEL MIXER etc.

Further, as a conventional toner production method other than the pulverization method, there is a jet granulation method. In the jet granulation method, liquid droplets are ejected from ejection holes each having a diameter as small as the diameter of toner using a vibration generating unit, although a part of forming a liquid into droplets and solidifying the droplets is the same as in the spray method. Conventionally, some jet granulation methods have been proposed. As one of the jet granulation methods, PTL 3 proposed a toner production method, in which the inside of a pressurization chamber is pressurized to generate a liquid column from nozzles, the liquid column is broken into droplets by a weak ultrasonic vibration, and the droplets are dried and solidified to produce a toner, and a toner production apparatus therefor. Such a toner production apparatus generally includes a toner composition liquid-housing container to house a toner composition liquid to be supplied to a pressurization chamber in a liquid droplet jetting unit, and the toner composition liquid-housing container includes a stirring member which stirs the toner composition liquid housed therein to generate a flow. By generating a flow in the toner composition liquid-housing container by the stirring member, respective materials can maintain a uniformly dispersed state in the toner composition liquid, and it is possible to prevent the respective materials from being dispersed with nonuniformity in the toner composition liquid. There is disclosed a toner production apparatus in which a toner composition liquid is pressurized to form a liquid column from through holes, a weak vibration is applied to the liquid column by a vibration generating unit to excite a Rayleigh fission, thereby forming uniform liquid droplets, followed by solidifying the liquid droplets, to thereby produce toner base particles. In the method employing Rayleigh fission, a liquid is pressurized to be ejected, and thus the method has an advantage in that the vibration generating unit is only required to generate a weak vibration, and a toner composition liquid can be formed into droplets with a low voltage.

However, the toner production method proposed in PTL3 utilizes Rayleigh fission, and thus when a toner having a small diameter is produced, in order to form liquid droplets having a particle size of about two-times the inner diameter of the ejection hole, the inner diameter of the ejection hole should be made small. Further, this toner production method has a problem that the liquid is pressurized in one direction, and toner components are clogged inside the nozzle depending on the composition of the toner.

In a head part disclosed in PTL4 as a still another example of a toner production method using the jet granulation method, pulse-pressurization is performed to uniformly pressurize the entire system of toner materials stored in a toner material reservoir part for storing the toner materials, and thereby the toner materials are ejected from ejection holes. Hereinbelow, the principles of ejection of liquid droplets disclosed in PTL4 are outlined with reference to FIGS. 32A to 32E. In FIGS. 32A to 32E, pressure values inside a material reservoir part (a) are described. In the liquid droplet ejecting method disclosed in PTL4, a toner composition liquid is effected to repeatedly behave three states described below to thereby form liquid droplets intermittently. As a first state, a head part is in a state where no ejection signal is input, that is, as illustrated in FIG. 32A, in a state where no deformation occurs in a piezoelectric body (which may be referred to as piezoelectric element) (b), causing no volume change in a material reservoir part (a), and a material liquid is not ejected from an ejection hole. Next, in a second state, an ejection signal is input, the piezoelectric body (b) undergoes displacement to the inside of the material reservoir part (a), and the material reservoir part (a) decreases as illustrated in FIGS. 32B and 32C. At this time, the pressure inside the material reservoir part (a) is momentarily increased with uniformity, and the material liquid is ejected from the ejection hole. At this time, a flow of the materials is generated from the material reservoir part (a) to the side of a material housing part (not illustrated). Next, as a third state, after completion of the first time ejection of the materials, as illustrated in FIGS. 32D and 32E, application of the voltage is stopped, and the piezoelectric element (b) restores its substantially original shape. At this time, a negative pressure works in the material liquid, and the material liquid in an amount commensurate with an ejection amount is fed from a material housing part called a feeder for housing the material liquid to the material reservoir part (a).

However, since the liquid ejection method disclosed in PTL 4 is a method of momentarily pressurizing the material liquid stored in the material reservoir part (a) to intermittently eject the material liquid, there is a need to feed the material liquid reduced by a portion ejected in the third state to the material reservoir part (a) to restore the first state again where the material liquid is adequately stored. In view of the time spared for the third state and the overall production process time, a time loss occurs, and the liquid ejection method has a problem that the toner production efficiency corresponding to the time loss is reduced. Further, in the method disclosed in PTL4, generally, liquid droplets large in size are inconveniently formed, and thus, in order to obtain a dry-process toner particle, the ejection part must be made to have a small diameter or the materials must be diluted. However, when the ejection part is reduced in size, inevitably, the probability of causing clogging of a solid dispersion of a pigment which is essentially added as a toner constituent element and a releasing agent etc. added as required dramatically increases, causing a problem with production stability. In addition, when the toner material is diluted, the energy required for drying and solidifying the resulting diluent increases, which also greatly decreases the production efficiency. Furthermore, a decrease of the production efficiency prolongs the time for storing the material liquid in the material reservoir part, and a retention of the material liquid occurs, which may consequently cause sticking of the toner material fractions in a long-term production period.

CITATION LIST

Patent Literature

PTL 1 Japanese Patent (JP-B) No. 3569282
PTL 2 Japanese Patent (JP-B) No. 3234073
PTL 3 Japanese Patent Application Laid-Open (JP-A) No. 2007-199463
PTL 4 Japanese Patent (JP-B) No. 3786034

SUMMARY OF INVENTION

Technical Problem

The present invention aims to solve the above-mentioned conventional problems and achieve the following object. That is, an object of the present invention is to provide a liquid droplet ejecting method and a liquid droplet ejection apparatus each of which enables setting a desired resonance frequency, irrespective of fluid compliance of a liquid chamber and rigidity compliance of components such as an ejection hole plate, and producing extremely fine particle liquid droplets, and also provide an inkjet recording apparatus capable of achieving high-density printing.

The present invention aims to solve the above-mentioned conventional problems and achieve the following object. That is, an object of the present invention is to provide a production method of fine particles and a fine particle production apparatus each of which enables achieving continuous ejection of liquid owing to its ability of continuous driving, thereby which assures extremely high productivity and enables uniformly and stably producing extremely fine liquid droplets, and to provide a toner.

Solution to Problem

Means for solving the above-mentioned problems are as follows:
<1> A liquid droplet ejecting method for ejecting a liquid from at least one ejection hole to form the liquid into liquid droplets, the method including:
applying a vibration to the liquid in a liquid column resonance-generating liquid chamber, in which the ejection hole is formed, to form a standing wave through liquid column resonance, and
ejecting the liquid from the ejection hole, which is formed in a region corresponding to an antinode of the standing wave, to thereby form the liquid into the liquid droplets.

<2> The liquid droplet ejecting method according to <1>, wherein the ejection hole is formed in plurality with respect to at least one region which is the region corresponding to the antinode.

<3> The liquid droplet ejecting method according to one of <1> and <2>, wherein the ejection hole is formed in plurality for each of the liquid column resonance-generating liquid chambers.

<4> The liquid droplet ejecting method according to any one of <1> to <3>, wherein at least part of both ends of the liquid column resonance-generating liquid chamber in a longitudinal direction thereof is provided with a reflection wall surface.

<5> The liquid droplet ejecting method according to any one of <1> to <4>, wherein a vibration having a frequency which satisfies Equation (1) below is applied to the liquid, $$f = N \times c/(4L) \qquad \text{Expression (1)}$$

where L represents a length of the liquid column resonance-generating liquid chamber in a longitudinal direction thereof, c represents a sound speed of the liquid, and N is a natural number.

<6> The liquid droplet ejecting method according to any one of <1> to <4>, wherein a vibration having a frequency f which satisfies Expression (2) below is applied to the liquid, $$N \times c/(4L) \leq f \leq N \times c/(4Le) \qquad \text{Expression (2)}$$

where L represents a length of the liquid column resonance-generating liquid chamber in a longitudinal direction thereof, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number.

<7> The liquid droplet ejecting method according to <6>, wherein the Le and L satisfy Le/L>0.6.

<8> The liquid droplet ejecting method according to any one of <1> to <4>, wherein a vibration having a frequency f which satisfies Expression (3) below is applied to the liquid, $$N \times c/(4L) \leq f \leq (N+1) \times c/(4Le) \qquad \text{Expression (3)}$$

where L represents a length of the liquid column resonance-generating liquid chamber in a longitudinal direction thereof, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number.

<9> The liquid droplet ejecting method according to any one of <1> to <8>, wherein the vibration is a high frequency vibration having a frequency of 300 kHz or higher.

<10> The liquid droplet ejecting method according to any one of <5> to <8>, wherein a drive signal from a vibration generating unit excites the vibration generating unit by pulse groups which is primarily composed of a liquid column resonance frequency depending on the length of the liquid column resonance-generating liquid chamber in the longitudinal direction thereof.

<11> The liquid droplet ejecting method according to <10>, wherein the pulse groups are divided into three pulse parts of a preparatory pressure generating pulse part, a drive main pulse part, and a residual vibration undoing pulse part, wherein the preparatory pressure generating pulse part is present at a leading edge of the pulse groups and excites the liquid in the liquid column resonance-generating liquid chamber to allow the liquid to remain in a state of not flying the liquid droplets, the drive main pulse part is an application pulse which follows the preparatory generating pulse part and ejects the liquid from the ejection hole, and the residual vibration undoing pulse part is an application pulse immediately after the drive main pulse part and includes a frequency component having a phase opposite to that of a main frequency component of the drive main pulse part.

<12> A liquid droplet ejection apparatus which ejects a liquid from at least one ejection hole to form the liquid into liquid droplets, the apparatus including:

a liquid column resonance-generating liquid chamber in a part of which the ejection hole is formed, and a vibration generating unit configured to apply a vibration to the liquid, wherein the vibration is applied to the liquid in the liquid column resonance-generating liquid chamber by the vibration generating unit to form a standing wave through liquid column resonance, and the liquid is ejected from the ejection hole corresponding to an antinode of the standing wave, <13> An inkjet recording apparatus, wherein the inkjet recording apparatus uses the liquid droplet ejecting method according to any one of <1> to <11>, or includes the liquid droplet ejection apparatus according to <12>.

<14> A production method of fine particles, the production method including:

ejecting a liquid from at least one ejection hole to form the liquid into liquid droplets, and solidifying the liquid droplets, wherein the liquid contains a fine particle forming component which is dissolved or dispersed in a solvent, or which is fused in the solvent, and wherein the ejecting the liquid droplets is applying a vibration to the liquid in a liquid column resonance-generating liquid chamber, in which the ejection hole is formed, to form a standing wave through liquid column resonance, and ejecting the liquid from the ejection hole which is formed in a region corresponding to an antinode of the standing wave to thereby form the liquid into the liquid droplets.

<15> The production method of fine particles according to <14>, wherein the fine particle forming component is a resin or a resin composition.

<16> The production method of fine particles according to one of <14> and <15>, wherein the ejection hole is formed in plurality with respect to at least one region, which is the region corresponding to the antinode.

<17> The production method of fine particles according to any one of <14> to <16>, wherein the ejection hole is formed in plurality for each of the liquid column resonance-generating liquid chambers.

<18> The production method of fine particles according to any one of <14> to <17>, wherein at least part of both ends of the liquid column resonance-generating liquid chamber in a longitudinal direction thereof is provided with a reflection wall surface.

<19> The production method of fine particles according to any one of <14> to <18>, wherein a vibration having a frequency which satisfies Equation (1) below is applied to the liquid, $$f = N \times c/(4L) \qquad \text{Expression (1)}$$

where L represents a length of the liquid column resonance-generating liquid chamber in a longitudinal direction thereof, c represents a sound speed of the liquid, and N is a natural number.

<20> The production method of fine particles according to any one of <14> to <18>, wherein a vibration having a frequency f which satisfies Expression (2) below is applied to the liquid, $$N \times c/(4L) \le f \le N \times c/(4Le) \qquad \text{Expression (2)}$$

where L represents a length of the liquid column resonance-generating liquid chamber in a longitudinal direction thereof, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number.

<21> The production method of fine particles according to <20>, wherein the Le and L satisfy Le/L>0.6.

<22> The production method of fine particles according to any one of <14> to <18>, wherein a vibration having a frequency f which satisfies Expression (3) below is applied to the liquid, $$N \times c/(4L) \le f \le (N+1) \times c/(4Le) \qquad \text{Expression (3)}$$

where L represents a length of the liquid column resonance-generating liquid chamber in a longitudinal direction thereof, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number.

<23> The production method of fine particles according to any one of <14> to <22>, wherein the vibration is a high frequency vibration having a frequency of 300 kHz or higher.

<24> The production method of fine particles according to any one of <14> to <23>, wherein a flow path from which a gas for forming an air stream, which does not constrict a distance between ejected liquid droplets, is flowed to a region where the solidifying of the liquid droplets is provided.

<25> The production method of fine particles according to <24>, wherein an initial ejection speed of the ejected droplets is lower than a speed of the air stream.

<26> The production method of fine particles according to <14>, wherein the liquid contains an organic solvent, and the solidifying of the liquid droplets is solidifying the liquid droplets by removing the organic solvent so as to dry the liquid droplets.

<27> A fine particle production apparatus including:
  a liquid droplet ejecting unit configured to eject a liquid from at least one ejection hole to form the liquid into liquid droplets, and
  a solidifying unit configured to solidify the liquid droplets,
   wherein the liquid contains a fine particle-forming component which is dissolved or dispersed in a solvent, or which is fused in the solvent,
   a liquid column resonance-generating liquid chamber, in which the ejection hole is formed, and
   a vibration generating unit configured to apply a vibration to the liquid in the liquid column resonance-generating liquid chamber,
   wherein the vibration is applied to the liquid in the liquid column resonance-generating liquid chamber by the vibration generating unit to form a standing wave through liquid column resonance, and the liquid is ejected from the ejection hole corresponding to an antinode of the standing wave.

<28> A toner,
  wherein the toner is obtained by the production method of fine particles according to any one of <14> to <26> or the fine particle production apparatus according to <27>.

<29> The toner according to <28>, wherein the toner has a particle diameter of 3.0 μm to 6.0 μm.

According to the present invention, a resonance phenomenon of generating a resonance in a liquid column resonance-generating liquid chamber is utilized, and thus a drive voltage necessary for ejecting liquid droplets can be set remarkably low, and a further higher-order resonance frequency can be utilized, and thus ejection of liquid droplets can be achieved with an extremely high frequency. Further, since the frequency can be set high, the diameter of liquid droplets ejected can be reduced inversely proportional to the frequency. Moreover, since different standing waves of a plurality of modes are present in an ejection head in the same structure, the frequency can be varied by using a plurality of resonance modes as the situation demands, and the size of liquid droplets to be formed can be changed.

In a fine particle production apparatus according to the present invention, ejection holes from which a toner composition liquid is ejected are formed in a part of a liquid column resonance-generating liquid chamber. The liquid column resonance-generating liquid chamber is provided with a vibration generating unit configured to apply a vibration to a composition liquid. When a high frequency suitable for resonance conditions is applied to the composition liquid, a standing wave through liquid column resonance is formed in the liquid column resonance-generating liquid chamber. By the standing wave through the liquid column resonance, a pressure distribution is formed in the liquid column resonance-generating liquid chamber. In the standing wave through the liquid column resonance generated in the liquid column resonance-generating liquid chamber, there is an area for the pressure distribution called "antinode", in which a high pressure is generated. By providing the ejection hole in the area for the pressure distribution corresponding to the antinode, a high pressure is applied to the composition liquid near the ejection hole, and thereby the composition liquid is continuously ejected. Subsequently, by solidifying the toner liquid droplets formed, toner particles are produced. With the process described above, continuous ejection of toner liquid droplets can be achieved, and extremely high productivity can be expected.

As described above, the liquid droplet ejection method of the present invention can achieve continuous liquid droplet ejection at high frequency and has an excellent effect that extremely high productivity can be expected.

Advantageous Effects of Invention

The present invention can solve the above-mentioned conventional problems and achieve the object-described above. That is, the present invention can provide a liquid droplet ejecting method and a liquid droplet ejection apparatus each of which enables setting a desired resonance frequency, irrespective of fluid compliance of a liquid chamber and rigidity compliance of components such as an ejection hole plate, and producing extremely fine particle liquid droplets, and also provide an inkjet recording apparatus capable of achieving high-density printing.

Also, the present invention can solve the above-mentioned conventional problems and achieve the object described above. That is, the present invention can provide a production method of fine particles and a fine particle production apparatus each of which enables achieving continuous ejection of liquid owing to its ability of continuous driving, thereby which assures extremely high productivity and enables uniformly and stably producing extremely fine liquid droplets, and to provide a toner.

BRIEF DESCRIPTION OF DRAWINGS

FIG. 7E is further yet still another schematic diagram illustrating the appearance of a liquid column resonance phenomenon generated in a liquid column resonance-generating liquid chamber of a liquid ejection head.

FIG. 8A is a diagram illustrating the appearance of liquid droplet ejection per drive frequency.

FIG. 8B is another diagram illustrating the appearance of liquid droplet ejection per drive frequency.

DESCRIPTION OF EMBODIMENTS

Firstly, the mechanism of formation of liquid droplets in a liquid droplet ejection apparatus, and a fine particle production apparatus of the present invention will be described below.

Figure 1:
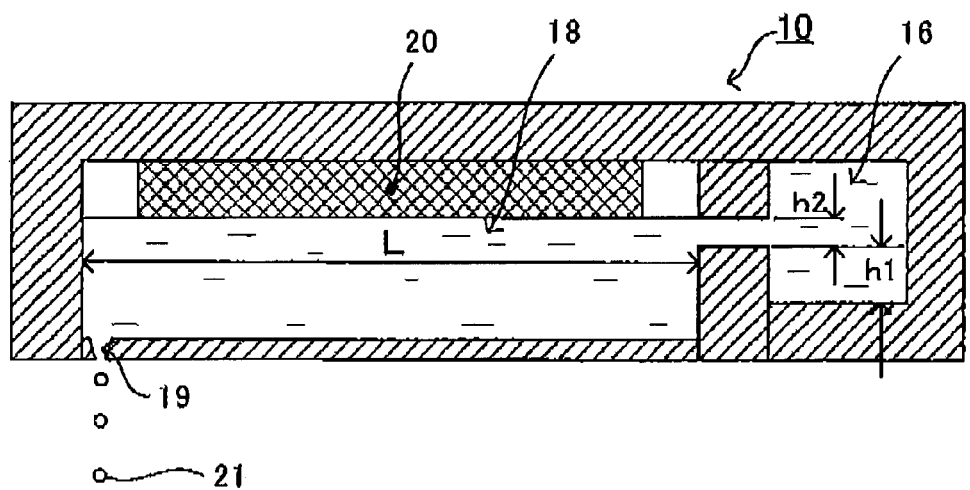
FIG. 1 is a cross-sectional diagram illustrating a configuration of a liquid droplet ejection head of a liquid droplet ejection apparatus according to one example of the present invention.

FIG. 1 is a cross-sectional diagram illustrating a configuration of a liquid droplet ejection head of a liquid droplet ejection apparatus according to one example of the present invention. Specifically, the following describes the principle of a liquid column resonance phenomenon generated in a liquid column resonance-generating liquid chamber 18 in a liquid droplet ejection head 11 in FIG. 1. When a sound speed of a liquid in a liquid column resonance-generating liquid chamber 18 is represented by c, and a drive frequency applied to the liquid (medium) from a vibration generating unit 20 is represented by f, a wavelength λ at which resonance of the liquid is generated satisfies the following Equation B, $$\lambda = c/f \qquad \text{Equation B}$$

In the liquid column resonance-generating liquid chamber 18 in FIG. 1, in the case where both ends are fixed, in which a length from an edge of a frame on a fixed edge side to the other edge thereof on the side of a liquid supply path 16 is represented by L, further, a height h1 (=about 80 [μm]) of an edge of the frame on a liquid supply path 16 is about double the height h2 (=about 40 [μm]) of a communication hole, and the height of this edge is equal to the fixed edge in a closed state, the length L meets an even number times the one fourth (¼) of the wavelength λ, resonance is most efficiently formed. That is, the length L is represented by the following Equation C.

$$L = (N/4)\lambda \qquad \text{Equation C}$$

(where N is an even number)

Also, in the case where both ends are completely open, Equation C is established.

Similarly, in the case where an open end to which a pressure is escaped is provided at one end and the other end is closed (fixed end), i.e., in the case of one-end-fixed or one-end-opened, the resonance is most efficiently formed when the length L meets odd number time times the one-fourth of a wavelength λ. That is, N in Equation C is represented by an odd number.

A drive frequency exhibiting the most efficiency f is derived from Equation B and Equation C.

$$f = N \times c/(4L) \qquad \text{Expression (1)}$$

However, actually, a liquid has a viscosity attenuating a resonance, and thus a vibration does not endlessly amplitude. Even with a frequency close to the high-drive frequency f exhibiting most efficiency as shown in Equation 1, a resonance is generated.

Figure 2A:
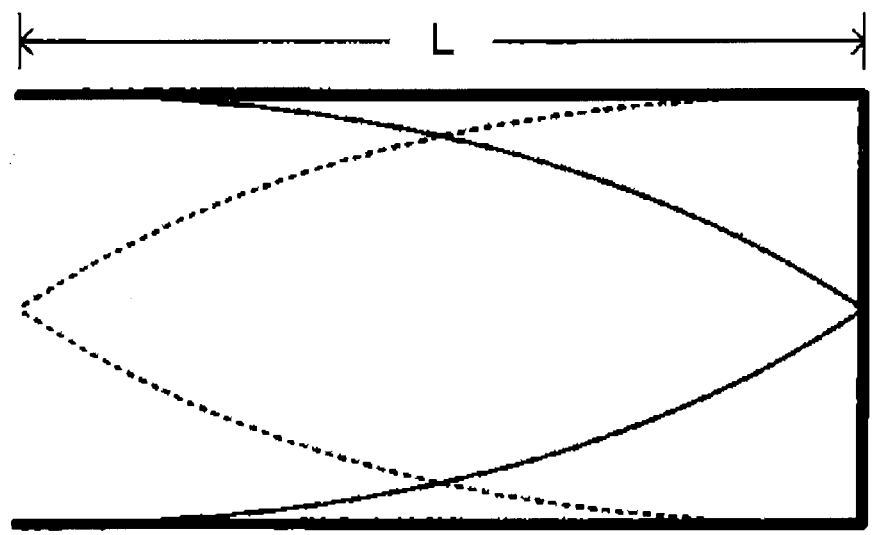
FIG. 2A is a diagram illustrating the shape of a standing wave effected by a speed/pressure variation when N is a natural number of 1.
Figure 2B:
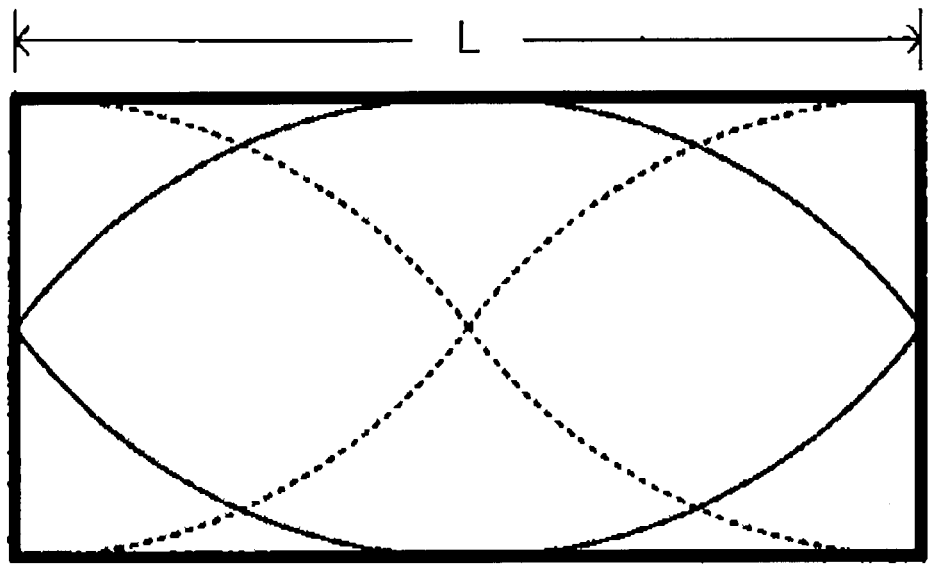
FIG. 2B is a diagram illustrating the shape of a standing wave effected by a speed/pressure variation when N is a natural number of 2.
Figure 2C:
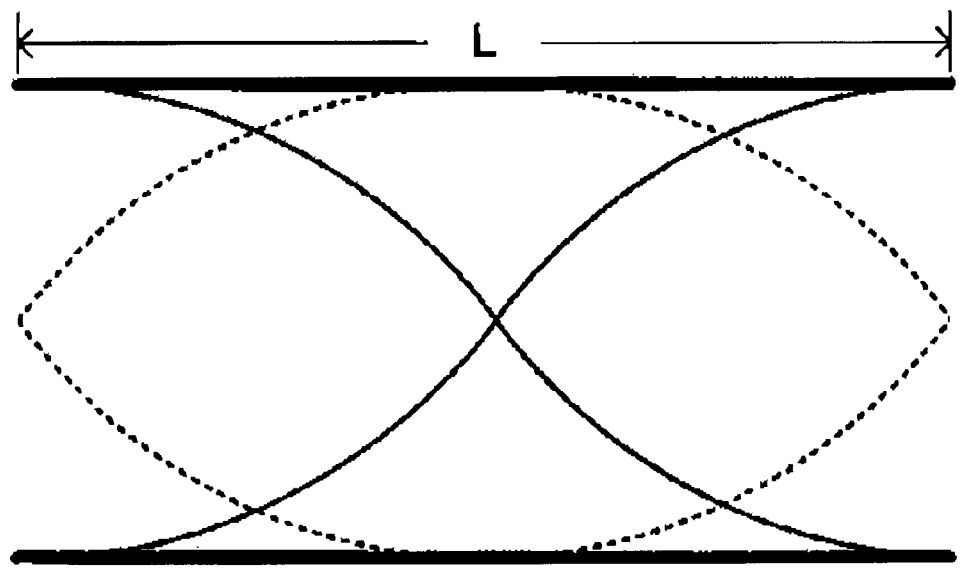
FIG. 2C is a diagram illustrating the shape of another standing wave effected by a speed/pressure variation when N is a natural number of 2.
Figure 2D:
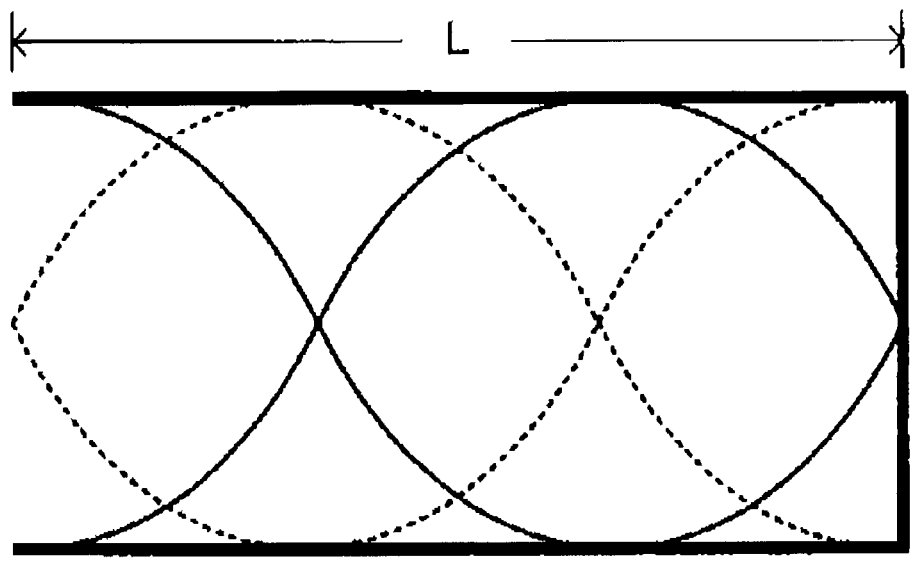
FIG. 2D is a diagram illustrating the shape of a standing wave effected by a speed/pressure variation when N is a natural number of 3.

In FIGS. 2A to 2D, a shape (resonance mode) of a standing wave formed depending on variations of the speed and pressure in the case of N is equal to 1, 2, or 3 (in FIG. 2A, N=1, L=λ/4; in FIG. 2B, N=2, L=λ/2, in FIG. 2C, N=2, L=λ/2, and in FIG. 2D, N=3, L=3λ/4). In FIGS. 3A to 3D, a shape (resonance mode) of a standing wave formed depending on variations of the speed and pressure in the case of N is equal to 4 or 5 (in FIG. 3A, N=4, L=λ; in FIG. 3B, N=4, L=λ, and in FIG. 3C, N=5, L=5λ/4). Essentially, the standing wave is a compressional wave (longitudinal wave), however, it is generated represented as illustrated in FIGS. 2A to 2D and 3A to 3C. In these figures, a solid line is a standing wave of the speed, and a dotted line is a standing wave of the pressure applied. For example, as can be seen from FIG. 2A illustrating the case of one-end fixed, with N=1, in the case of a speed distribution, a closed end is provided, and the amplitude of the speed distribution becomes zero. The amplitude becomes a maximum at the open end, which is intuitively understandable with ease. When the length of the liquid column resonance-generating liquid chamber in the longitudinal direction thereof is represented by L, wavelength at which the liquid causes a liquid-column resonance is represented by λ, a standing wave is most efficiently generated, provided that the integer N is 1 to 5. Further, a standing wave pattern differs depending on a closed-or-open state of the both side, and these different pattern are also described herein. Depending on the aperture of ejection holes and the state of the aperture of ejection holes on the feed path side, the conditions for the ends are determined. Note that in acoustics, an aperture end is an end with which the transfer speed of a medium (liquid) in the longitudinal direction is a maximum, and inversely, the pressure is zero. In contrast, a closed end is defined as an end at which the transfer speed of a medium becomes zero. A closed end is considered as a hard wall from the standpoint of acoustics and in the closed end, reflection of a wave occurs. When it is ideally completely closed or opened, a standing wave through liquid column resonance in the form as illustrated in FIGS. 2A to 2D and 3A to 3C, is generated by super-position of waves, however, the standing wave pattern varies depending on the number of liquid droplet ejection holes, and the aperture position of the liquid droplet ejection holes. A resonance frequency appears at a position shifted from a position determined by Equation 1, and conditions for stable ejection can be created by appropriately adjusting the drive frequency. For example, when a sound speed c of a liquid: 1,200 m/s, a and a length L of a liquid column resonance-generating liquid chamber: 1.85 mm, and wall surfaces are present at both sides, and a resonance mode N=2, which is completely equal to the case where both ends are fixed ends, are used, a resonance frequency having the highest in efficiently is derived as 324 kHz from Equation C. In another example, when a sound speed c of a liquid: 1,200 m/s, a and a length L of a liquid column resonance-generating liquid chamber: 1.86 mm each of which is the same conditions as the above-mentioned example, and wall surfaces are present at both sides, and a resonance mode N=4, which is completely equal to the case where both ends are fixed ends, are used, a resonance frequency having the highest in efficiently is derived as 648 kHz from Expression 1. In a liquid column resonance-generating liquid chamber having the same configuration as described above, a higher-order resonance can also be utilized.

Figure 3A:
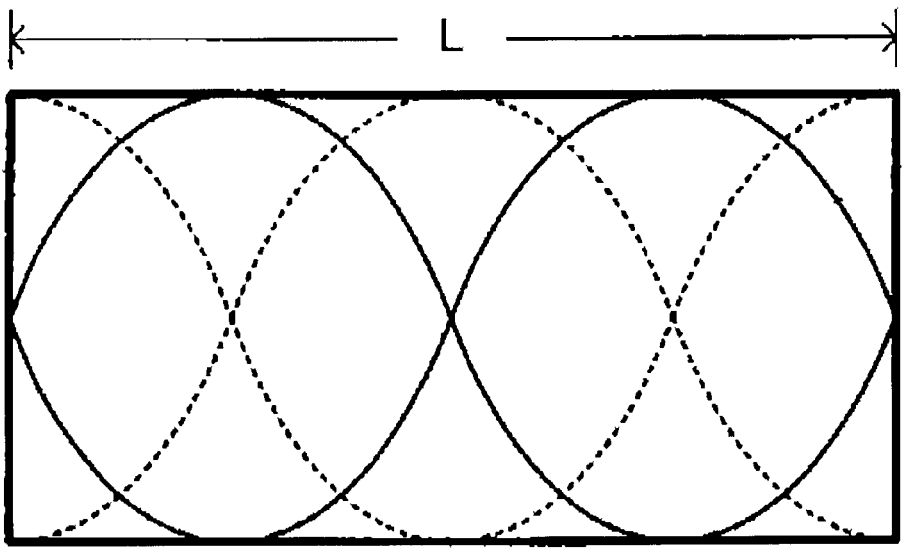
FIG. 3A is a diagram illustrating the shape of a standing wave effected by a speed/pressure variation when N is a natural number of 4.
Figure 3B:
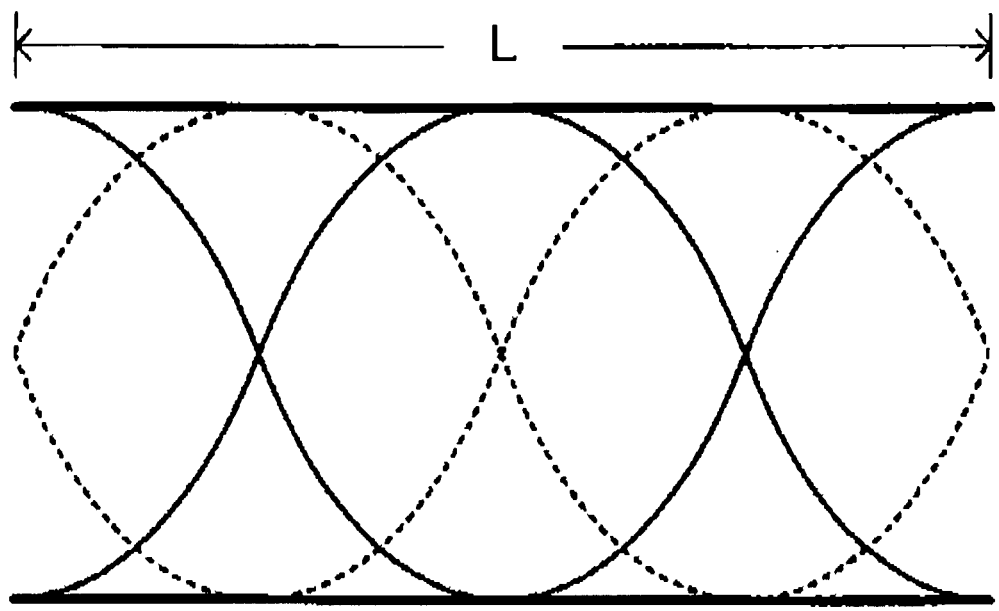
FIG. 3B is a diagram illustrating the shape of another standing wave effected by a speed/pressure variation when N is a natural number of 4.
Figure 3C:
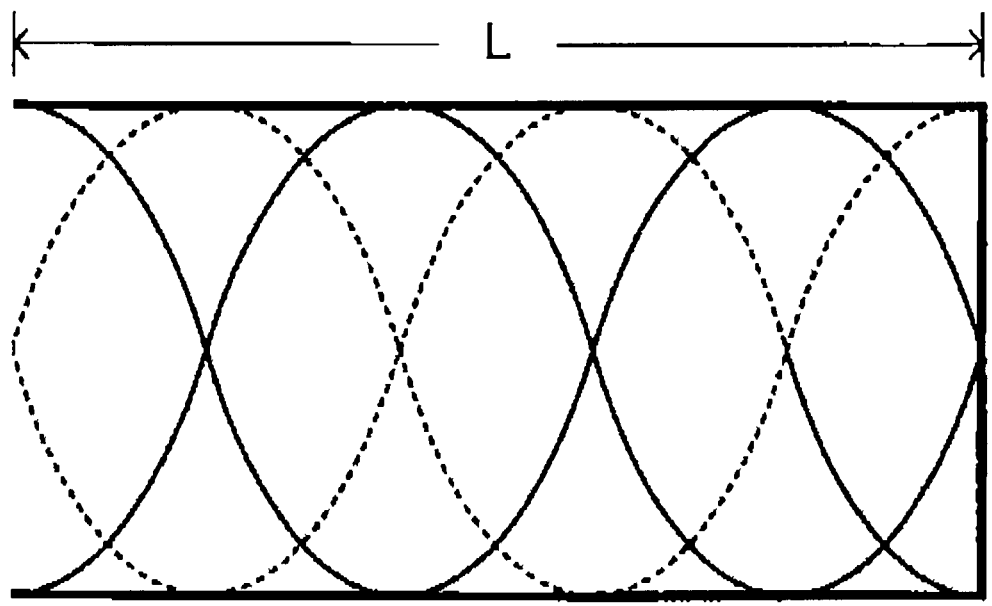
FIG. 3C is a diagram illustrating the shape of a standing wave effected by a speed/pressure variation when N is a natural number of 5.

Note that the liquid column resonance-generating liquid chamber in the liquid droplet ejection head according to the present embodiment illustrated in FIG. 1 preferably has ends in a closed state, which are equal to each other, or an end which can be illustrated as a acoustically soft wall in order to increase the frequency, because of the influence of the ejection holes 19 however, the ends may be in an open state. Here, the influence of aperture of ejection holes 19 means that particularly, an acoustic impedance is decreased, and a compliance component is increased. Therefore, a configuration of a liquid column resonance-generating liquid chamber having wall surfaces at both sides thereof in a longitudinal direction thereof as illustrated in FIG. 2B and FIG. 3A, all resonance modes including a resonance mode of both ends fixed, and one-side open end where the liquid droplet ejection holes size are regarded as open aperture can be utilized, and thus it is a preferred configuration.

When a voltage is applied to a piezoelectric element at a drive frequency determined as described above, the piezoelectric element is deformed, and a standing wave of pressure is generated in a drive cycle. In the liquid ejection head according to the present embodiment using such a principle, a standing wave through liquid column resonance is formed in a liquid column resonance generating liquid chamber 18, and liquid droplets 21 are continuously ejected from ejection holes 19 which are arranged on part of the liquid column resonance generating liquid chamber 18.

Note that it is preferable in terms of efficiency that the ejection holes 19 be arranged in a region corresponding to an antinode of the standing wave through liquid column resonance. The "region corresponding to an antinode of the standing wave through liquid column resonance" means a region other than nodes of the standing wave. Preferably, the region is a region having such a large amplitude by which the liquid is ejected by a change in pressure to the standing wave. More preferably, the region is a region within a range of ±¼ wavelength from a position where the amplitude of the pressure standing wave becomes a maximum (a node for a speed standing wave) toward a position where the amplitude of the pressure standing wave becomes a minimum (see FIG. 4, where A represents a wave surface; Z represents a node of a pressure; X represents an antinode of a pressure at a −¼ wavelength from the maximum value; and Y represents an antinode of a pressure at a +¼ wavelength from the maximum value). When the ejection holes are formed in the region corresponding to an antinode of the standing wave, substantially uniform liquid droplets can be formed from respective ejection holes, even when the ejection holes are formed in plurality, and ejection of holes can be performed efficiently. In addition, clogging of ejection holes hardly occurs. One ejection hole 19 may be formed for one liquid column resonance-generating liquid chamber, however, it is preferable to form a plurality of ejection holes (the ejection holes 19) from the view point of productivity. Specifically, the number of ejection holes is is preferably in a range of 2 to 100. When the number of ejection holes exceeds 100, there is a need to set a voltage applied to the piezoelectric element high in an attempt to form liquid droplets in a desired form from 100 pieces of the ejection holes and the behavior of the piezoelectric element becomes unstable.

In addition, when a plurality of the ejection holes 19 are formed, a pitch between the liquid droplet ejection holes is preferably 20 μm or greater and equal to or smaller than the length of the liquid column resonance-generating liquid chamber 18. When the pitch between the liquid droplet ejection holes is smaller than 20 μm, there is a high probability that liquid droplets discharged from adjacent ejection holes 19 collide with each other to be a large-size droplet.

Further, the numerical aperture of the liquid droplet ejection holes, arrangement of position for the aperture of the ejection holes and the cross-sectional shape of the liquid droplet ejection holes will also become factors to determine the drive frequency, and the drive frequency can be suitably determined in accordance with these conditions. For example, when the number of liquid ejection holes is increased, the restriction of a leading edge of the liquid column resonance-generating chamber, which was a fixed end initially, was gradually loosened, and a resonance standing wave close to a standing wave obtained at a substantially open end occurs, and the drive frequency increases. Furthermore, the restriction conditions are loosened from the position of the ejection holes present the nearest to the liquid feed path side as a start point, and the cross-sectional shape of the liquid droplet ejection holes becomes a round shape, the volume of ejection holes varies due to the thickness of a frame employed, an actual standing wave becomes to have a short wavelength and higher than the drive frequency employed.

The liquid column resonance phenomenon generated in the longitudinal direction of the liquid column resonance-generating liquid chamber 18 is a phenomenon in which a standing wave is generated to a length L of the liquid column resonance-generating liquid chamber 18 in the longitudinal direction thereof, and a pressure vibration is amplified at a specific frequency. A system employing this ejection method has a sufficient size to ensure the quantity of ejection, and is a pressure flow path which is essentially long for accumulation or collection of droplets at ejection holes.

Note that the liquid column resonance-generating liquid chamber 18 in a liquid droplet ejection head 11 is formed to joint a frame formed of a material having such high rigidity that does not adversely influence upon the resonance frequency of the liquid, such as metal, ceramics, and silicon. As illustrated in FIG. 1, a length L between wall surfaces provided at both ends of a liquid column resonance-generating liquid chamber 18 in the longitudinal direction thereof is determined based on Expression 1, and after-mentioned Expressions 2 and 3. A flow path for supply of a liquid is formed for each of the liquid column resonance-generating chambers, from the liquid feed path 16, and the liquid feed path 16 is continuously connected to a plurality of liquid column resonance-generating liquid chambers 18.

In addition a vibration generating unit 20 in the liquid droplet ejection head 11 is not particularly limited as long as it can drive at a given frequency. Such an aspect is desired in which a piezoelectric element is laminated to an elastic plate. The elastic plate constitutes part of the wall in the liquid column resonance-generating chamber so that the piezoelectric element comes into contact with the liquid. Examples of material for the elastic plate include piezoelectric ceramics such as lead zirconate titanate (PZT). Generally, since such a material has a small amount of displacement, in most cases, it is used in a laminate form. Besides, piezoelectric polymers such as polyvinylidene fluoride (PVDF), crystal, and single crystal such as $LiNbO_3$, $LiTaO_3$, $KNbO_3$ are exemplified. Furthermore, the vibration generating unit 20 is desirably disposed so that it can be individually controlled for each liquid column resonance chamber. In addition, the following configuration is desired: one material selected from those described above in a block shape is partially cut to fit the arrangement of the liquid column resonance-generating chamber, and respective liquid column resonance-generating chambers can be controlled individually, via an elastic plate.

Further, a voltage is applied to the vibration generating unit with the determined drive frequency, the vibration generating unit is deformed, and a resonance standing wave is most efficiently generated at the drive frequency. Furthermore, with a frequency close to the drive frequency at which the resonance standing wave is most efficiently generated, a liquid column resonance standing wave is generated. That is, when the vibration generating unit is effected to vibrate using a drive waveform primarily containing a drive frequency f in a range determined by the following Expressions 2 and 3 using both lengths of L and Le, where a length between both ends of the liquid column resonance-generating liquid chamber in a longitudinal direction thereof is represented by L, and a distance between the end of the liquid column resonance-generating liquid chamber on the liquid feed side and a center of a liquid droplet ejection hole nearest to the end of the liquid column resonance-generating liquid chamber on the liquid feed side is represented by Le, to excite liquid column resonance, and thereby liquid droplets can be ejected from ejection holes.

$$N \times c/(4L) \leq f \leq N \times c/(4Le) \qquad \text{Expression (2)}$$

$$N \times c/(4L) \leq f \leq (N+1) \times c/(4Le) \qquad \text{Expression (3)}$$

Note that a ratio Le/L, i.e., the distance Le between the end of the liquid column resonance-generating liquid chamber on the liquid feed side and a center portion of a liquid droplet ejection hole nearest to the end of the liquid column resonance-generating liquid chamber on the liquid feed side with respect to the length L between both ends of the liquid column resonance-generating liquid chamber in its longitudinal direction is preferably greater than 0.6, i.e., Le/L>0.6.

Figure 5:
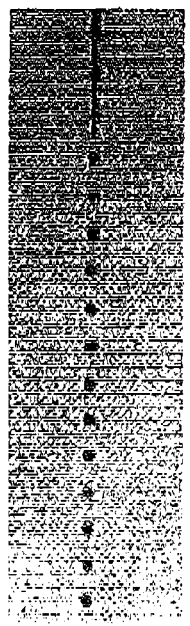
FIG. 5 is a diagram illustrating one example of an image of ejection of liquid droplets having a 300 kHz-sine wave obtained by a laser shadowgraph method.
Figure 6:
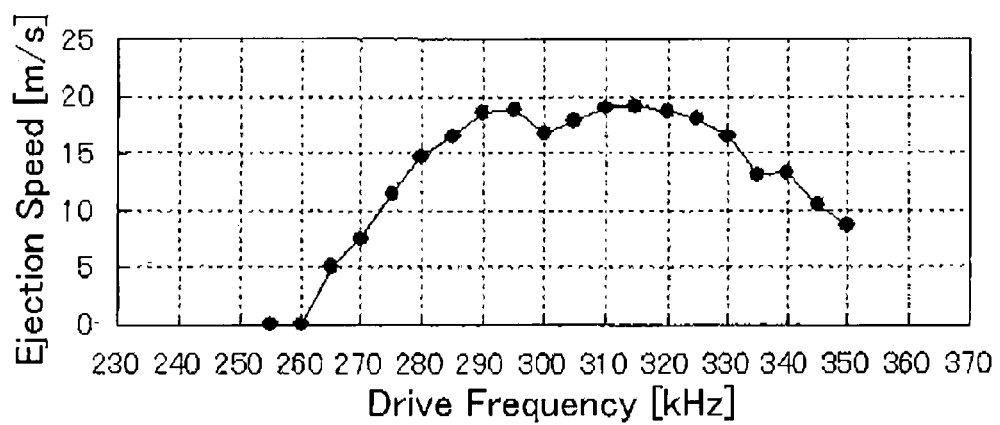
FIG. 6 is a characteristic graph illustrating a relationship between a drive frequency and an ejection speed.

FIG. 5 illustrates an example of an image of ejection of a sine wave at 300 kHz, which was photographed by laser shadowgraphy. In this example, ejection of liquid droplets having extremely uniform diameters is achieved with a substantially uniform ejection speed. FIG. 6 illustrates a frequency characteristic of liquid droplets when a vibration generating unit is driven with an amplitude sine wave at 255 kHz to 350 kHz. The ejection speed becomes uniform particularly in the vicinity of a peaked position (300 kHz). This shows that uniform ejection is surely achieved at a position corresponding to an antinode of a pressure standing wave in the vicinity of 300 kHz, which is the second mode of a liquid column resonance frequency.

Next, appearance of liquid column resonance phenomenon generated in a liquid column resonance-generating chamber in a liquid droplet ejection head will be described with reference to FIGS. 7A to 7E. Note that, in FIGS. 7A to 7E, a solid line written in a liquid column resonance-generating liquid chamber represents a speed distribution which is obtained by plotting a speed measured at each measurement position arbitrarily selected from a fixed end side of the liquid column resonance-generating liquid chamber to an end of the liquid column resonance-generating liquid chamber on the liquid feed side, a direction from the liquid feed side toward the liquid column resonance-generating liquid chamber is defined as + (plus), and the opposite direction is defined as − (minus). In addition, in FIGS. 7A to 7E, a dotted line written in the liquid column resonance-generating liquid chamber represents a pressure distribution which is obtained by plotting a pressure value measured at each measurement position arbitrarily selected from the fixed end side of the liquid column resonance-generating liquid chamber to the end of the liquid column resonance-generating liquid chamber on the liquid feed side, a positive pressure with respect to atmospheric pressure is defined as + (plus), and a negative pressure with respect to atmospheric pressure is defined as − (minus). When the pressure is a positive pressure, the pressure is applied in a downward direction in the figures, whereas, when the pressure is a negative pressure, the pressure is applied in an upward direction in the figures. In addition, in FIGS. 7A to 7E, the liquid column resonance-generating liquid chamber is opened on the liquid feed path 16 side, as described above. Since the height of a frame serving as the fixed end of the liquid column resonance-generating liquid chamber is approximately twice or more than the height of an aperture in which the liquid feed path 16 is in communication with the liquid column resonance-generating liquid chamber 18, there are illustrated a speed distribution and a pressure distribution which vary with time under approximate conditions where the liquid column resonance-generating liquid chamber 18 has substantially fixed both ends.

Figure 7A:
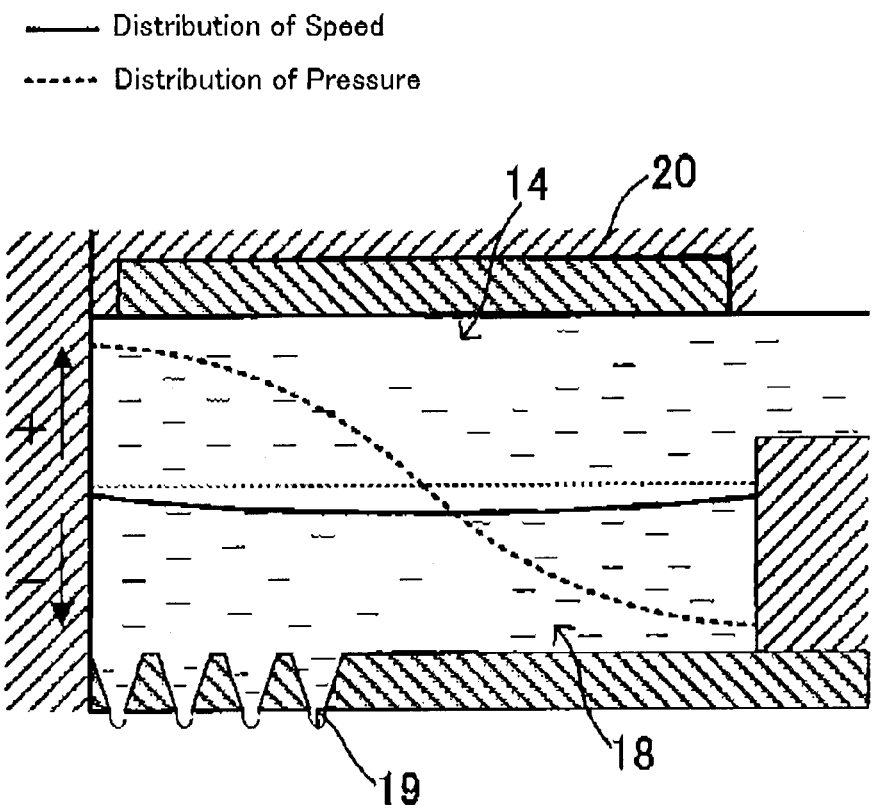
FIG. 7A is a schematic diagram illustrating the appearance of a liquid column resonance phenomenon generated in a liquid column resonance-generating liquid chamber of a liquid ejection head.
Figure 7B:
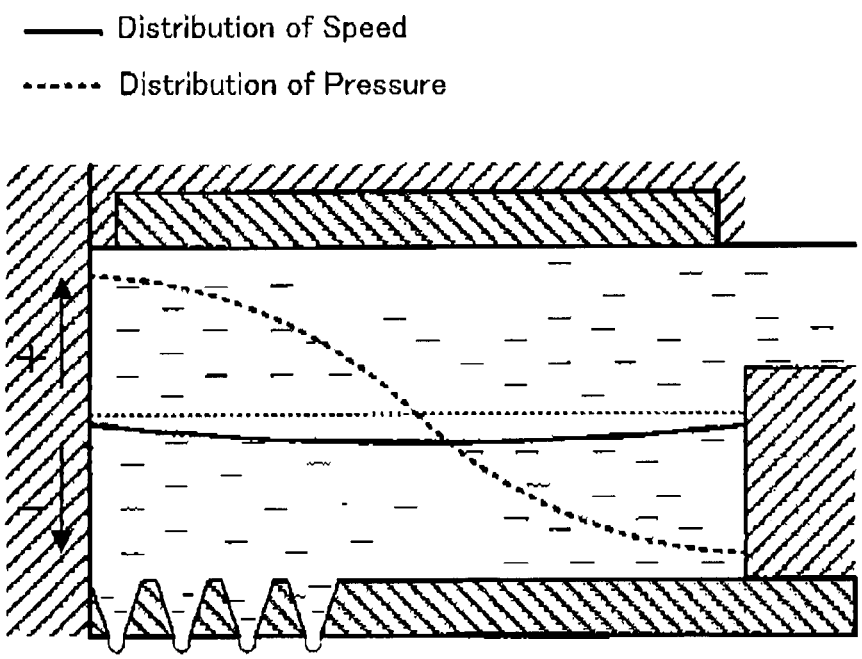
FIG. 7B is another schematic diagram illustrating the appearance of a liquid column resonance phenomenon generated in a liquid column resonance-generating liquid chamber of a liquid ejection head.
Figure 7C:
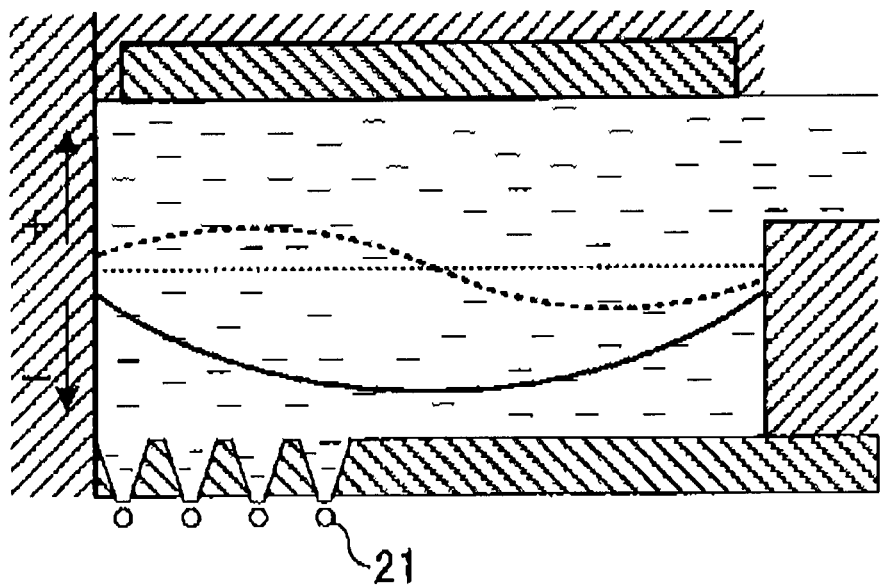
FIG. 7C is still another schematic diagram illustrating the appearance of a liquid column resonance phenomenon generated in a liquid column resonance-generating liquid chamber of a liquid ejection head.

FIG. 7A illustrates a pressure waveform and a speed waveform in the liquid column resonance-generating liquid chamber 18 when liquid droplets are ejected. FIG. 7B illustrates a pressure waveform and a speed waveform in the liquid column resonance-generating liquid chamber 18 when a liquid is fed in the liquid column resonance-generating liquid chamber 18 immediately after the ejection of liquid droplets. As illustrated in FIGS. 7A and 7B, a pressure in the liquid column resonance-generating liquid chamber 18 in which ejection holes 19 are formed is a maximum. The liquid the liquid column resonance-generating liquid chamber 18 flows to the liquid feed path 16 side, and the flow speed (rate) is low. Subsequently, as illustrated in FIG. 7C, a positive pressure in the vicinity of the ejection holes 19 is decreased, and transfers toward a negative pressure direction. The direction to which the liquid flows in the liquid column resonance-generating liquid chamber 18 is the same as illustrated in FIGS. 7A and 7B, i.e., the liquid flows toward the liquid feed path 16 side, however, the flow speed becomes a maximum.

Figure 7D:
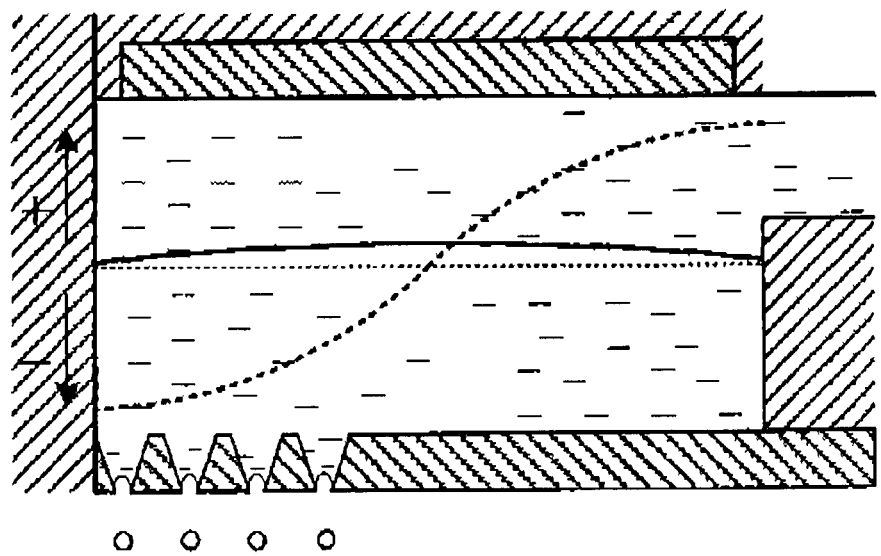
FIG. 7D is yet still another schematic diagram illustrating the appearance of a liquid column resonance phenomenon generated in a liquid column resonance-generating liquid chamber of a liquid ejection head.

Further, as illustrated in FIG. 7D, the pressure in the vicinity of the ejection holes 19 becomes a minimum. The flow of the liquid in the liquid column resonance-generating liquid chamber 18 changes from the liquid feed path 16 side toward the liquid column resonance-generating liquid chamber 18. The flow speed is low. From this point in time, refilling of the liquid column resonance-generating liquid chamber 18 with the liquid begins. Subsequently, as illustrated in FIG. 17E, the negative pressure in the vicinity of the ejection holes 19 becomes small, and transfers toward a positive direction. The direction to which the liquid flows in the liquid column resonance-generating liquid chamber 18 is the same as illustrated in FIG. 7D, i.e., the liquid flows toward the liquid feed path 16 side, however, the flow speed becomes a maximum. At this point in time, the refilling of the liquid finished. Then, as illustrated in FIG. 7A, the positive pressure in a liquid droplet ejection area in the liquid column resonance-generating liquid chamber 18 becomes a maximum again, liquid droplets 21 are ejected from the ejection holes 19. In this way, in a liquid column resonance-generating liquid chamber, a standing wave through liquid column resonance takes place by a high frequency drive from a vibration generating unit, and because the ejection holes 19 are arranged in a region corresponding to an antinode of the standing wave through liquid column resonance, which is a region where the pressure most greatly varies, the liquid droplets 21 are ejected from the ejection holes 19 according to the cycle of the antinode.

FIG. 8A illustrates the appearance of liquid droplet ejection at a drive frequency of 115 kHz, and FIG. 8B illustrated the appearance of liquid droplet ejection at a drive frequency of 300 kHz. As compared to the liquid droplet ejection illustrated in FIG. 8A where the drive frequency is 115 kHz, it is verified that in the liquid droplet ejection at a drive frequency of 300 kHz as illustrated in FIG. 8B, the speed and the diameter of liquid droplets tends to monotonously increase relative to an increase in voltage.

FIG. 9 is a diagram for illustrating a waveform of a drive voltage applied to a piezoelectric element serving as a pressure generating member in a liquid droplet ejection apparatus according to the present invention. In reference to a voltage applied to the piezoelectric element, a frequency-corresponding waveform as illustrated in FIGS. 8A and 8B is applied. As described above, a drive voltage waveform includes a continuous pulse group primarily containing liquid column resonance frequencies of a liquid in a liquid column resonance-generating liquid chamber. The liquid column frequencies include a plurality of resonance mode fractions, which can be suitably used. A plurality of liquid droplets is effected to fly with a plurality of pulses, and one pixel is formed with the plurality of liquid droplets. At this time, the number of pulses is not necessarily the same as the number of liquid droplets ejected. In addition, by controlling the number of pulses in a continuous pulse group to be driven, the number of liquid droplets to be ejected, i.e., the quantity of liquid droplets is mage variable. Therefore, the diameter of pixel can be multi-valued on a recording medium, and recording with image gradation properties is facilitated.

Figure 10:
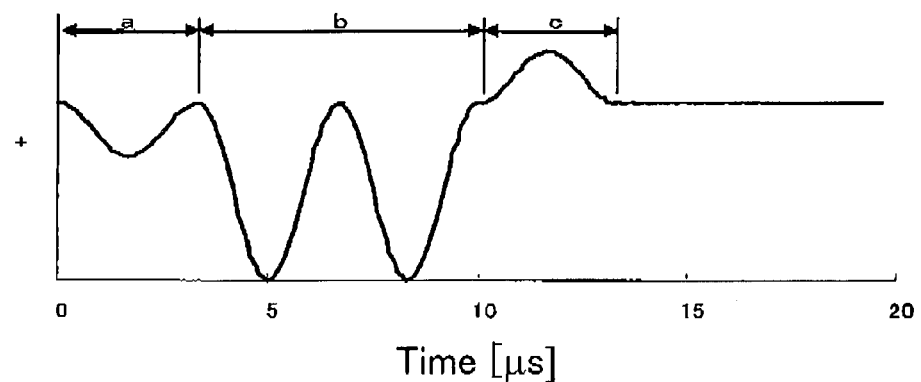
FIG. 10 is a wave diagram illustrating a drive voltage waveform including a preparatory generation pulse part.

Furthermore, in order to accurately control the liquid droplet ejection quantity and ejection timing, it is desirable to give a frequency corresponding waveform as described below. A continuous pulse group for forming one pixel is designed to include three divided pulse parts: a preparatory pressure generating part as illustrated in FIG. 10 (a waveform during a period of (a) in FIG. 10), a drive main pulse part (a waveform during a period of (b) in FIG. 10), and a residual vibration undoing pulse part (a waveform during a period of (c) in FIG. 10). The preparatory pressure generating part is present at a leading edge of the continues pulse group, and allows the liquid inside the liquid column resonance-generating liquid chamber to remain in a state of not flying liquid droplets and increases the pressure to the liquid in the vicinity of an ejection hole. In other words, the preparatory pressure generating part prevents liquid leak and inhalation of air, bubbles. The drive main pulse part follows the preparatory pressure generating part and flies liquid droplets according to a pulse applied. The control of the liquid droplet quantity is performed in this part. Note that the pulse group includes liquid resonance frequencies of the liquid in the liquid column resonance-generating liquid chamber as a main component. The residual vibration undoing pulse part is an application pulse which applies a frequency component having a phase opposite to that of a main frequency component of the drive main pulse part immediately after the drive main pulse part to thereby rapidly reduce the pressure applied to the liquid in the liquid column resonance-generating liquid chamber. With this configuration, when a subsequent continuous pulse group is applied to the liquid, the pressure applied to the liquid in the vicinity of the ejection hole and a meniscus phase of the liquid in the ejection hole can be restored to the initial condition. That is, it is possible to increase the response frequency of the drive pulse group.

Figure 9A:
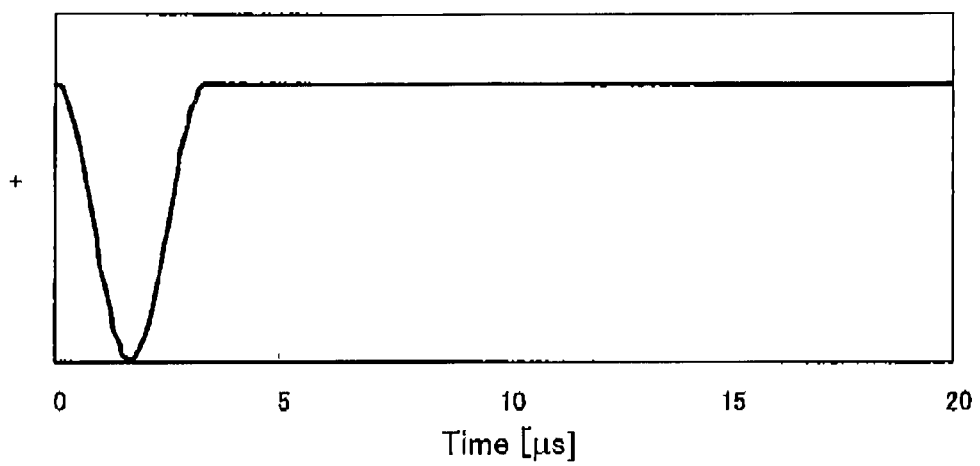
FIG. 9A is a waveform diagram illustrating a drive voltage wave.
Figure 9B:
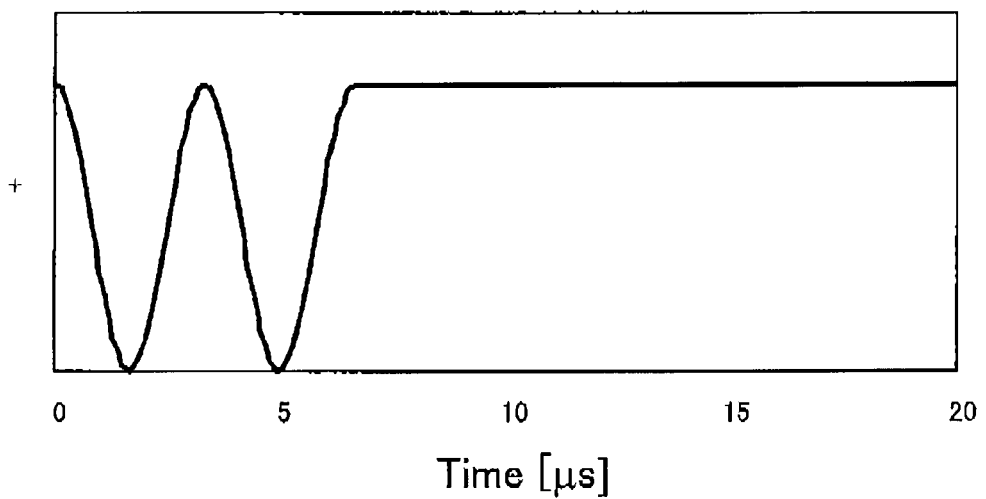
FIG. 9B is another waveform diagram illustrating a drive voltage wave.

A series of drive voltage waveforms are not limited to sine waveforms as illustrated in FIGS. 9A and 9B, and may be rectangular waves or pulse waves, as long as the frequency components primarily contain the above-mentioned liquid resonance frequencies of the liquid in the liquid column resonance-generating chamber. Actually, a waveform itself causes a delay with a time constant in accordance with the capacity component of a piezoelectric element itself serving as a pressure generating member, at a start point and a fall point, and thus it is possible to obtain sufficient practicability with a rectangular pulse wave. Moreover, in the preparatory pressure generating part, only the voltage level can be set low with the same frequency component as in the drive main pulse part as illustrated in FIG. 10, and only the frequency component can be set varied with the same voltage level as in the drive main pulse part as illustrated in FIG. 9. The also applies to the residual vibration undoing pulse part.

As described above, a liquid resonance frequency for use in a drive main pulse part is 300 kHz (approximately 3 µs) or less, and thus it is advisable that one pixel be designed to include about one droplet to about 10 droplets and an actual drive frequency be set to about 30 KHz to thereby obtain a multiple tone.

As having been described above, a liquid droplet ejection head according to the present embodiment utilizes a fluid liquid resonance of a liquid, not directly converting the displacement amount of a pressure generation member into a volume displacement in the liquid chamber to eject liquid droplets, and thus the amount of drive energy can be remarkably reduced.

Next, the mechanism part of an inkjet recording apparatus serving as a liquid droplet ejection apparatus according to the present invention will be described below, with reference to FIG. 12.

Figure 12:
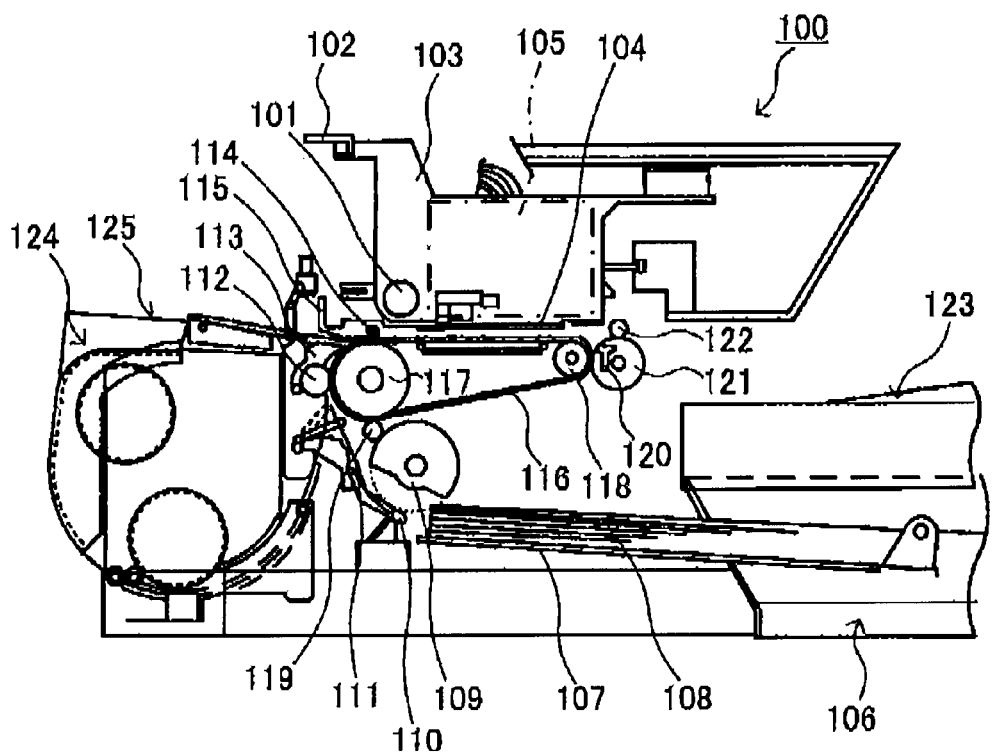
FIG. 12 is a schematic cross-sectional diagram illustrating the configuration of an inkjet recording apparatus.

In an inkjet recording apparatus 100 illustrated in FIG. 12, a carriage 103 was kept slidably in a main scanning direction by a guide rod 101 serving a guide member laid across on lateral plates (not illustrated) and a stay 102. Scanning is performed by a main scanning motor (not illustrated). In the carriage 103, a recording head 104 including four inkjet recording heads which discharge recording ink drops for respective colors, yellow (Y), cyan (C), magenta (M), and black (Bk) is loaded, so that a plurality of ink discharge openings is arranged in the direction crossing the main scanning direction, and ink drop discharge direction is headed below.

The recording head 104 based on a liquid column resonance includes two ejection hole rows for each, in which one ejection hole row of the recording head ejects black (K) liquid droplets, and the other side ejection hole row ejects cyan (C) liquid droplets. In the other ejection hole row of the recording head, one ejection hole row ejects magenta (M) liquid droplets, and the other side ejection hole row ejects yellow (Y) liquid droplets.

The carriage 103 is provided with a head tank 105 serving as a liquid housing container for feeding each color ink corresponding to each of the ejection hole rows in the recording head 104. In the head tanks 105, each color ink is replenished and supplied from respective ink cartridges for each color, which are mounted on a cartridge loading part (not illustrated) via ink supply tubes for each color (not illustrated). In the cartridge mounting part, a feed pump unit (not illustrated) for liquid feeding of each color ink in the individual ink cartridge is disposed.

Meanwhile, as a paper feed part to feed paper 108 laded on a paper lading section (pressure plate) 107 of the paper feed tray 106, there are provided a semilunar roller (paper feed roller 109) which separately feed the paper 108 piece by piece from the paper lading section 107 and a separation pad 110 made of a material having a large friction coefficient, which faces the paper feed roller 109. This separation pad 110 is biased toward the paper feed roller 109 side.

As a conveyance part to convey the paper 108 fed from this paper feed part below the recording head 104, a guide member 111 to guide the paper 108, a counter roller 112, a conveyance guide member 113, and a press member 115 having a leading edge pressure roller 114 and a conveyance belt 116 to electrostatically absorb and convey the paper 108 at a position facing the recording head 104 are provided. The conveyance belt 116 is an endless belt. The conveyance belt 116 is stretched between a conveyance roller 117 and a tension roller 118, and can go around in the belt conveyance direction. Further, a charging roller 119 which is an electrification measure to charge a surface of the conveyance belt 116 is provided. The charging roller 119 is disposed so that it is in contact with the surface of the conveyance belt 116 so that it is driven to rotate according to the rotation of the conveyance belt 116. The conveyance belt 116 moves around in the belt conveyance direction by rotatably driving the conveyance roller 117 at an appropriate timing by an unillustrated sub-scanning motor.

As a paper ejection part to eject the paper 108 recorded by the recording head 104, a separation claw 120 to separate the paper 108 from the conveyance belt 116, a paper ejection roller 121, and a paper ejection roller 122 are provided, and the paper ejection tray 123 is arranged below the paper ejection roller 121.

A double-sided paper feed unit 124 is detachably loaded on the rear face part of the apparatus body. The double-sided paper feed unit 124 takes in the paper 108 returned by backward rotation of the conveyance belt 116, inverts the paper 108, and feeds the paper 108 again between the counter roller 112 and the conveyance belt 116. A manual paper feed section 125 is provided on the top face of the double-sided paper feed unit 124.

As having been described above, according to the present embodiment, when a vibration is applied to the liquid in the liquid column resonance-generating liquid chamber 18 illustrated in FIG. 1 by the vibration generating unit 20, a standing wave through liquid column resonance is generated. A pressure distribution is formed in the liquid column resonance-generating liquid chamber utilizing the standing wave through liquid column resonance. The liquid is ejected from the ejection holes by a change in the pressure distribution formed. Therefore, the resonance frequency excited by the liquid column resonance can be set to a desired frequency, irrespective of the structure of a liquid chamber in a conventional liquid droplet ejecting method. In addition, liquid droplets having an extremely fine particle diameter, which is inversely proportional to the frequency, can be ejected by setting the resonance frequency high.

Further, the ejection holes 19 are formed in a region corresponding to an antinode of the standing wave through the liquid column resonance formed in the resonance-generating liquid chamber 18 in a member constituting the resonance-generating liquid chamber 18

Furthermore, a plurality of the ejection holes 19 are formed for one liquid column resonance-generating liquid chamber 18. With this, liquid droplets can be ejected with high density.

At both ends of the liquid column resonance-generating liquid chamber 18 in a longitudinal direction thereof, as illustrated in FIG. 1, a reflection wall surface is provided at least a part of the ends. Therefore, the liquid column resonance-generating liquid chamber is made to have at least one-end fixed end. A standing from through liquid column resonance formed in the liquid column resonance-generating liquid chamber is a stable waveform, and stable ejection of liquid droplets can be expected.

Further, the vibration generating unit 20 is effected to vibrate using a drive waveform primarily containing a frequency f which is determined by using L and Le and which satisfies $N \times c/(4L) \leq f \leq N \times c/(4Le)$ where L represents a length of the liquid column resonance-generating liquid chamber 18 in a longitudinal direction thereof, Le represents a distance between the end of the liquid column resonance-generating liquid chamber 18 on the liquid feed path side and a center part of the ejection hole 19 nearest to the end of the liquid column resonance-generating liquid chamber 18, on the side of the liquid feed path 16 which is continuously connected to the liquid column resonance-generating liquid chamber 18, a frequency of a high frequency vibration generated by the vibration generating unit 20 is represented by f, c represents a sound speed of the liquid, and N is a natural number, and a liquid column resonance is excited in the liquid column resonance-generating liquid chamber to thereby continuously eject the toner composition liquid from the toner ejection holes. Note that a ratio Le/L is preferably greater than 0.6. The frequency generated by the vibration generating unit 20 is preferably a high frequency vibration of 300 kHz or higher. With this, a liquid column resonance is excited in the liquid column resonance-generating liquid chamber 18, and thereby the liquid can be ejected from the ejection holes 19.

A drive signal from a vibration generating unit excites the vibration generating unit 20 by pulse groups which is primarily composed of a liquid column resonance oscillation frequency depending on the length of the liquid column resonance-generating liquid chamber 18 in the longitudinal direction thereof. With this, ejection of liquid droplets can be controlled.

Further, the pulse group, as illustrated in FIG. 10, is divided into three pulse parts of a preparatory pressure generating pulse part (a waveform during a period of (a) in FIG. 10), a drive main pulse part (a waveform during a period of (b) in FIG. 10), and a residual vibration undoing pulse part (a waveform during a period of (c) in FIG. 10). The preparatory pressure generating pulse part is present at the leading edge of the pulse groups and excites the liquid in the liquid column resonance-generating liquid chamber to allow the liquid to remain in a state of not flying the liquid droplets. The drive main pulse part is an application pulse following the preparatory generating pulse part and ejects the liquid from the ejection hole. The residual vibration undoing pulse part is an application pulse immediately after the drive main pulse part and includes a frequency component having a phase opposite to that of a main frequency component of the drive main pulse part. With this, the ejection quantity of liquid droplets and the ejection timing can be accurately controlled.

A liquid droplet ejection head 11 illustrated in FIG. 1 includes a liquid column resonance-generating liquid chamber 18 and a vibration generating unit 20. In the liquid column resonance-generating liquid chamber 18, ejection holes 19 are formed at a part of a plate constituting the liquid chamber 18. Further, a vibration generating unit 20 for applying a vibration to a liquid in the liquid column resonance-generating liquid chamber 18 is provided. A vibration is applied inside the liquid column resonance-generating liquid chamber 18 by the vibration generating unit 20 so that a standing wave through liquid column resonance is formed in the liquid column resonance-generating liquid chamber 18 to thereby eject the liquid from the ejection holes 19. With this, the resonance frequency can be desirably set, and extremely fine liquid droplets can be produced.

Further, the ejection holes 19 are formed in a region (in a member constituting the liquid column resonance-generating liquid chamber 18) corresponding to an antinode of the standing wave through the liquid column resonance formed in the liquid column resonance-generating liquid chamber 18. The region corresponding to an antinode of the standing wave through the liquid column resonance is a region where the pressure becomes a maximum, thereby stable ejection of liquid droplets can be achieved.

Further, by using the liquid droplet ejecting method with the inkjet recording apparatus, or including the liquid droplet ejection apparatus, ink droplets can be ejected with a lower voltage and a high-density recording can be achieved.

<Fine Particle Production Method, Fine Particle Production Apparatus, and Toner>

Figure 13:
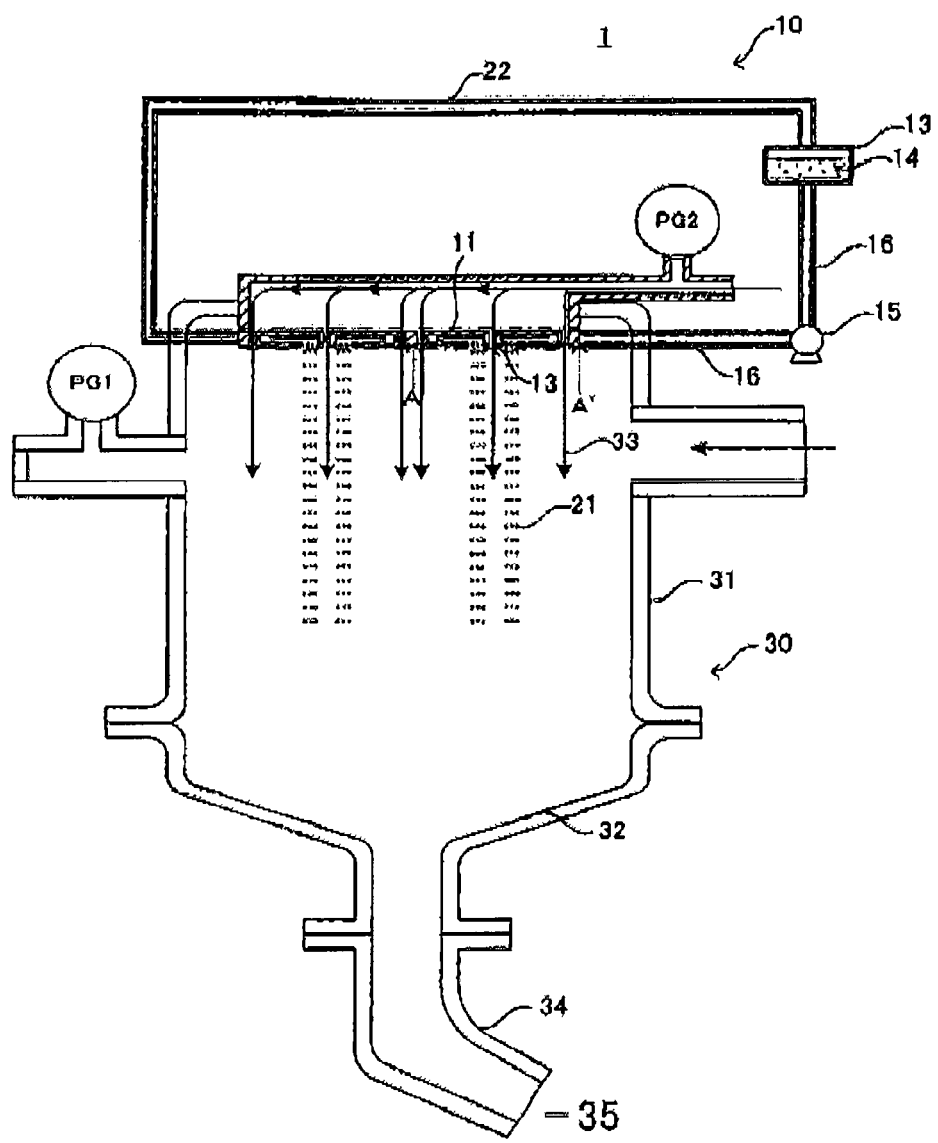
FIG. 13 is a cross-sectional diagram illustrating the overall configuration of a toner production apparatus according to one embodiment of the present invention.
Figure 14:
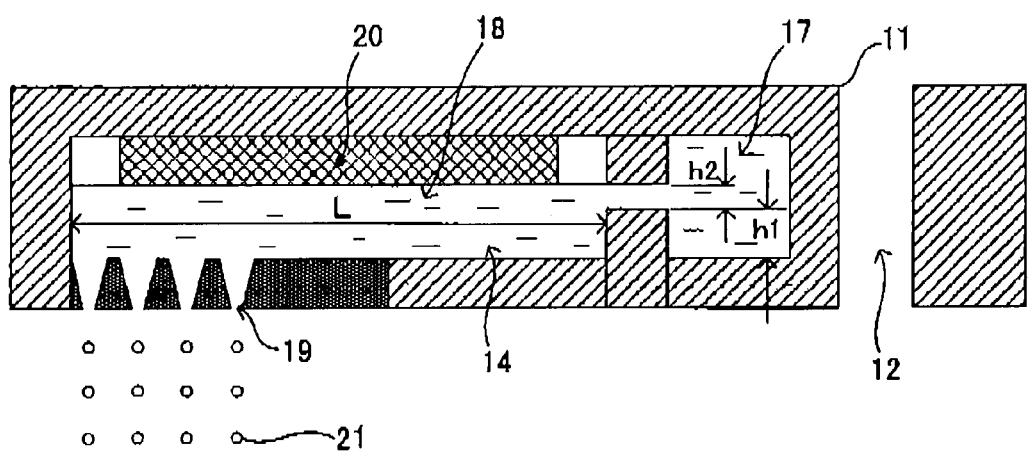
FIG. 14 is a cross-sectional diagram illustrating the configuration of the liquid droplet ejection head in the liquid droplet forming unit (liquid droplet ejection apparatus) in FIG. 13.
Figure 15:
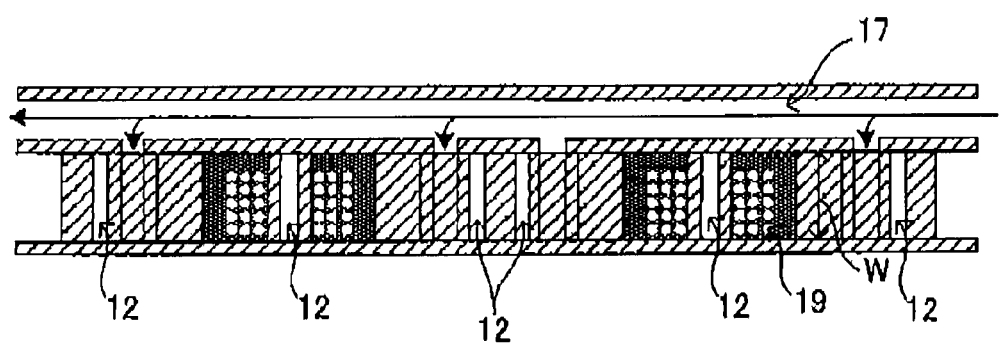
FIG. 15 is an A-A' line cross-sectional diagram illustrating the configuration of the liquid droplet forming unit in FIG. 13.

FIG. 13 is a cross-sectional diagram illustrating the overall configuration of a toner production apparatus according to one embodiment of the present invention. FIG. 14 is a cross-sectional diagram illustrating the configuration of the liquid droplet ejection head in the liquid droplet forming unit (liquid droplet ejection apparatus) in FIG. 13, FIG. 15 is an A-A' line cross-sectional diagram illustrating the configuration of the liquid droplet forming unit in FIG. 13.

A toner production apparatus 1 according to the present embodiment illustrated in FIG. 13 mainly include a liquid droplet forming unit 10 and a dry-collection unit 30. The liquid droplet forming unit 10 includes a plurality of arrays of liquid droplet ejection heads 11 each of which is a liquid droplet forming unit configured to eject a toner composition liquid in a liquid column resonance-generating liquid chamber which is a liquid chamber having a liquid jetting area in communication with exterior portions through ejection holes, and in which a liquid column resonance standing wave is generated under the after-mentioned conditions, as liquid droplets from the ejection holes. On both sides of each of the liquid droplet ejection heads 11, an air stream path 12 is provided, through which an air stream generated by an unillustrated air stream generating unit passes so that liquid droplets of the toner composition liquid ejected from the liquid droplet ejection heads 11 flows out to a dry-collection unit 30. Further, the liquid droplet forming unit 10 includes a material housing container 13 to house a toner composition liquid 14, which is a toner material, and a liquid circulation pump 15 which feeds the toner composition liquid 14 housed in the material housing container 13 to the after-mentioned liquid common feed path 17 in the liquid droplet ejection head 11 via a liquid feed path 16 and further pressure-feeds the toner composition liquid 14 in the liquid feed path 16 so as to be returned to the material housing container 13 via a liquid return pipe 22. Furthermore, the liquid droplet ejection head 11 includes, as illustrated in FIG. 14, a liquid common feed path 17 and a liquid column resonance-generating chamber 18. The liquid column resonance-generating chamber 18 is designed to communicate with the liquid common feed path 17 which is disposed at one wall surface of wall surfaces provided at both ends of the liquid column resonance-generating chamber 18 in a longitudinal direction thereof. In addition, the liquid column resonance-generating chamber 18 includes ejection holes 19 which ejects liquid droplets 21 at one wall surface of wall surfaces connected to the wall surfaces provided at the both ends, and a vibration generating unit 20 which is provided at a wall surface facing the ejection holes 19 and is configured to generate a high frequency vibration for forming a liquid column resonance standing wave. Note that an unillustrated high-frequency power source is connected to the vibration generating unit 20.

The dry-collection unit 30 illustrated in FIG. 13 includes a chamber 31 and a toner collection part 32. In the chamber 31, a large-size downward air stream is formed. In the large-size downward air stream, an air stream generated by an unillustrated air stream-generating unit is united with a downward air stream 33. Since the liquid droplets 21 ejected from the liquid droplet ejection head 11 in the liquid droplet forming unit 10 is conveyed downward by not only gravity but also the downward air stream 33, it is possible to prevent the liquid droplets 21 ejected from decelerating by wind drag (air resistance). With this configuration, when liquid droplets 21 are continuously ejected, it is possible to prevent a liquid droplet 21 ejected in first (former liquid droplet) from decelerating by air resistance and prevent a liquid droplet 21 ejected afterward from catching up with the former liquid droplet 21 to unite with the former liquid droplet 21 to be a liquid droplet 21 having a large particle diameter, i.e. it is possible to prevent the liquid droplets 21 from having large particle diameters. Note that, as an air stream-generating unit, any of the following methods can be employed: a method in which an air blower is provided at an upstream portion to pressurize the inside of the chamber 31, and a method in which the inside of the chamber is sucked from the toner collection part 32 to thereby reduce the pressure. In the toner collection part 32, a rotational air stream generating device (not illustrated) is provided, which generates a rotational air stream rotating around an axis in parallel with a perpendicular direction. Further, the toner collection part 32 includes a toner reservoir part 35 which stores toner particles that have passed through a toner collection tube 34 in communication with the chamber 31 and then dried and solidified.

Next, a toner production process employed by the toner production apparatus according to the present embodiment will be outlined.

Figure 16:
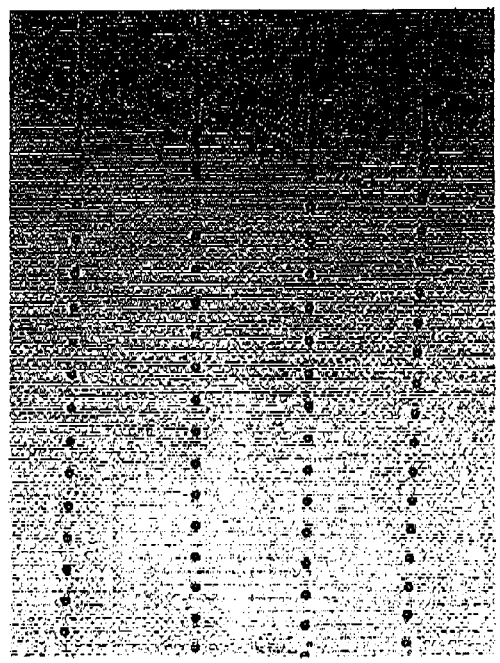
FIG. 16 is a diagram illustrating the appearance of actual liquid droplet ejection.

The toner composition liquid 14 housed in the material housing container 13 illustrated in FIG. 13 passes through the liquid feed path 16 by the liquid circulation pump 15 for circulating the toner composition liquid 14, flows into the liquid common feed path 17 in a liquid droplet forming unit 10 illustrated in FIG. 16, and then fed to the liquid column resonance-generating chamber 18 in the liquid droplet ejection head 11 illustrated in FIG. 14. Then, inside the liquid column resonance-generating chamber 18 which is filled with the toner composition liquid 14, a pressure distribution is formed by a liquid column resonance standing wave generated by the vibration generating unit 20. The liquid droplets 21 are ejected from the ejection holes 19 arranged in an area corresponding to an antinode of the standing wave through liquid column resonance, the antinode is a portion having a large amplitude in the liquid column resonance standing wave and high pressure variations. The "area corresponding to an antinode of the standing wave through liquid column resonance" means an area other than the node of the standing wave. Preferably, this area is an area having such a sufficiently large amplitude that the liquid is ejected by a change in pressure (pressure variation) of the standing wave, and more preferably, an area within a range of ±¼ wavelength from a position where the amplitude of the pressure standing wave becomes a maximum (a node in a speed standing wave) toward a position where the amplitude becomes a minimum (see FIG. 4). Even when a plurality of ejection holes are formed, it is possible to form substantially uniform liquid droplets from the respective ejection holes, provided that the ejection holes are formed in the area corresponding to an antinode of the standing wave. Further, the liquid droplets can be efficiently ejected, and clogging of ejection holes hardly occurs. Note that the toner composition liquid 14 passed thought the liquid common feed path 17 flows into a liquid return pipe 22 and then returned to the material housing container 13. When the amount of the toner composition liquid 14 in the liquid column resonance-generating chamber 18 is reduced by ejection of the liquid droplets 21, a suction force effected by the liquid column resonance standing wave in the liquid column resonance-generating chamber 18 works, and the flow rate of the toner composition liquid 14 fed from the liquid common feed path 17 is increased, and thereby the liquid column resonance-generating chamber 18 is refilled with the toner composition liquid 14. Upon refilling the liquid column resonance-generating chamber 18 with the toner composition liquid 14, the flow rate of the toner composition liquid 14 passing through the liquid common feed path 17 is restored. In the liquid feed path 16 and liquid return pipe 22, the flow of the toner composition liquid 14 circulating in the apparatus is formed again. Meanwhile, as illustrated in FIG. 13, the liquid droplets 21 ejected from the liquid droplet ejection head 11 in the liquid droplet forming unit 10 are conveyed downward by not only gravity but also the downward air stream 33 which is generated by an unillustrated air stream-generating unit and which passes through an air stream path 12 to be formed. Next, a spiral air stream is formed along a cone-shaped inside surface constituting the toner collection part 32 by a rotational air stream generated by an unillustrated rotational air stream generating device in the toner collection part 32 and the downward air stream 33, and toner particles flow on the spiral air stream and dried and solidified in a laminar state. The dried and solidified toner particles pass through a toner collection tube 34 to be housed in the toner reservoir part 35.

Note that the liquid column resonance-generating liquid chamber 18 in a liquid droplet ejection head 11 is formed to joint a frame formed of a material having such high rigidity that does not adversely influence upon the resonance frequency of the liquid, such as metal, ceramics, and silicon. Further, as illustrated in FIG. 14, a length L between the wall surfaces provided at both ends of the liquid column resonance-generating liquid chamber 18 in a longitudinal direction thereof is determined based on the above-mentioned liquid column resonance principle. Further, a width W of the liquid column resonance-generating liquid chamber 18 illustrated in FIG. 15 is preferably smaller than one-half the length L of the liquid column resonance-generating liquid chamber 18 so as not to give extra frequencies to liquid column resonance. Furthermore, to remarkably increase the productivity, the liquid column resonance-generating chamber 18 is preferably arranged in plurality with respect to one unit of the liquid droplet forming unit 10. The range of the number of the liquid column resonance-generating chamber 18 to be arranged is not particularly limited. However, one liquid droplet forming unit provided with 100 units to 2,000 units of the liquid column resonance-generating chamber 18 is most preferable because both the operability and productivity can be simultaneously achieved. A flow path for liquid feeding is continuously jointed for each liquid column resonance-generating liquid chamber, from the common feed path 17, and a plurality of the liquid column resonance-generating chambers 18 are in communicate with the liquid common feed path 17.

The vibration generating unit 20 in the liquid droplet ejection head 11 is not particularly limited, as long as it can drive at a given frequency. Such an aspect is desired in which a piezoelectric element is laminated to an elastic plate. The elastic plate constitutes part of the wall in the liquid column resonance-generating chamber so that the piezoelectric element conies into contact with the liquid. Examples of material for the elastic plate include piezoelectric ceramics such as lead zirconate titanate (PZT). Generally, since such a material has a small amount of displacement, in most cases, it is used in a laminate form. Besides, piezoelectric polymers such as polyvinylidene fluoride (PVDF), crystal, and single crystal such as $LiNbO_3$, $LiTaO_3$, $KNbO_3$ are exemplified. Furthermore, the vibration generating unit 20 is desirably disposed so that it can be individually controlled for each liquid column resonance chamber. In addition, the following configuration is desired: one material selected from those described above in a block shape is partially cut to fit the arrangement of the liquid column resonance-generating chamber, and respective liquid column resonance-generating chambers can be controlled individually, via an elastic plate.

Further, the aperture diameter of the ejection holes 19 is preferably within a range of 1 μm to 40 μm. When the aperture diameter is smaller than 1 μm, liquid droplets to be formed are very small, and thus it may be impossible to obtain a toner. In addition, when the toner contains solid fine particles of a pigment or the like as a toner component, there is a concern that clogging often occurs in the ejection holes 19, causing a reduction of productivity. When the aperture diameter is greater than 40 μm, the diameter of liquid droplets formed is increased. When the toner particles having a desired particle diameter of from 3 μm to 6 μm by drying and solidifying the liquid droplets, it is sometimes necessary to dilute the toner composition to a very dilute liquid with an organic solvent, and inconveniently, a large amount of dry energy is needed to obtain a certain amount of toner. As can be seen from FIG. 15, it is preferable to provide the ejection holes 19 in the liquid column resonance-generating chamber 18 in its width direction because a number of apertures of the ejections holes can be arranged therein, and thus the productivity is increased.

Using the principle of the liquid column resonance phenomenon ad described above, a liquid column resonance standing wave is formed in the liquid column resonance-generating chamber 18 illustrated in FIG. 14, and liquid droplets are continuously ejected in the ejection holes 19 arranged at part of the liquid column resonance-generating chamber 18. Note that when the ejection holes 19 are arranged at a position where the pressure of the standing wave varies at most, it is preferable in that the ejection efficiency is increased and driving with low voltage can be achieved. In addition, one ejection hole (the ejection hole 19) may be formed in the liquid column resonance-generating chamber 18, however, from the viewpoint of productivity, it is preferable that a plurality of the ejection holes 19 be formed. Specifically, the number of ejection holes is preferably 2 to 100. When the number of ejection holes exceeds 100, and when desired toner liquid droplets are to be formed from 100 holes of the ejection holes 19, there is a need to set a voltage applied to the vibration generating unit 20 high, and the behavior of the piezoelectric element serving as the vibration generating unit 20 becomes unstable. In addition, in the case where a plurality of the ejection holes are formed, a pitch between the toner ejection holes is preferably 20 μm or greater and equal to or smaller than the length of the liquid column resonance-generating liquid chamber. When the pitch is greater than 20 μm, there is a high probability that liquid droplets discharged from adjacent ejection holes collide with each other to be a large-size droplet, leading to degradation in particle size distribution of the toner.

Figure 17:
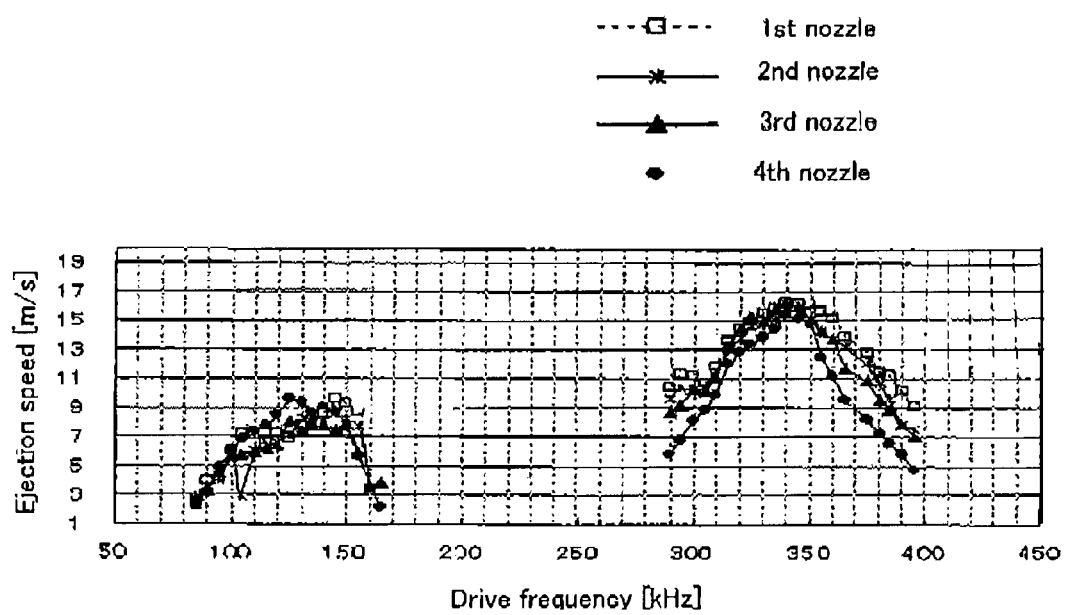
FIG. 17 is a characteristic graph illustrating a relationship between a drive frequency and a liquid droplet ejection speed.

Next, one example of a configuration where liquid droplets are actually ejected by the liquid column resonance phenomenon will be described. This example is a case where in FIG. 14, the length L between both ends of the liquid column resonance-generating chamber 18 in the longitudinal direction thereof is 1.85 mm, and a resonance mode: N=2. Toner ejection holes are arranged at a position corresponding to an antinode of a pressure standing wave based on the resonance mode of N=2, and the appearance of the ejection holes (a first ejection hole to a fourth ejection hole), from which liquid droplets were ejected with a drive frequency of a sine wave at 340 kHz, was photographed by laser shadowgraphy is illustrated in FIG. 16. As can be seen from FIG. 16, ejection of liquid droplets with extremely uniform in diameter and substantially uniform speed was achieved. FIG. 17 is a characteristic graph illustrating characteristics between a drive frequency and a liquid droplet ejection speed, when driving was performed with an amplitude sine wave having the same amplitude as a drive frequency of 290 kHz to 395 kHz. As can be seen from FIG. 17, the ejection speed of liquid droplets from each ejection hole is equalized in the vicinity of drive frequency of 340 kHz, in the first ejection hole to the fourth ejection hole, and a maximum ejection speed is achieved. From this characteristic result, it is understood that uniform ejection is achieved at a position corresponding to an antinode of the liquid column resonance standing wave with a drive frequency of 340 kHz, which is a second mode of liquid column resonance frequency. In addition, from the characteristic result in FIG. 17, it is understood that frequency characteristics of liquid column resonance standing waves that liquid droplets are not ejected during a period between a liquid droplet ejection speed peak at a drive frequency of 130 kHz (first mode) and a liquid droplet ejection speed peak at a drive frequency of 340 kHz (second mode) occurs in the liquid column resonance-generating liquid chamber.

Figure 18:
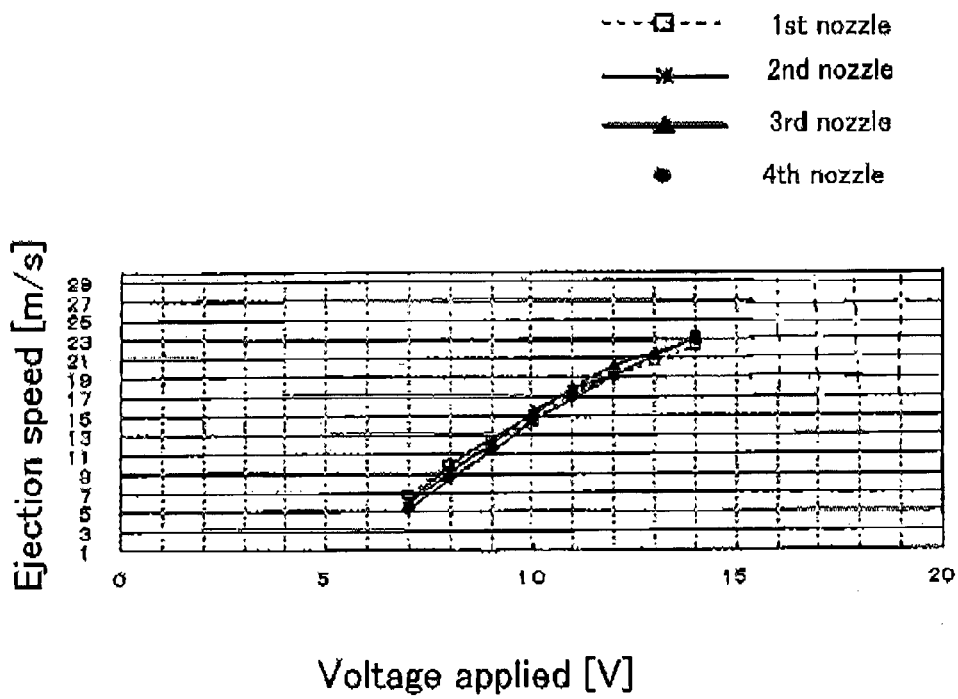
FIG. 18 is a characteristic graph illustrating a relationship between a voltage applied and an ejection speed in each ejection hole.
Figure 19:
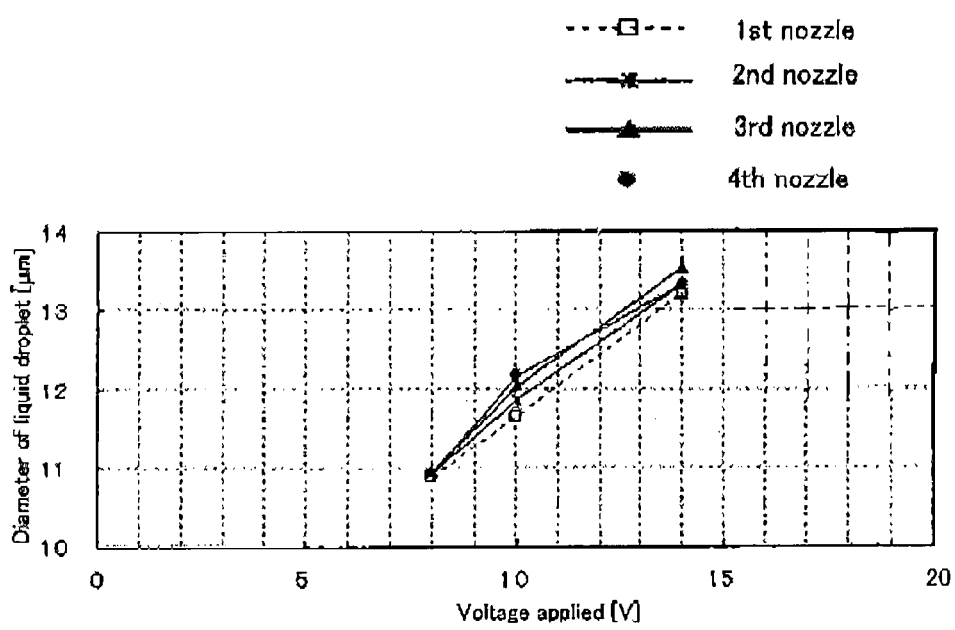
FIG. 19 is a characteristic graph illustrating a relationship between a voltage applied and a diameter of a liquid droplet.

FIG. 18 is a characteristic graph illustrating a relationship between a voltage applied and an ejection speed in each ejection hole. FIG. 19 is a characteristic graph illustrating a relationship between a voltage applied and a diameter of a liquid droplet. As can be seed from these figures, both the ejection speed and diameter of liquid droplets tend to monotonously increase relative to an increase in voltage. Since the ejection speed and the diameter of liquid droplets depend on the voltage applied, the diameter of liquid droplets can be adjusted according to the desired ejection speed or the desired diameter of toner particles can be controlled by adjusting a voltage applied to the piezoelectric element.

Hereinbelow, examples (Examples 15 to 27) relating to a numerical aperture, pattern and arrangement of ejection holes of a liquid ejection head in a toner production apparatus according to the present embodiment will be described. Note that the present invention is not limited to the disclosed Examples. By actually making a search for ejection frequencies in the following Examples 15 to 27, the resonance frequency can be known. A toner composition liquid was ejected under different conditions to obtain toner base particles, followed by addition of external additives, to thereby obtain a toner. The evaluation results of the toner are also described.

A toner relating to the present invention will be described as an example of fine particles.

The toner according to the present invention is a toner produced by a toner production method to which the present invention is applied, as in the case of the toner production apparatus according to the present embodiment described above. With this, a toner having a mono-dispersed particle size distribution can be obtained.

Specifically, the particle size distribution (weight average particle diameter/number average particle diameter) of the toner is preferably within a range of 1.00 to 1.15, and more preferably within a range of 1.00 to 1.05. The weight average particle diameter is preferably within a range of 1 μm to 20 μm, and more preferably within a range of 0 μm to 10 μm.

Next, toner materials usable in the present invention will be described. Firstly, as disclosed above, a toner composition liquid dispersed or dissolved in a solvent will be described.

As toner materials, the same ones as used in a conventional electrophotographic toner can be used. In other words, a toner binder (e.g., a styrene acryl-based resin, polyester-based resin, polyol-based resin, and epoxy-based resin) is dissolved in each individual organic solvent, a colorant is dispersed, a releasing agent is dispersed or dissolved in the organic solvent, and the resulting dispersion or solution is dried and solidified as microscopic liquid droplets by the toner production method to thereby make it possible to produce intended toner particles.

[Toner Material]

The toner materials include at least a resin, a colorant and wax, and when necessary, include a charge controlling agent, additives and other components.

[Resin]

As the resin, at least a binder resin is exemplified.

The binder resin is not particularly limited, and may be suitably selected from commonly used resins for use. Examples of the binder resin include vinyl polymers such as a styrene-based monomer, an acrylic-based monomer and a methacrylic-based monomer, copolymers of at least one of the monomers, polyester-based polymers, polyol resins, phenol resins, silicone resins, polyurethane resins, polyamide resins, furan resins, epoxy resins, xylene resins, terpene resins, coumaroneindene resins, polycarbonate resins, and petroleum-based resins.

Examples of the styrene-based monomer include styrenes such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene or derivatives thereof.

Examples of the acrylic-based monomer include an acrylic acid or acrylic acids such as methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate or esters thereof.

Examples of the methacrylic-based monomer include a methacrylic acid or methacrylic acids such as methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate or esters thereof.

As other monomers forming the vinyl polymer or copolymer, the following monomers (1) to (18) are exemplified. Specific examples thereof are (1) monoolefins (e.g., ethylene, propylene, butylene, and isobutylene); (2) polyenes (e.g., butadiene, and isoprene); (3) halogenated vinyls (e.g., vinyl chloride, vinylidene chloride, vinyl bromide, and vinyl fluoride); (4) vinyl esters (e.g., vinyl acetate, vinyl propionate, and vinyl benzoate); (5) vinyl ethers (e.g., vinyl methyl ether, vinyl ethyl ether, and vinyl isobutyl ether); (6) vinyl ketones (e.g., vinyl methyl ketone, vinyl hexyl ketone, and methyl isopropenyl ketone); (7) N-vinyl compounds (e.g., N-vinyl pyrrole, N-vinyl carbazole, N-vinyl indole, and N-vinyl pyrolidone); (8) vinyl naphthalines; (9) acrylic acid or methacrylic acid derivatives (e.g., acrylonitrile, methacrylonitrile, and acrylamide); (10) unsaturated dibasic acids (e.g., maleic acid, citraconic acid, itaconic acid, alkenylsuccinic acid, fumaric acid, and mesaconic acid); (11) unsaturated dibasic anhydrides (e.g., maleic anhydride, citraconic anhydride, itaconic anhydride, and alkenylsuccinic anhydride); (12) unsaturated dibasic acid monoesters (e.g., maleic acid monomethyl ester, maleic acid monoethyl ester, maleic acid monobutyl ester, citraconic acid monomethyl ester, citraconic acid monoethyl ester, citraconic acid monobutyl ester, itaconic acid monomethyl ester, alkenylsuccinic acid monomethyl ester, fumaric acid monomethyl ester, and mesaconic acid monomethyl ester); (13) unsaturated dibasic esters (e.g., dimethyl maleate, and dimethyl fumarate); (14) $\alpha,\beta$-unsaturated acids (e.g., crotonic acid, and cinnamic acid); (15) $\alpha,\beta$-unsaturated anhydrides (e.g., crotonic anhydride, and cinnamic anhydride); (16) anhydrides between the $\alpha,\beta$-unsaturated and a lower fatty acid, alkenyl malonic acid, alkenyl glutaric acid, alkenyl adipic acid, acid anhydrides thereof, and monomers having a carboxyl group such as monoesters thereof; (17) acrylic acid or methacrylic acid hydroxy alkyl esters (e.g., 2-hydroxyethyl acrylate, 2-hydroxyethyl methacrylate, and 2-hydroxypropyl methacrylate); and (18) monomers having a hydroxy group (e.g., 4-(1-hydroxy-1-methylbutyl)styrene, and 4-(1-hydroxy-1-methylhexyl)styrene).

In a toner according to the present invention, the vinyl polymer as the binder resin may have a structure crosslinked by a crosslinking agent having two or more vinyl groups. Examples of the crosslinking agent used in this case, as aromatic divinyl compounds, include divinyl benzene, and divinyl naphthalene; as diacrylate compounds each linked by an alkyl chain, include ethylene glycol diacrylate, 1,3-butylene glycol diacrylate, 1,4-butanediol diacrylate, 1,5-pentane diol diacrylate, 1,6-hexanediol diacrylate, neopentyl glycol diacrylate, and compounds where acrylates of these compounds are replaced by methacrylates; and, as diacrylate compounds each linked by an alkyl chain containing an ether bond, include diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds where acrylates of these compounds are replaced by methacrylates.

As the monomer forming the vinyl polymer or copolymer, there may be also exemplified diacrylate compounds and dimethacrylate compounds each linked by a chain containing an aromatic group and an ether bond. As polyester type diacrylates, for example, MANDA (product name, produced by Nippon Kayaku Co., Ltd.) is exemplified.

Examples of polyfunctional crosslinking agents include pentaerythritol acrylate, trimethylolethane triacrylate, trimethylolpropane triacrylate, tetramethylolmethane tetraacrylate, oligoester acrylate, compounds where acrylates of these compounds are replaced by methacrylates, triallyl cyanurate, and triallyl trimellitate.

These crosslinking agents are preferably used in an amount of 0.01 parts by mass to 10 parts by mass, more preferably in an amount of 0.03 parts by mass to 5 parts by mass relative to 100 parts by mass of the other monomer components. Among these crosslinkable monomers, aromatic divinyl compounds (particularly, divinyl benzene), and diacrylate compounds linked by a linking chain containing an aromatic group and one ether bond are preferably exemplified. Among these monomers, preferred is a combination of monomers so as to be a styrene-based polymer or a styrene acrylic-based copolymer.

Examples of a polymerization initiator for use, in production of the vinyl polymer or vinyl copolymer of the present invention include 2,2'-Azobisisobutyronitrile, 2,2'-Azobis(4-methoxy-2,4-dimethylvaleronitrile), 2,2'-Azobis(2,4-dimethylvaleronitrile), 2,2'-Azobis(2-methylbutyronitrile), dimethyl-2,2'-azobisisobutylate, 1,1'-azobis(1-cyclohexanecarbonitrile), 2-(carbamoylazo)-isobutyronitrile, 2,2'-Azobis(2,4,4-trimethylpentane), 2-phenylazo-2',4'-dimethyl-4'-methoxyvaleronitrile, 2,2'-Azobis(2-methylpropane), ketone peroxides (e.g., methylethylketone peroxide, acetylacetone peroxide, and cyclohexanone peroxide), 2,2-Bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, di-cumyl peroxide, α-(tert-buthylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, diethoxyisopropylperoxy dicarbonate, di(3-methyl-3-methoxybutyl)peroxycarbonate, acetylcyclohexylsulfonyl peroxide, tert-butylperoxy acetate, tert-butylperoxyisobutylate, tert-butylperoxy-2-ethylhexylate, tert-butylperoxylaurate, tert-butyl-oxybenzoate, tert-butylperoxyisopropyl carbonate, di-tert-butylperoxy isophthalate, tert-butylperoxyallyl carbonate, isoamylperoxy-2-ethylhexanoate, di-tert-butylperoxyhexahydro phthalate, and tert-butylperoxy azelate.

When the binder resin is a styrene acrylic-based resin, it is preferable, from the standpoint of fixability, offset resistance and storage stability, for the resin to have a molecular weight distribution by way of GPC, which is soluble in a tetrahydrofuran (THF) (i.e., tetrahydrofuran (THF)-soluble resin fraction), wherein at least one peak is present within a region of a molecular weight of 3,000 to 50,000 (by number average molecular weight conversion), and at least one peak is present within a region of a molecular weight of 100,000 or more. In addition, as the THF-soluble resin fraction), a binder resin containing 50% to 90% of a resin component having a molecular weight of 100,000 or less is preferable; a binder resin having a main peak within a region of a molecular weight of 6,000 to 30,000 is more preferable; and a binder resin having a main peak in a region of a molecular weight of 5,000 to 20,000 is most preferable.

As an acid value when the binder resin a vinyl polymer, such as a styrene-acrylic-based resin, it is preferable to fall into a range of 0.1 mg KOH/g to 100 mg KOH/g, with a range of 0.1 mg KOH/g to 70 mg KOH/g being more preferable thereupon, and a range of 0.1 mg KOH/g to 50 mg KOH/g being most preferable thereupon.

As a monomer constituting the polyester-based polymer, the following are exemplified.

There may be exemplified, as a dihydric alcohol component, ethylene glycol, propylene glycol, 1,3-butane diol, 1,4-butane diol, 2,3-butane diol, diethylene glycol, triethylene glycol, 1,5-pentane diol, 1,6-hexane diol, neopentyl glycol, 2-ethyl-1,3-hexane diol; hydrogenated bisphenol A, or such as a diol that is obtained by compounding a cyclic ether, such as ethylene oxide or propylene oxide with hydrogenated bisphenol A or bisphenol A.

It is preferable to combine the dihydric alcohol with a trihydric or higher polyhydric alcohol in order to cause the polyester resin to form a cross linkage.

Examples of the trihydric or higher polyhydric alcohol include sorbitol, 1,2,3,6-hexane tetrol, 1,4-sorbitan, pentaerythritol, an instance thereof being dipentaerythritol or tripentaerythritol, 1,2,4-butane triol, 1,2,5-pentatriol, glycerol, 2-methylpropane triol, 2-methyl-1,2,4-butane triol, trimethylol ethane, trimethylol propane, or 1,3,5-trihydroxy benzene.

Examples of an acid component forming the polyester-based polymer include a benzene dicarbonate such as phthalic acid, isophthalic acid, or terephthalic acid, as well as the anhydrides thereof, an alkyl dicarbonate such as succinic acid, adipic acid, sebacic acid, or azelaic acid, as well as the anhydrides thereof, an unsaturated dibasic acid, such as maleic acid, citraconic acid, itaconic acid, alkenyl succinic acid, fumaric acid, or mesaconic acid, as well as an unsaturated dibasic anhydride, such as maleic anhydride, citraconic anhydride, itaconic anhydride, or alkenyl succinic anhydride. Examples of trihydric or higher polyhydric carbonic acid component include trimellitic acid, pyromellitic acid, 1,2,4-benzene tricarbonate, 1,2,6-benzene tricarbonate, 2,5,7-naphthalene tricarbonate, 1,2,4-naphthalene tricarbonate, 1,2,4-butane tricarbonate, 1,2,5-hexane tricarbonate, 1,3-dicarboxy-2-methyl-2-methylene carboxy propane, tetra(methylene carboxy)methane, 1,2,7,8-octane tetracarbonate, or Empol trimer, in addition to the anhydrides or partial lower alkyl esters thereof.

When the binding resin is the polyester-based resin, it is preferable, from the standpoint of fixability, offset resistance and storage stability, for the resin to have a molecular weight distribution by way of GPC, which is soluble in a tetrahydrofuran (THF) (i.e., tetrahydrofuran (THF)-soluble resin component), wherein at least one peak is present within a region of a molecular weight of 3,000 to 50,000. In addition, as the THF-soluble resin fraction), a binder resin containing 60% to 100% of a resin component having a molecular weight of 100,000 or less is preferable; a binder resin having at least one peak within a region of a molecular weight of 5,000 to 20,000 is more preferable.

As an acid value when the binder resin is a polyester resin, it is preferable to fall into a range of 0.1 mg KOH/g to 100 mg KOH/g, with a range of 0.1 mg KOH/g to 70 mg KOH/g being more preferable thereupon, and a range of 0.1 mg KOH/g to 50 mg KOH/g being most preferable thereupon.

In the present invention, the molecular weight distribution of the binder resin is measured by gel permeation chromatography (GPC) wherein the THF is the solvent.

As the binder resin usable in the present invention, it is also possible to use, from at least one of the vinyl polymer component and the polyester-based resin component, a resin containing a monomer component capable of reacting with both of the resin component. Examples of the monomer which constitutes the polyester-based resin component and is reactive with a vinyl polymer include an unsaturated dicarboxylic acid, such as phthalic acid, maleic acid citraconic acid, and itaconic acid, as well as the anhydrides thereof. Examples of the monomer which constitutes the vinyl polymer component include those having a carboxyl group or a hydroxy group, as well as an acrylic acid or methacrylamide acid ester.

In addition, when a polyester polymer and a vinyl polymer is combined with another binding resin, it is preferable for the acid value of the binder resin overall to fall into a range of 0.1 mg KOH/g to 50 mg KOH/g, and it is preferable to use these binder resins in an amount of 60% by mass or more.

According to the present invention, the acid value of the binder resin component of the toner composition material is derived by a method that is described hereinafter. The basic operation thereof is performed in accordance with JIS K-0070.

(1) Either prepare the material to be examined by either removing an additive other than the binder resin, i.e., the polymer component, or obtain the acid value and a weight by component of the component other than the binder resin and the cross linked binder resin prior to commencement. An amount of a powdered form of the material to be examined of between 0.5 g and 2.0 g is precisely weighed, and a weight of the polymer component of the material thus weighed is treated as "Wg". As an instance thereof, when measuring the acid value of the binder resin from the toner, the acid value and the weight by component of such as the coloring agent or the magnetic substance is measured separately from one another, and the acid value of the binder resin derived by taking the total of the acid values of the components of the binder resin.

(2) The material to be tested is placed in a 300 mL beaker, and dissolved by an addition into the beaker of 150 mL of a 4:1 (volume ratio) mixture of toluene/ethanol.

(3) A KOH ethanol solvent at 0.1 mol/L is titrated using a is potentiometric titration device.

(4) The following Equation is used to calculate the acid value of the binder resin, wherein a weight of the KOH solvent that is used in the present circumstance is treated as S (mL), the weight of the KOH solvent that is used in when another empty measurement is made simultaneously is treated as B (mL), and f is a KOH factor thereupon:

Acid value [mgKOH/g]=[(S−B)×f×5.61]/W

The binder resin for toner and the composition containing the binder resin preferably has a glass transition temperature (Tg) of 35° C. to 80° C., and more preferably has a Tg of 40° C. to 75° C., from the standpoint of storage stability of the resulting toner. When the Tg is lower than 35° C., the toner is liable to degrade in a high-temperature atmosphere, and the toner may be liable to cause offset when being fixed. When the Tg is higher than 80° C., the fixability may degrade.

Examples of the magnetic substance usable in the present invention include (1) a magnetic iron oxide, such as magnetite, maghemite, or ferrite, as well as an iron oxide that includes another metallic oxide; (2) a metal such as iron, cobalt, or nickel, as well as an alloy of these metals with a metal such as aluminum, cobalt, copper, lead, magnesium, tin, zinc, antimony, beryllium, bismuth, cadmium, calcium manganese, selenium, titanium, tungsten, or vanadium; and (3) mixtures thereof.

Specific examples of the magnetic substance include $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. These may be used alone or in combination. Among these magnetic substances, a fine grain powder of iron oxide black or $\gamma$-diiron trioxide is particularly preferable, for example.

In addition, it is also possible to use a magnetic iron oxide which contains a different element, such as magnetite, maghemite, and ferrite, or a mixture thereof. Examples of the different element which is used in the magnetic iron oxide include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, and gallium. As a preferable different element to be used in the magnetic iron oxide, it is selected from among magnesium, aluminum, silicon, phosphorus, and zirconium. The different element may be incorporated into an iron oxide crystal lattice, to be incorporated into the iron oxide as an oxide, or to be present upon a surface either as an oxide or a hydroxide. It is preferable for the different element to be used in the magnetic iron oxide to be contained as the oxide.

It is possible to incorporate the different element to be used in the magnetic iron oxide into a particle by mixing a halogen of each respective different element when producing the magnetic substance, and adjusting a pH thereupon. In addition, it is possible to cause the different element to precipitate upon the surface of the particle, by either adjusting the pH after the production of the magnetic particle, or by adding a halogen of each respective element and adjusting the pH thereafter.

The use amount of the magnetic substance is preferably 10 parts by mass to 200 parts by mass, and more preferably 20 parts by mass to 150 parts by mass, relative to 100 parts by mass of the binder resin. The number average particle diameter of the magnetic substance is preferably 0.1 μm to 2 μm, and more preferably 0.1 μm to 0.5 μm. It is possible to derive the number-average particle diameter of the magnetic substances by using a digitizer etc. to measure an enlarged photograph that is captured with a transmission electron microscope.

In addition, as a magnetism property of the magnetic substance, it would be preferable for the magnetism characteristic to fall into a coercive force range of 20 oersted to 150 oersted, a saturation magnetization range of 50 emu/g to 200 emu/g, and a residual magnetization range of 2 emu/g to 20 emu/g, for each of a respective impression of 10K oersted.

The magnetic substance may also be used as a colorant.

[Colorant]

The colorant is not particularly limited and may be suitably selected from among commonly used resins for use. Examples of the colorant include carbon black, nigrosine dye, iron black, naphthol yellow S, Hansa yellow (10G, 5G, G), cadmium yellow, yellow iron oxide, ocher, yellow lead, titanium yellow, Polyazo yellow, oil yellow, Hansa yellow (GR, A, RN, R), pigment yellow L, benzidine yellow (G, GR), permanent yellow (NCG), Vulcan fast yellow (5G, R), Tartrazine Lake quinoline yellow Lake, Anthrazane yellow BGL, isoindolinone yellow, burnt ocher, cinnabar, lead vermillion, cadmium red, cadmium mercury red, antimony vermillion, permanent red 4R, para red, parachlororthonitro aniline red, Lithol fast scarlet G, brilliant fast scarlet, brilliant carmine BS, permanent red (F2R, F4R, FRL, FRLL, F4RH), fast scarlet VD, Vulcan fast rubine B, brilliant scarlet G, Lithol rubine GX, permanent red F5R, brilliant carmine 6B, pigment scarlet 3B, Bordeaux 5B, toluidine maroon, permanent Bordeaux F2K, Hello Bordeaux BL, Bordeaux 10B, Bon maroon light, Bon maroon medium, eosin Lake, rhodamine Lake B, rhodamine Lake Y, alizarin Lake, thioindigo red B, thioindigo maroon, oil red, Quinacridone red, pyrazolone red, Polyazo red, chromium vermillion, benzidine orange, perinone orange, oil orange, cobalt blue, cerulean blue, alkali blue Lake, peacock blue Lake, Victoria blue Lake, non-metallic phthalocyanine blue, phthalocyanine blue, fast sky blue, indanthrene blue (RS, BC), indigo, lapis lazuli, ultramarine, anthraquinone blue, fast violet B, methyl violet Lake, cobalt purple, manganese purple, dioxane violet, anthraquinone violet, chromium green, zinc green, chromium oxide, viridian, emerald green, pigment green B, naphthol green B, green gold, acid green Lake, malachite green Lake, phthalocyanine green, anthraquinone green, titanium oxide, zinc pink, or Litho Bon, and mixtures thereof.

The amount of the colorant contained in the toner is preferably 1% by mass to 15% by mass, and more preferably 3% by mass to 10% by mass.

A colorant for use in a toner according to the present invention may also be used as a masterbatch which is compounded with the resin. As an instance of the binder resin that is used in the production of the masterbatch, or that is mixed and kneaded with the masterbatch, in addition to both the modified and unmodified polyester resins described above, there may be exemplified styrene, such as polystyrene, poly p-chlorostyrene, or polyvinyl toluene, as well as a polymer of a substitution product of these styrenes; a styrene-based copolymer such as styrene-p-chlorostyrene copolymer, styrene-propylene copolymer, styrene-vinyl toluene copolymer, styrene-vinyl naphthalene copolymer, styrene methylacrylate copolymer, styrene-ethylacrylate copolymer, styrene-butylacrylate copolymer, styrene-octylacrylate copolymer, styrene-methylmethacrylate copolymer, styrene-ethylmethacrylate copolymer, styrene-butylmethacrylate copolymer, styrene-α-methylchlormethacrylate copolymer, styrene-acrylonitrile copolymer, styrene-vinyl methylketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylate resin, rosin, modified rosin, terpene resin, aliphatic or alicyclic hydrocarbon resin, aromatic petroleum resin, paraffin chloride, and paraffin wax. These may be used alone or in combination.

It is possible to obtain the master batch by imparting a strong shearing force to the resin and the colorant for the master batch, thereby compounding and mixing the resin and the colorant. In such a circumstance, it is possible to employ an organic solvent in order to increase an interaction between the colorant and the resin. In addition, a so-called flashing method, wherein a water-based paste, which includes the colorant in water, is compounded and mixed with the resin and the organic solvent, the colorant is caused to transition to the resin side of the mixture, and the water component and the organic solvent component are removed, is ideal, owing to the fact that a wet cake of the colorant may be employed as is, without needing to be desiccated. A strong shearing dispersal apparatus, such as a triple roll mill, would be ideal for the compounding and mixing of the colorant, the resin, and the organic solvent.

The use amount of the masterbatch is preferably 0.1 parts by mass to 20 parts by mass relative to 100 parts by mass of the binder resin.

In addition, it is preferable for the resin of the master batch to have an acid value of 30 mg KOH/g or lower, an amine value that falls into a range of 1 to 100, and to be used with the colorant dispersed thereupon, with an acid value of 20 mg KOH/g or lower, an amine value that falls into a range of 10 to 50, and to be used with the colorant dispersed thereupon being more preferable. When the acid value is higher than 30 mg KOH/g, the chargeability of the masterbatch degrades under a high moisture condition, and thus, the pigment dispersibility to the masterbatch may be insufficient. In addition, the pigment dispersibility to the masterbatch may also be insufficient when the amine value is less than 1 or the amine value is greater than 100. Note that it is possible to measure the acid value by a method that is specified in JIS K-0070, and that it is possible to measure the amine value by a method described in JIS K-7237.

In addition, from the standpoint of the pigment dispersibility, the dispersant preferably has a strong compatibility with the binder resin, and as a concrete commercially available dispersant having the strong compatibility with the binder resin, there may be exemplified AJISPER PB821 and AJISPER PB822, produced by Ajinomoto Fine-Techno Co., Inc., DISPERBYK-2001, produced by Byk Additives & Instruments, and EFKA-4010, produced by EPKA Additives (a member of Ciba Specialty Chemicals).

It is preferable for the dispersant to add into the toner at a proportion that falls into a range of 0.1% by mass to 10% by mass relative to the colorant. When the proportion of the combination of the dispersant with respect to the colorant is less than 0.1% by mass, the pigment dispersibility may be insufficient, whereas, when the proportion of the combination of the dispersant with respect to the colorant is greater than 10% by mass, the chargeability may degrade under a high moisture condition.

The weight average molecular weight of the dispersant preferably falls into a range of 500 to 100,000, a main peak, i.e., a local maximum, of the molecular weight, with respect to a styrene conversion mass as determined by the gel permeation chromatography, and it is more preferable, from the standpoint of the pigment dispersibility, the weight-average molecular weight of the dispersant to fall into a range of 3,000 and 100,000, with a range of 5,000 to 50,000 being particularly preferable, and a range of 5,000 to 30,000 being most preferable. When the molecular weight is less than 500, the polarity may increase, and the colorant dispersibility may degrade, whereas, when the molecular weight is greater than 100,000, the affinity of the dispersant with the solvent may increase, and the colorant dispersibility may degrade.

The addition amount of the dispersant is preferably 1 part by mass to 200 parts by mass, and more preferably 5 parts by mass to 80 parts by mass, relative to 100 parts by mass of the colorant. When the addition amount of the dispersant is less than 1 part by mass, the dispersibility may decrease, whereas, when it is more than 200 parts by mass, the chargeability made degrade.

<Wax>

The toner composition liquid for use in the present invention contains a wax together with the binder resin and the colorant.

The wax is not particularly limited and may be suitably selected from among commonly used ones for use. Examples of the wax include an aliphatic hydrocarbon wax, such as low molecular weight polyethylene, low molecular weight polypropylene, a polyolefin wax, microcrystalline wax, paraffin wax, or Sasol wax, an oxide of an aliphatic hydrocarbon wax, such as polyethylene oxide wax, or a block copolymer of these waxes, a plant derived wax such as candelilla wax, carnauba wax, vegetable wax, or jojoba wax, an animal product wax such as beeswax, lanolin, or spermaceti, a mineral based wax such as Ozokerite, ceresin, or petrolatum, or a type of wax that treats a fatty acid ester as a primary component, such as montanic acid ester wax or castor wax. In addition, a partially or totally deoxidized fatty acid ester wax, such as deoxidized carnauba wax may also be exemplified.

Furthermore, as the wax that is used together with the binder resin and the colorant, there may also be exemplified a saturated linear chain fatty acid, such as palmitic acid, stearic acid, montanic acid, or a linear chain alkyl carbonate further containing a linear chain alkyl, an unsaturated fatty acid such as eleostearic acid or parinaric acid, a saturated alcohol such as stearyl alcohol, eicosyl alcohol, behenyl alcohol, carnaubyl alcohol, seryl alcohol, melissyl alcohol, or a long chain alkyl alcohol, a polyvalent alcohol such as sorbitol, a fatty acid amide such as linoleate amide, olefiate acid amide, or laurate amide, a saturated fatty acid bisamide such as methylene biscapriate amide, ethylene-bis laurate amide, hexamethylene-bistearate, an unsaturated fatty acid amide such as ethylene bisoleate amide, hexamethylene bisoleate amide, N,N'-dioleal adipate amide, or N,N'-dioleal sebacate amide, an aromatic bisamide such as m-xylene bistearate amide, N,N-distearyl isophthalate amide, a fatty acid metallic salt such as calcium stearate, calcium laurate, zinc stearate, or magnesium stearate, a wax that is grafted by employing a vinyl monomer, such as styrene or acrylate upon a aliphatic hydrocarbon wax, a compound of a fatty acid and a partial ester polyvalent alcohol, such as behenic acid monoglyceride, or a methyl ester compound, containing a hydroxyl group, that is obtained by adding a hydrogen to a vegetable derived oil or fat.

More preferred examples of the wax include a polyolefin that is formed by radical polymerization of an olefin under a high pressure, a polyolefin that is obtained when polymerizing a high molecular weight polyolefin by refining a low molecular weight by-product of the polymerizing of the high molecular weight polyolefin, a polyolefin that is polymerized by employing a medium at low pressure, such as a Ziegler medium or a metallocene medium, a polyolefin that is polymerized by employing a radiation, an electromagnetic wave, or a light, a low molecular weight polyolefin that is obtained by thermally cracking a high molecular weight polyolefin, paraffin wax, microcrystalline wax, Fischer-Tropsch wax, a synthetic hydrocarbon wax that is synthesized by such as Zintol method, Hydrocol method, or AG method, a synthetic wax that treats a single carbon compound as a monomer, a hydrocarbon wax containing a functional group such as a hydroxide group or a carboxyl group, a compound of a hydrocarbon wax with a hydrocarbon wax containing a functional group, or a modified wax, treating the waxes described herein as a matrix, whereupon a vinyl monomer, such as styrene, maleic acid ester, acrylate, methacrylate, or maleic acid anhydride is grafted.

In addition, it is preferable for the waxes described herein to be employed subsequent to employing a press sweat technique, a solvent technique, a recrystallization technique, a vacuum distillation technique, a supercritical gas extraction technique, or a solution crystallization technique to sharpen the molecular weight distribution, as well as to remove a low molecular weight solid fatty acid, a low molecular weight solid alcohol, a low molecular weight solid compound, or another such impurity thereupon.

The melting point of the wax is preferably, in order to achieve a balance between fixability and offset resistance, 70° C. to 140° C., and more preferably 70° C. to 120° C. When the melting point is lower than 70° C., the blocking resistance may degrade, whereas, when it is higher than 140° C., the offset resistance effect may be hardly exhibited.

In addition, combining two or more different types of wax will allow simultaneously exhibiting a plasticizing effect and a release effect, which are effects of the wax. As an example of the type of wax having the plasticizing effect, there may be exemplified a wax having a low melting point, or a structure further having a branched or a polar group with respect to a molecular structure of the wax. As an example of the type of wax having the plasticizing effect, there may be exemplified a wax having a low melting point, or a structure further having a branched or a polar group with respect to a molecular structure of the wax. As an example of the type of wax having the release effect, there may be exemplified a wax having a high melting point, or, as a molecular structure of the wax, a wax having a linear chain structure or a non-polar type wax which does not include a functional group. As a use example of a combination wax, there may be exemplified a combination wherein a difference between the melting points of two or more different kinds of wax falls into a range of 10° C. to 100° C., or a combination of polyolefin and a modified polyolefin that is grafted upon the polyolefin.

When selecting the two types of wax, in a circumstance wherein the two types of wax contain a similar structure, the wax having a relatively lower melting point exhibits the plasticizing effect, whereas the wax having a relatively higher melting point exhibits the release effect. In such a circumstance, a division of the functions between the two types of wax is exhibited in an effectual manner when the difference between the melting points falls within a range of 10° C. to 100° C. When the difference between the melting points is lower than 10° C., the effect of the division of the functions may not be exhibited, whereas when the difference between the melting points is higher than 100° C., a performance of an emphasis of the functions of the two types of wax by way of an interaction may be impeded. In such a circumstance, given that a trend toward an case in the effecting the division of the functions is present, at least one of the waxes preferably has a melting point of 70° C. to 120° C., with a range of 70° C. to 100° C. being more preferable.

Within the wax thus formed, a modified wax component having a branching structure or a functional group such as a polar group, thereby differing relatively from the primary component of the compound wax exhibits the plasticizing effect, whereas the invariant, i.e., linear, wax component that has a linear chain structure or that is nonpolar, having no functional group, exhibits the release effect. As a preferable wax combination, there may be exemplified a combination of a polyethylene homopolymer or copolymer that treats ethylene as the primary component of the homopolymer or copolymer with a polyolefin homopolymer or copolymer that treats an olefin other than ethylene as the primary component of the homopolymer or copolymer, a combination of a polyolefin and a grafted metamorphic polyolefin, a combination of an alcohol wax, a fatty acid wax, or an ester wax with a hydrocarbon wax, a combination of a Fischer-Tropsch wax or a polyolefin wax with a paraffin wax or a microcrystalline wax, a combination of a Fischer-Tropsch wax with a polyolefin wax, a combination of a paraffin wax with a microcrystalline wax, or a combination of carnauba wax, candelilla wax, rice wax, or montanic wax with a hydrocarbon wax.

Regardless of the combination that is chosen, it is easy to achieve a balance between the storage stability and the fixability of the toner, and thus, with respect to an endothermic peak that is observed with a DSC measurement of the toner, it is preferable for a maximum peak temperature to be present within a region of 70° C. to 110° C., with a region of 70° C. to 110° C. having the maximum peak temperature being more preferable.

The total amount of the waxes is preferably 0.2 parts by mass to 20 parts by mass and more preferably 0.5 part by mass to 10 parts by mass relative to 100 parts by mass of the binder resin.

According to the present invention, the maximum peak temperature of the endothermic peak of the wax, which is measured with the DSC, is presumed to be the melting point of the wax.

As a DSC measurement instrument of the wax or the toner, it is preferable to perform the measurement with a differential calorimetry in an intra-cooler power compensation type with high precision. A method of the measurement is performed in accordance with ASTM D3418-82. A DSC curve that is employed according to the present invention is employed, after the temperature of the substance to be measured is caused to increase and decrease through a single cycle, and a history taken thereupon, when the temperature of the substance is measured upon being caused to increase at a speed of 10° C./rain.

<Flowability Improver>

It is also be permissible to add a flowability improver to the toner according to the present invention. The flowability improver improves the flowability of the toner, i.e., makes the toner more liquid, upon an application of the flowability improver to the surface of the toner.

As an example of the flowability improver, there may be exemplified carbon black, a fluorine resin powder such as fluoride vinylidene fine grain powder or polytetrafluoroethylene fine grain powder, a fine grain powder silica such as a wet process silica or a dry process silica, a fine grain powder titanium oxide, a fine grain powder aluminum oxide, a processed silica, a processed titanium oxide, or a processed aluminum oxide, whereupon a surface processing of the silica, the titanium oxide, or the aluminum oxide, is carried out by way of a silane coupling agent, a titanium coupling agent, or a silicon oil. From among these substances, the fine grain powder silica, the fine grain powder titanium oxide, or the fine grain powder aluminum oxide would be preferable, and moreover, the processed silica whereupon the surface processing of the silica by way of the silane coupling agent or the silicon oil is further preferable.

The particle diameter of the flowability improver preferably, as an average primary particle diameter falls into a range of 0.001 μm to 2 μm, with a range of 0.002 μm to 0.2 μm being more preferable.

The fine particle powder silica is a fine particle body that is generated by way of a gaseous phase oxidation of a silicon halide, which is referred to as dry process silica or a fumed silica.

As an instance of a commercially available silica fine powder that is generated by the gaseous phase oxidation of the silicon halide, there may be exemplified AEROSIL, AEROSIL-130, AEROSIL-300, AEROSIL-380, AEROSIL-TT600, AEROSIL-MOX170, AEROSIL-MOX80, or AEROSIL-COK84, which are products of Nippon Aerosil; Ca-O-SiL-M-5, Ca-O-SiL-MS-7, Ca-O-SiL-MS-75, Ca-O-SiL-HS-6, or Ca-O-SiL-EH-5, which are products of Cabot Corporation; WACKER HDK-N20 V15, WACKER HDK-N20E, WACKER HDK-T30, OR WACKER HDK-T40, which are products of Waeker-Chiemie GmbH; D-C Fine Silica, a product of Dow Corning Toray Co., Ltd.; or FRANSOL, a product of Fransil Co., Ltd.

Furthermore, it would be more preferable still for the silica fine grain body that is generated by the gaseous phase oxidation of the substance containing silicon halide to include a processed silica fine grain body whereupon a hydrophobicity process has been performed. With respect to the processed silica fine grain body, it would be especially preferable the silica fine grain body to be processed such that a degree of the hydrophobicity that is measured by a methanol titration test preferably denotes a value that falls into a range of between 30% and 80%. The hydrophobicity is applied by way of either a reaction with the silica fine grain body, or either a chemical or a physical process, with such as an organic silicon compound that physically adsorbs the silica fine grain body. As a preferable method of the hydrophobicity, a method that processes the silica fine grain body that is generated by the gaseous phase oxidation of the substance containing silicon halide with the organic silicon compound would be desirable.

As the organic silicon compound, there may be exemplified hydroxypropyl trimethoxysilane, phenyl trimethoxysilane, n-hexadecyl trimethoxysilane, n-octadecyl trimethoxysilane, vinyl methoxysilane, vinyl triethoxysilane, vinyl triacetoxysilane, dimethyl vinyl chlorosilane, divinyl chlorosilane, γ-methacrylamide oxypropyl trimethoxysilane, hexamethyl disilane, trimethylsilane, trimethyl chlorosilane, dimethyl dichlorosilane, methyl trichlorosilane, allyl dimethyl chlorosilane, allyl phenyl dichlorosilane, benzyl dimethyl chlorosilane, bromomethyl dimethyl chlorosilane, α-chlorethyl trichlorosilane, β-chloroethyl trichlorosilane, chloromethyl dimethylchlorosilane, triorganosilyl mercaptan, trimethylsilyl mercaptan, triorganosilyl acrylate, vinyl dimethyl acetoxysilane, dimethylethoxysilane, trimethyl othoxysilane, trimethyl methoxysilane, methyl triethoxysilane, isobutyl trimethoxysilane, dimethyl dimethoxysilane, diphenyl diethoxysilane, hexamethyl disiloxane, tetramethyl disiloxane, or 1,3-diphenyl tetramethyl disiloxane, as well as a dimethyl polysiloxane, having between 2 and 12 siloxane units per molecule, and either zero or one hydroxyl group bonded to a silicon atom on a basis of a unit that is located at an end of the molecule, respectively. Furthermore, there may also be exemplified silicon oil, such as dimethyl silicon oil. These may be used alone or in combination.

As a number average diameter of the flowability improver, it is preferable to fall into a range of 5 nm to 100 nm, with a range of 5 nm to 50 nm being more preferable.

It is preferable for a specific surface area by way of a nitrogen adsorption that is measured with a BET technique to have a specific surface area that is 30 m$^2$/g or greater, with a specific surface area that falls into a range of 60 m$^2$/g to 400 m$^2$/g being more preferable. It would be preferable for the fine powder that is surface treated to be 20 m$^2$/g or greater, with a range of 40 m$^2$/g to 300 m$^2$/g being more preferable.

The appropriate use amount of the fine powders described herein is preferably 0.03 parts by mass to 8 parts by mass relative to 100 parts by mass of the toner particles.

As another additive, it would be possible to add such as the following to the toner according to the present invention, as necessary for an objective such as protecting the electrostatic latent image support body or the carrier, improving a cleaning characteristic of the toner, adjusting a thermal characteristic, an electrical characteristic, or a physical characteristic of the toner, adjusting a resistance of the toner, adjusting a softening point of the toner, or improving a degree of the fixing of the toner: any type of metallic soap, a fluorine surfactant, dioctyl phthalate, such as tin oxide, zinc oxide, carbon black, or antimony oxide as an agent conferring the conductivity upon the toner, or an inorganic fine powder such as titanium oxide, aluminum oxide, or alumina. It is permissible to make hydrophobic the inorganic fine grain bodies described herein as necessary. In addition, it would also be possible to employ, in small quantities, as a development improver, a lubricant such as polytetrafluoroethylene, zinc stearate, or polyfluoride vinylidene, an abrasive such as cesium oxide, silicon carbide, or strontium titanate, or a caking prevention agent, and furthermore, white fine grain particles and black fine grain particles each of which has a polarity that is opposite to the polarity of the toner particles.

It is also preferable for the additives described herein to be treated by any or all of a treatment agent, such as is described hereinafter, in order to achieve an objective such as controlling the quantity of the charge of the toner; a silicon varnish, each type of denatured silicon varnish, a silicon oil, each type of denatured silicon oil, a silane coupling agent, silane coupling agent having a functional group, or another organic silicon compound.

When preparing the developer, it would be permissible to add and mix into the developer, the inorganic fine grain particle such as the hydrophobic silica fine grain powder that is described herein, in order to increase the liquidity, the shelf life, the quality of the developing, and the transferability of the developer. Whereas it would be possible to select and use a typical granular compounding device for compounding an external application agent as appropriate, it would be preferable to be able to apply a coat such as a jacket, and to be able to adjust an internal temperature. When changing a history of a load that is applied upon the external application agent, it would be permissible to apply the external application agent either during the process or gradually, would also be permissible to change such as a number of rotations, i.e., per minute, a speed of transition, a time, or a temperature of the compounding device, and it would further be possible to commence by imparting a high load, and thereafter imparting a comparatively lower load, as well as a converse thereof. As a usable compounding device, there may be exemplified a V-shaped compounding device, a rocking mixer, a lading mixer, a Nautor mixer, or a HENSCHEL MIXER.

The method of further adjusting a shape of the toner is not particularly limited, and may be suitably selected in accordance with the intended use. Examples of the method include, after fusing, mixing, and pulverizing the toner material that is formed from the binding resin and the coloring agent, a method that employs such as a hybridizer or mechano-fusion upon the powdered toner material to mechanically adjust the shape of the toner, as well as, after dissolving and dispersing the toner material within a solvent that is capable of dissolving the toner binder with the so-called spray desiccation method, a method that obtains a spherical toner by employing a spray desiccation device to remove the solvent from the toner, or a method that forms the spherical toner by heating the toner within the water based medium.

As the external additive, inorganic fine particles are preferably used. Examples of the inorganic fine particles include silica, aluminum oxide, titanium oxide, barium titanate, magnesium titanate, calcium titanate, strontium titanate, zinc oxide, tin oxide, silica sand, clay, mica, wollastonite, diatomite, chromium oxide, cerium oxide, red haematite, antimony trioxide, magnesium oxide, zirconium oxide, barium sulfate, barium carbonate, calcium carbonate, and silicon nitride. The primary particle diameter of the inorganic fine particles is preferably 5 μm to 2 μm, and more preferably 5 μm to 500 μm.

The specific surface area by way of the BET technique is preferably 20 m$^2$/g to 500 m$^2$/g. It would be to preferable for a usage proportion of the inorganic fine particles to fall within a range of 0.01% by mass to 5% by mass of the toner, with a range of 0.01% by mass to 2.0% by mass of the toner being more preferable.

Besides, there may also be exemplified, as an example of a high polymer fine grain particle, a polymer particle by way of a polycondensation thermosetting resin, such as a polystyrene, a methacrylamide ester, an acrylate ester copolymer, or a silicon, a benzoguanamine, or as nylon, which is obtained by a soap free emulsion polymerization, a suspension polymerization, or a dispersion polymerization.

It is possible to increase the hydrophobicity of the external additive by way of such a surface treatment agent thereupon, allowing preventing a degradation of the external additive even under a condition of a high degree of humidity. As an example of the surface treatment agent, a silane coupling agent, a silylate agent, a silane coupling agent having a fluoride alkyl group, an organic titanate coupling agent, an aluminum coupling agent, a silicon oil, and a modified silicon oil are preferably exemplified.

The primary particle diameter of the inorganic fine particles is preferably 5 μm to 2 μm, and more preferably 5 μm to 500 μm. The specific surface area by way of the BET technique is preferably 20 m$^2$/g to 500 m$^2$/g. It would be preferable for a usage proportion of the inorganic fine particles to fall within a range of 0.01% by mass to 5% by mass of the toner, with a range of 0.01% by mass to 2.0% by mass of the toner being more preferable.

As an example of a cleanability improver, in order to remove the developer that remains on the latent electrostatic image bearing member or a primary transfer medium after the transfer of the image, there may be exemplified a fatty acid metallic salt such as zinc stearate, calcium stearate, or stearic acid, as well as a polymer fine grain particle that is manufactured by way of the soap free emulsion polymerization, such as a polymethyl methacrylate fine grain particle or a polystyrene fine grain particle. A narrow comparative particle density distribution of the polymer fine particles, wherein a volume average particle diameter falls into a range of 0.01 μm to 1 μm, is preferable.

Whereas it is possible for the development method according to the present invention to use all of the latent electrostatic image bearing members used in the conventional electrophotography technique, it is ideal, as an example thereof, to use such as an organic latent electrostatic image bearing member, an amorphous silica latent electrostatic image bearing member, a selenium latent electrostatic image bearing member, or a zinc oxide latent electrostatic image bearing member.

According to the toner production method of the present embodiment having been described above, at a part of a liquid column resonance-generating liquid chamber 18 into which the toner containing at least a resin is supplied, ejection holes 19 for ejecting a toner composition liquid 14 are formed. In addition, in a liquid column resonance-generating liquid chamber 18, a vibration generating unit 20 configured to apply a vibration to the toner composition liquid is provided. When such a frequency that is suitable for resonance conditions is applied, a standing wave through liquid column resonance is formed in the liquid column resonance-generating liquid chamber 18. By an effect of the standing wave through the liquid column resonance, a pressure distribution is formed in the liquid column resonance-generating liquid chamber 18. Further, in the standing wave through the liquid column resonance generated in the liquid column resonance-generating liquid chamber 18, there is a region of the pressure distribution in which a high pressure is generated, which is called "antinode". By providing the ejection holes 19 in the region of the pressure distribution corresponding to the antinode, the toner composition 14 is continuously ejected from the ejection holes 19. Thereafter, the toner liquid droplets which have been formed into liquid droplets are solidified, and thereby toner particles are produced. A plurality of the ejection holes 19 are formed relative to at least one region serving as the antinode of a standing wave through the liquid column resonance. Thereby, continuous ejection of toner liquid droplets can be achieved, and a high productivity can be expected. In addition, a plurality of toner ejection holes are formed relative to at least one region serving as the antinode of a standing wave, and further, by providing a plurality of toner ejection holes in one liquid column resonance-generating liquid chamber, the productivity is further improved.

The vibration generating unit is effected to vibrate using a drive waveform primarily containing a frequency f which satisfies $f=N \times c/(4L)$ when a length of the liquid column resonance-generating liquid chamber in a longitudinal direction thereof is represented by L, a frequency of a high frequency vibration generated by the vibration generating unit is represented by f, a speed of sound wave of the toner composition liquid is represented by c, and N is a natural number, and a liquid column resonance is excited in the liquid column resonance-generating liquid chamber to thereby continuously eject the toner composition liquid from the toner ejection holes. Thereby, the toner composition liquid can be continuously and stably ejected from the ejection holes.

Further, the vibration generating unit is effected to vibrate using a drive waveform primarily containing a frequency f which is determined by using L and Le and which satisfies $N \times c/(4L) \leq f \leq N \times c/(4Le)$ when L represents a length of the liquid column resonance-generating liquid chamber in a longitudinal direction of the liquid column resonance-generating liquid chamber, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number, and a liquid column resonance is excited in the liquid column resonance-generating liquid chamber to thereby continuously eject the toner composition liquid from the toner ejection holes. Thereby, the toner composition liquid can be continuously and stably ejected from the ejection holes. Note that Le and L preferably satisfy the relationship Le/L>0.6.

Furthermore, the vibration generating unit is effected to vibrate using a drive waveform primarily containing a frequency f which is determined by using L and Le and which satisfies $N \times c/(4L) \leq f \leq (N+1) \times c/(4Le)$ when L represents a length of the liquid column resonance-generating liquid chamber in a longitudinal direction thereof, Le represents a distance between the end of the liquid column resonance-generating liquid chamber on the liquid feed path side and a center part of the ejection hole nearest to the end of the liquid column resonance-generating liquid chamber, c represents a sound speed of the liquid, and N is a natural number, and a liquid column resonance is excited in the liquid column resonance-generating liquid chamber to thereby continuously eject the toner composition liquid from the toner ejection holes.

In ejection of liquid droplets by only a liquid droplet forming unit, the flow rate of toner liquid droplets lowers by a viscosity resistance of air to the toner liquid droplets, and there was a concern that the toner liquid droplets aggregates each other when continuously ejected. To solve the problem, a flow path in which a gas flows and which forms an air stream for conveying toner liquid droplets that have been formed by a liquid droplet forming unit, to a solidifying unit is provided near the toner ejection holes, a further high speed is imparted to the ejected toner liquid droplets, and thereby the leading toner liquid droplets are prevented from aggregates with following toner liquid droplets. Thereby, a toner having a uniform particle diameter can be stably produced.

Further, as the ejection speed of toner liquid droplets by the flow rate of gas can be controlled, the initial ejection speed of toner liquid droplets ejected by the liquid droplet forming unit is preferably lower than the speed of the gas. When controlling of the speed of toner liquid droplets is achieved, a toner composition liquid can be stably and continuously ejected without causing aggregation of ejected toner liquid droplets. In addition, an organic solvent is contained in the toner composition liquid. In the solidifying unit, the organic solvent contained in the toner composition liquid is removed therefrom, and the toner composition liquid is solidified by drying toner liquid droplets. By inclusion of an organic solvent, the toner composition liquid is not fixed inside the inkjet head, and thereby the efficiency of toner production is increased.

A toner production apparatus 1 according to the present invention is mainly equipped with a liquid droplet forming unit 10 and a solidifying unit 30. The liquid droplet forming unit 10 is configured to eject a toner composition liquid containing at least a resin from ejection holes 19 arranged at a part of a surface of a liquid column resonance-generating liquid chamber 18 illustrated in FIG. 14, the surface being connected to both ends of the liquid column resonance-generating liquid chamber 18 in its longitudinal direction to form the toner composition liquid into liquid droplets. In the liquid column resonance-generating liquid chamber, at a part of one wall surface of walls provided at both ends of a flow path in the longitudinal direction, a liquid feed path 16 is provided, into which the toner composition liquid is fed. The liquid column resonance-generating liquid chamber is further provided with a vibration generating unit 20 for applying a vibration to the toner composition liquid. When a high-frequency vibration, which is generated by the vibration generating unit 20, is applied, to the toner composition liquid fed into the liquid column resonance-generating liquid chamber, a standing wave is generated, which is derived from a liquid column resonance (by a liquid column resonance phenomenon) as illustrated in FIGS. 2A to 2D, FIGS. 3A to 3C and FIG. 4, which is formed in accordance with resonance conditions between the walls at the both ends in of the liquid column resonance-generating liquid chamber in the longitudinal direction thereof. Note that the vibration frequency generated by the vibration generating unit is preferably a high frequency vibration of 300 kHz or higher. By generation of the standing wave through liquid column resonance inside the liquid column resonance-generating liquid chamber, a pressure distribution is formed in the liquid column resonance-generating liquid chamber. By the effect of the pressure distribution, toner ejection and liquid supply are continuously performed. Then, the ejected toner liquid droplets are solidified by the solidifying unit to thereby produce toner particles. With this, continuous ejection of toner liquid droplets can be achieved, and a high productivity can be expected.

Note that the present invention is not limited to the embodiments described above. On the contrary, the present invention is intended to cover various modifications and equivalent arrangements included within the spirit and scope of the appended claims.

EXAMPLES

Hereinafter, the present invention will be described with reference to Examples, which, however, shall not be construed as limiting the scope of the invention.

Hereinbelow, the present invention will be further described in detail with reference to Examples.

Example 1

Figure 4:
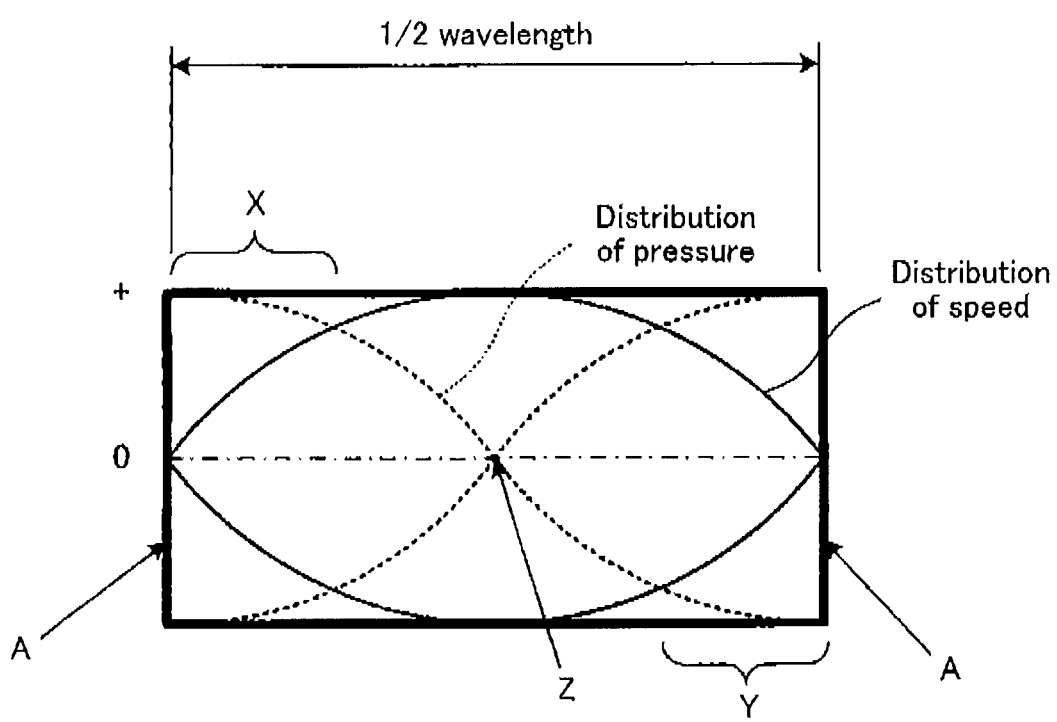
FIG. 4 is a schematic diagram illustrating the appearance of a liquid column resonance phenomenon in a liquid column resonance-generating liquid chamber of a liquid ejection head.

In Example 1, using a liquid droplet ejection head illustrated in FIG. 1, a waveform illustrated in FIG. 4 was applied to a piezoelectric element of the vibration generating unit to form liquid droplets. Note that a waveform of a main pulse part formed in a sine waveform corresponding to 300 kHz was formed once. The ejection hole was made by nickel electroforming with a pore diameter of 8 μm. A liquid column resonance-generating liquid chamber and a liquid supply path were formed by laminating a stainless steel path plate, to which a nickel thin film was laminated as an elastic plate. The piezoelectric element was disposed the upper part of the liquid column resonance-generating liquid chamber. These members are fixed with a stainless steel-made frame, as illustrated in FIG. 1. A mixture prepared in which a cyan pigment (0.5 parts by mass) was added to ethyl acetate (100 parts) and then a polyester resin for adjusting the viscosity was added thereto, and the mixture was added to compound a liquid for use. The quantity of one liquid droplet relative to a voltage applied to the piezoelectric element is described. In the measurement of the quantity of liquid droplet, liquid droplets were discharged with a waveform at 30 kHz, and the drive was stopped when 1,000,000 droplets were ejected, followed by a change in weight of the silicone liquid, in which an average weight thereof was measured. Further, flying liquid droplets were observed through a microscope at a high magnification, and the diameter of the liquid droplets was measured. As a result, liquid droplets in the same quantity as in the weight measurement method ware obtained. As a result, the quantity of one droplet measured with a pulse voltage of 8 V was found to be 0.7 μl.

Example 2

In Example 2, the procedure of Example 1 was repeated except that the number of driving times of the waveform of the main pulse part was changed to two times. Thereafter, the same measurement for quantity of liquid droplet was performed. As a result, the quantity of one droplet measured with a pulse voltage of 8 V was found to be 1.2 pl.

Example 3

In Example 8, the procedure of Example 1 was repeated except that the number of driving times of the waveform of the main pulse part was changed to three times. Thereafter, the same measurement for quantity of liquid, droplet was performed. As a result, in one driving, two liquid droplets were formed, and the quantity of one droplet measured with a pulse voltage of 8 V was found to be 1.8 pl. The quantity of liquid droplets can be modulated by changing the number of pulses of the main pulse part in this way.

Example 4

In Example 4, the procedure of Example 1 was repeated except that the main pulse was changed to a waveform corresponding to 610 kHz, and the number of pulses was changed to two times. Thereafter, the same measurement for quantity of liquid droplet was performed. As a result, the quantity of one droplet measured with a pulse voltage of 8 V was found to be 0.5 pl.

Figure 11:
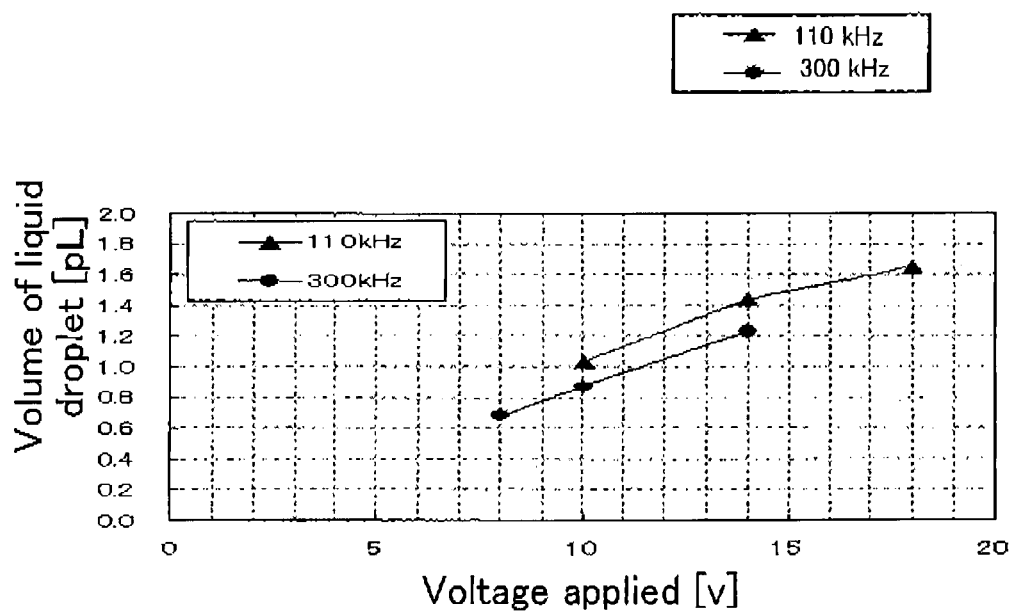
FIG. 11 is a characteristic graph illustrating a relationship between a pressure applied per drive frequency and a volume of liquid droplets.

FIG. 11 is a characteristic graph illustrating the voltage dependency of the volume of liquid droplets. The figures illustrate the result obtained after a voltage employed was changed under the conditions of Example 1. As compared with the examples basically employing Helmholtz frequency, it is understood that in Example 1, microscopic liquid droplets can be driven with a low voltage.

Example 5

Figure 20A:
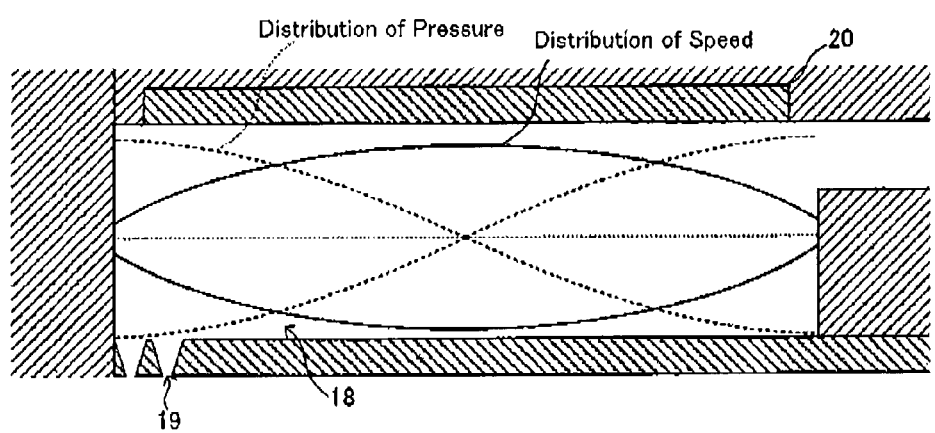
FIGS. 20A and 20B are diagrams illustrating an example of a liquid droplet ejection head.
Figure 20B:
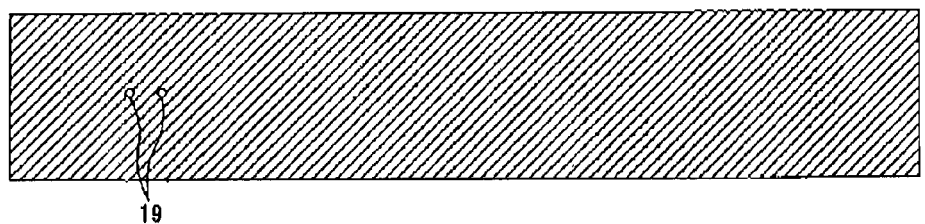

FIGS. 20A and 20B are diagrams illustrating an example of a liquid droplet ejection head. In FIG. 20A, as, illustrated in Example 5, Example 5 is one example of a standing wave in the case where two ejection holes 19 are formed in a liquid column resonance-generating liquid chamber 11 on a fixed end side thereof, and a reflection wall is provided on the side of a liquid feed path in the liquid column resonance-generating liquid chamber 11. It can be considered that the standing wave is in a resonance mode of N=2 at both ends thereof. Note that the drive frequency was set to 328 kHz. Example 5 illustrates the result of driving using a frequency with a peaked resonance.

Example 6

Figure 21A:
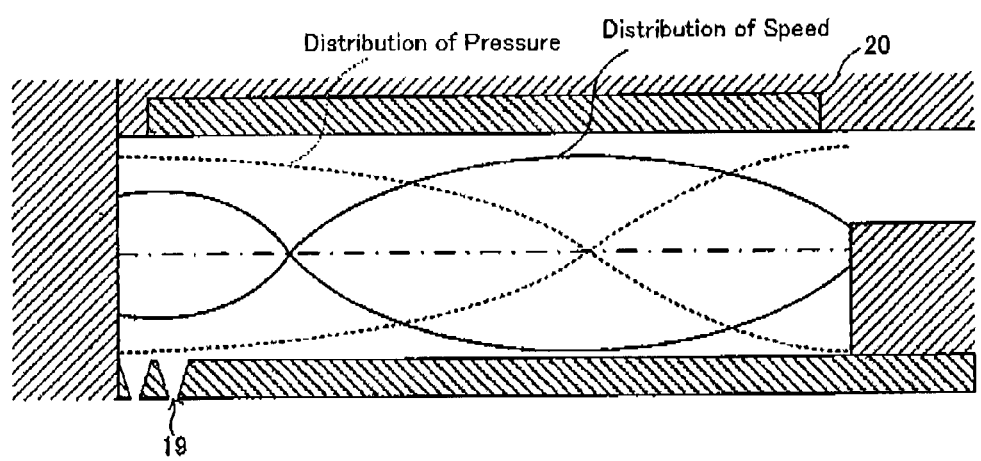
FIGS. 21A and 21B are diagrams illustrating another example of a liquid droplet ejection head.
Figure 21B:
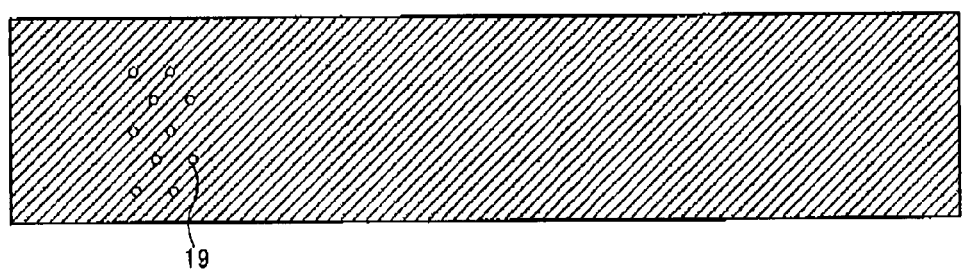

FIGS. 21A and 21B are diagrams illustrating another example of a liquid droplet ejection head. Example 6 illustrated in the figure is one example of a standing wave in the case where ten ejection holes 19 are formed in a liquid column resonance-generating liquid chamber 11 on a fixed end side thereof, and a reflection wall is provided on the side of a liquid common feed path in the liquid column resonance-generating liquid chamber 11. Note that the drive frequency was set to 377 kHz. Therefore, as compared with Example 5 illustrated in FIG. 20A, this liquid droplet ejection head was configured to have a loosely fixed end.

Example 7

Figure 22A:
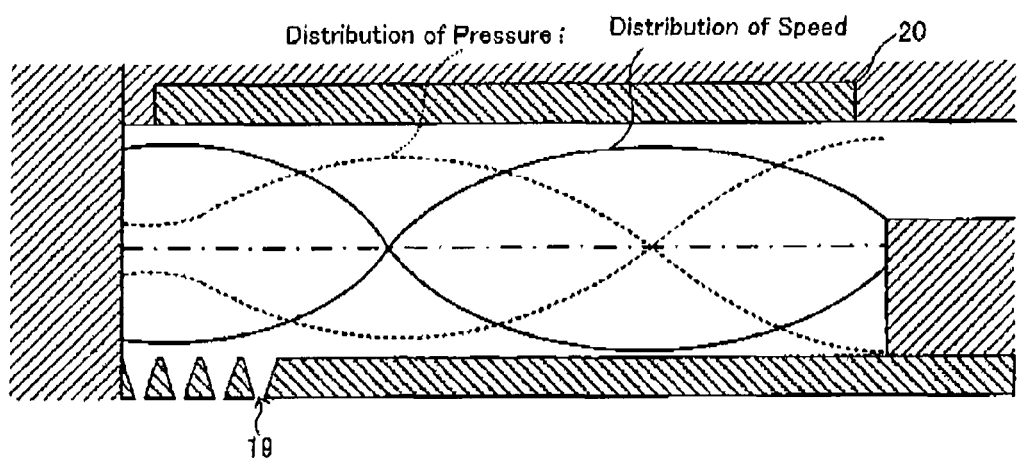
FIGS. 22A and 22B are diagrams illustrating still another example of a liquid droplet ejection head.
Figure 22B:
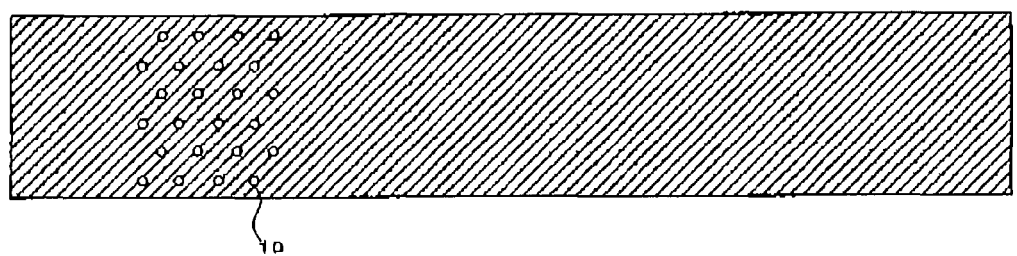

FIGS. 22A and 22B are diagrams illustrating still another example of a liquid droplet ejection head. Example 7 illustrated in the figure is one example of a standing wave in the case where 24 ejection holes 19 are formed in a liquid column resonance-generating liquid chamber 11 on a fixed end side thereof, and a reflection wall is provided on the side of a liquid common feed path in the liquid column resonance-generating liquid chamber 11. Note that the drive frequency was set to 417 kHz. Therefore, as compared with Example 5 illustrated in FIG. 20, the leading end side which was regarded as a fixed end in the liquid column resonance-generating liquid chamber 11, a standing wave in a resonance mode of N=3, which is close to a standing wave formed at an open end, was formed.

Example 8

Figure 23A:
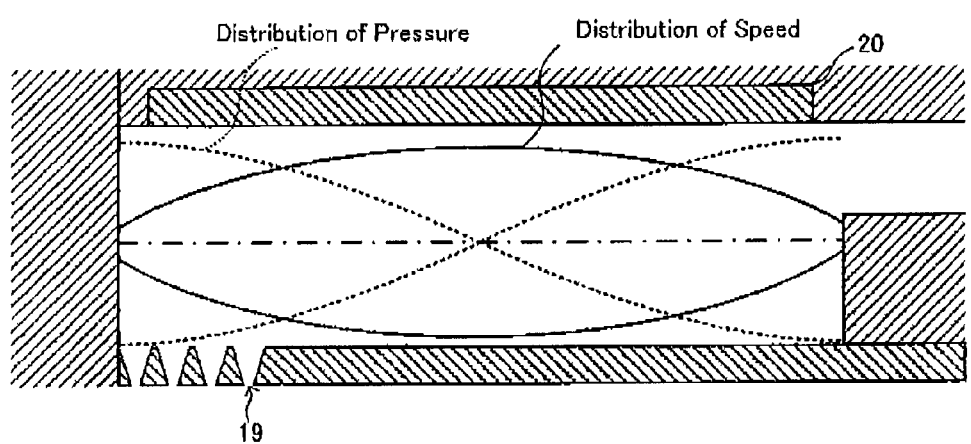
FIGS. 23A and 23B are diagrams illustrating yet still another example of a liquid droplet ejection head.
Figure 23B:
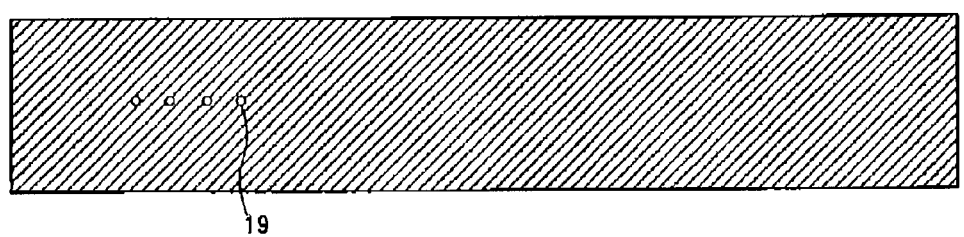

FIGS. 23A and 23B are diagrams illustrating still yet another example of a liquid droplet ejection head. Example 8 illustrated in the figure is one example of a standing wave in the case where four ejection holes 19 are formed in a liquid column resonance-generating liquid chamber 11 on a fixed end side thereof, and a reflection wall is provided on the side of a liquid common feed path in the liquid column resonance-generating liquid chamber 11. Note that the drive frequency was set to 344 kHz. Therefore, as compared with Example 5 illustrated in FIG. 20, this liquid droplet ejection head had a relatively loosely fixed end under the influence of apertures of the ejection holes, in which a standing wave in a resonance mode of N=2 was formed.

Example 9

Figure 24A:
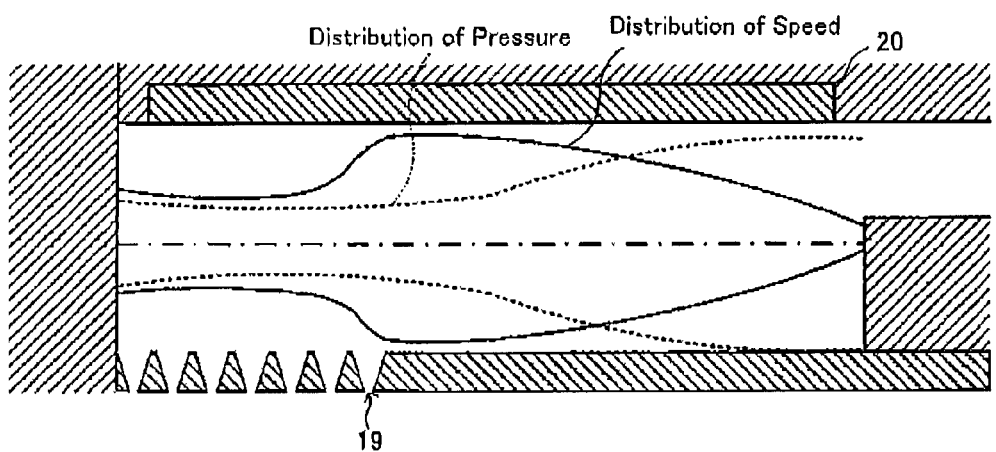
FIGS. 24A and 24B are diagrams illustrating yet still another example of a liquid droplet ejection head.
Figure 24B:
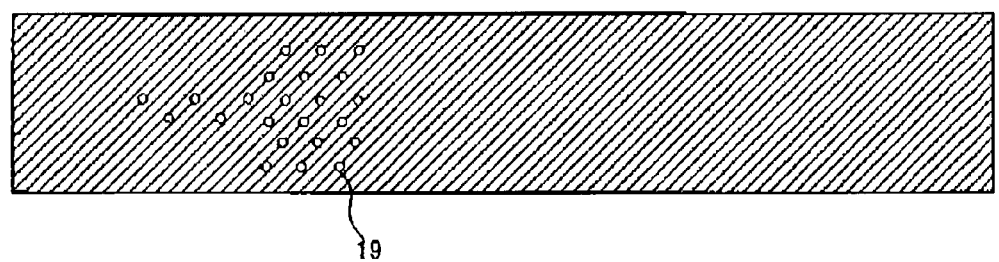

FIGS. 24A and 24B are diagrams illustrating still yet another example of a liquid droplet ejection head. Example 9 illustrated in the figure is one example of a standing wave in the case where the numerical aperture of toner ejection holes 19 is locally increased, the ejection holes 19 are present near the liquid common feed path side and has a closed end at the other side of the liquid droplet ejection head. Thus, a standing wave in a resonance mode of N=1, which is a standing wave formed with closed both ends, was formed, and as compared to a pressure distribution in a region provided with the toner ejection holes arranged near the liquid common feed path side, a pressure distribution in a region provided with the toner ejection holes arranged near the fixed end side was formed flat. Note that the drive frequency was set to 160 kHz.

Example 10

Figure 25A:
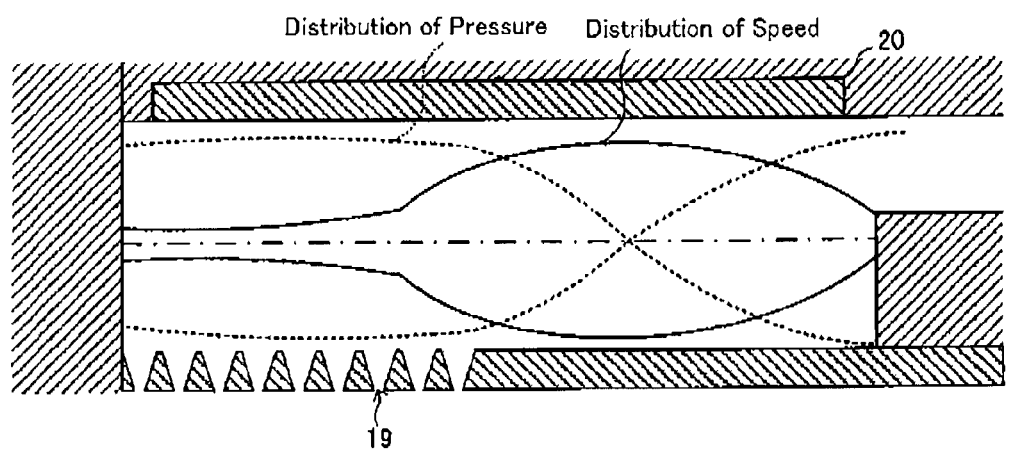
FIGS. 25A and 26B are diagrams illustrating yet still another example of a liquid droplet ejection head.
Figure 25B:
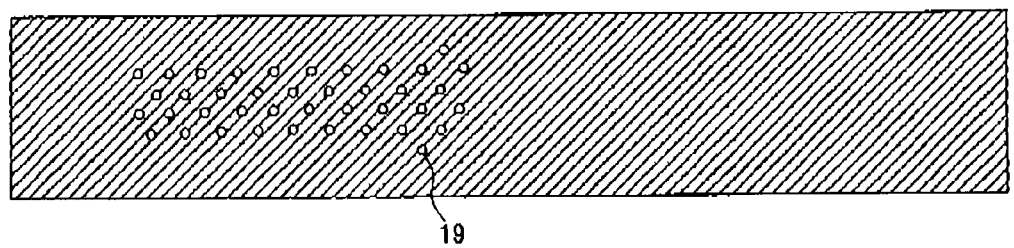

FIGS. 25A and 25B are diagrams illustrating still yet another example of a liquid droplet ejection head. Example 10 illustrated in the figure is one example of a standing wave in the case where 36 ejection holes 19 are formed in a liquid column resonance-generating liquid chamber 11 on a fixed end side thereof, and thus the toner ejection holes 19 are formed to an extent of about one-third of the length of the liquid column resonance-generating liquid chamber 11. In Example 10, whereas a standing wave in a resonance mode of N=2 was formed, this liquid droplet ejection head had a loosely fixed end. Note that the drive frequency was set to 468 kHz.

Example 11

Figure 26A:
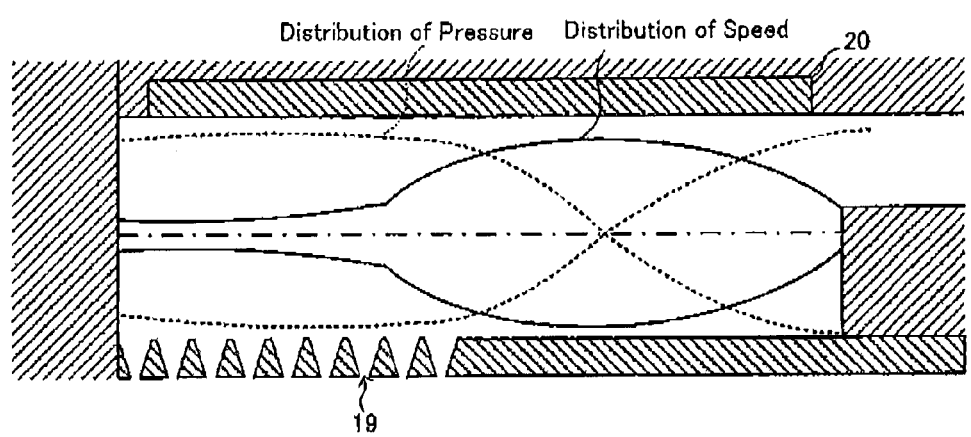
Figure 26B:
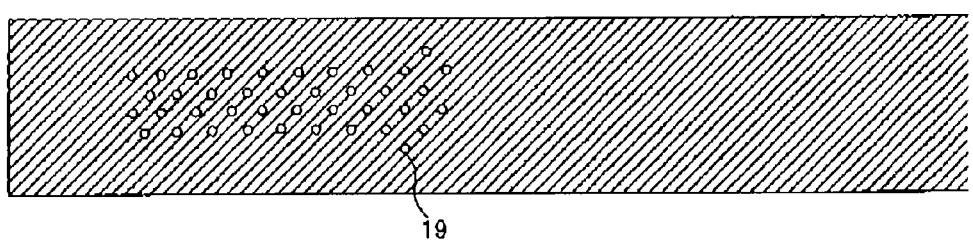
Figure 28A:
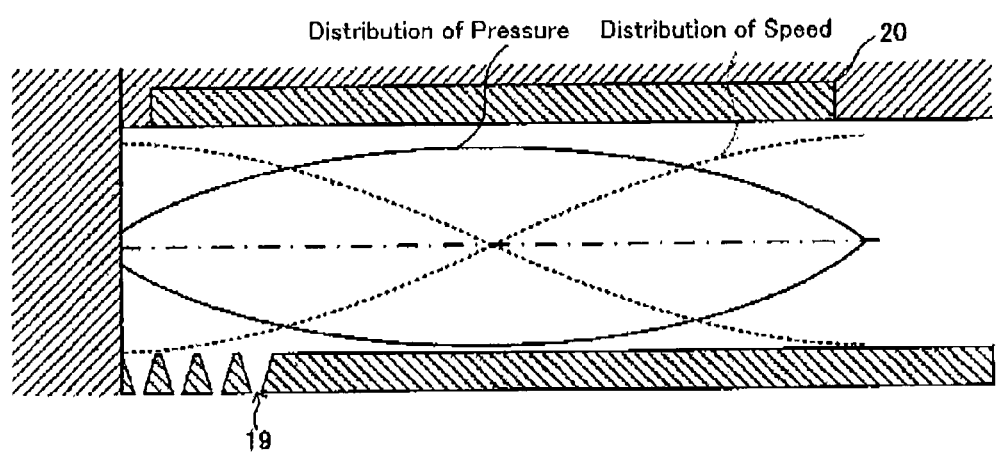
FIGS. 28A and 28B are diagrams illustrating yet still another example of a liquid droplet ejection head.

FIGS. 26A and 26B are diagrams illustrating still yet another example of a liquid droplet ejection head. Example 11 illustrated in the figure is one example of a standing wave in the case where the liquid droplet ejection head includes a liquid resonance flow path and an aperture pattern of ejection holes each having the same configuration as in Example 10, and the frequency was set to be slightly low. Note that the drive frequency was set to 395 kHz. In a pattern of a resonance standing wave in this case, a pressure distribution is, as illustrated in FIG. 28A, further equalized at a region where the toner ejection holes are closely arranged. As compared with Example 10, a ratio of D4/DN became small, i.e., the particle size distribution was further equalized. As illustrated, even when the resonance patterns have the same configuration, the particle distribution can be optimized by appropriately determining the drive frequency in a region where a resonance is generated.

Example 12

Figure 27A:
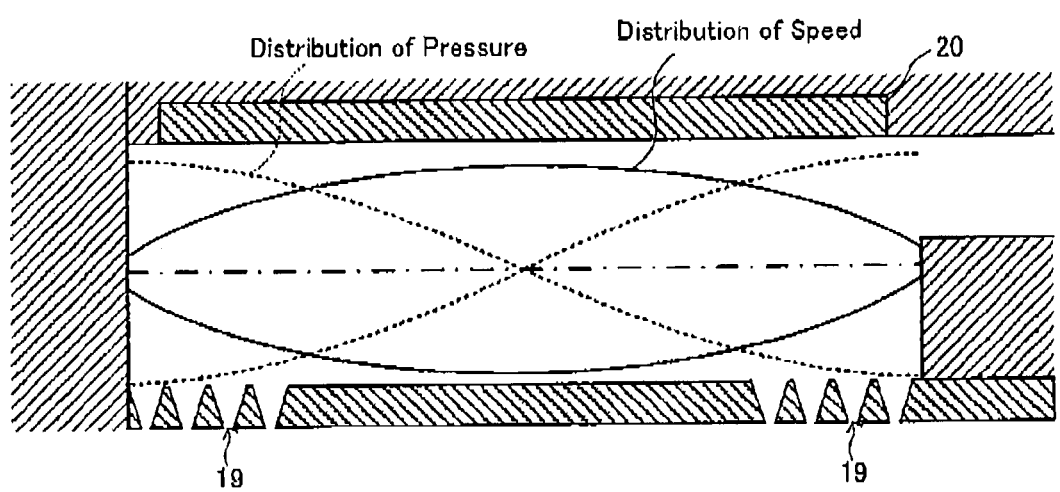
FIGS. 27A and 27B are diagrams illustrating yet still another example of a liquid droplet ejection head.
Figure 27B:
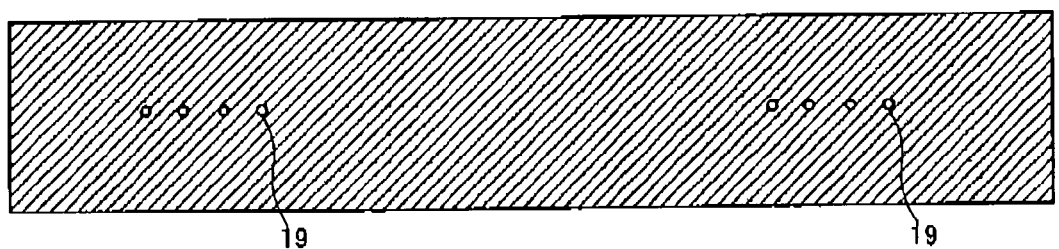

FIGS. 27A and 27B are diagrams illustrating still yet another example of a liquid droplet ejection head. Example 12 illustrated in the figure is one example of a standing wave in the case where four ejection holes are arranged on each of the fixed end side and the liquid common feed path side. As just in the case of Example 5, a standing wave in a resonance mode of N=2 was formed. With this arrangement of the toner ejection holes, the liquid could be ejected, in a uniform amount, from all the toner ejection holes. Note that the drive frequency was set to 344 kHz.

Example 13

Figure 28B:
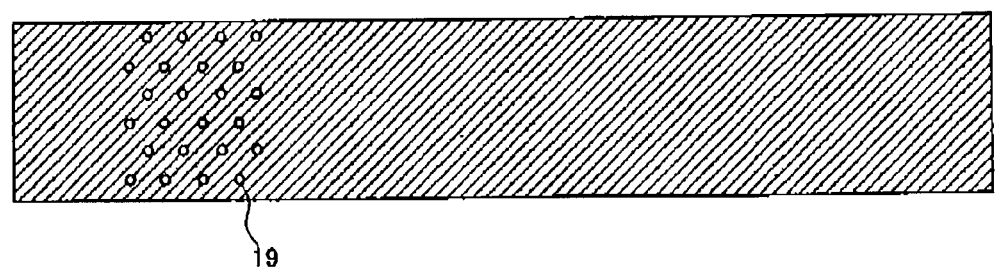

FIGS. 28A and 28B are diagrams illustrating still yet another example of a liquid droplet ejection head. In Example 13 illustrated in the figure, the cross-sectional area of a liquid common feed path is greater than that of a liquid column resonance-generating liquid chamber, and the liquid droplet ejection head has, on the liquid common feed path side, an open end. In this case, a standing wave in a resonance mode of N=2 was formed. Note that the drive frequency was set to 261 kHz.

Example 14

Figure 29A:
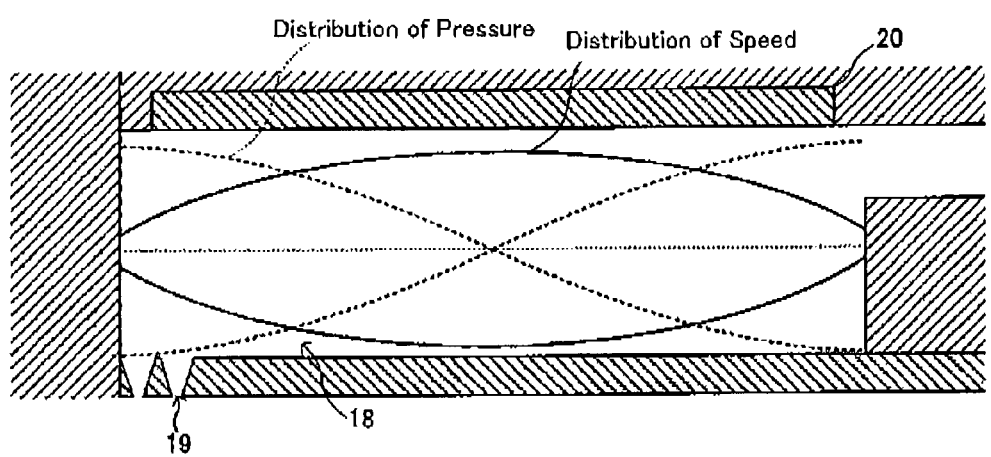
FIGS. 29A and 29B are diagrams illustrating yet still another example of a liquid droplet ejection head.
Figure 29B:
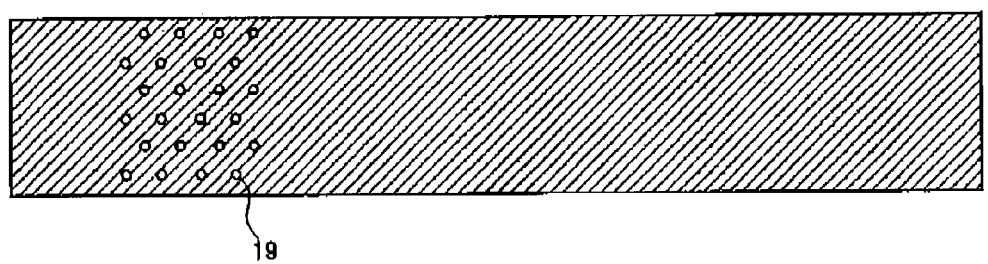
Figure 30:
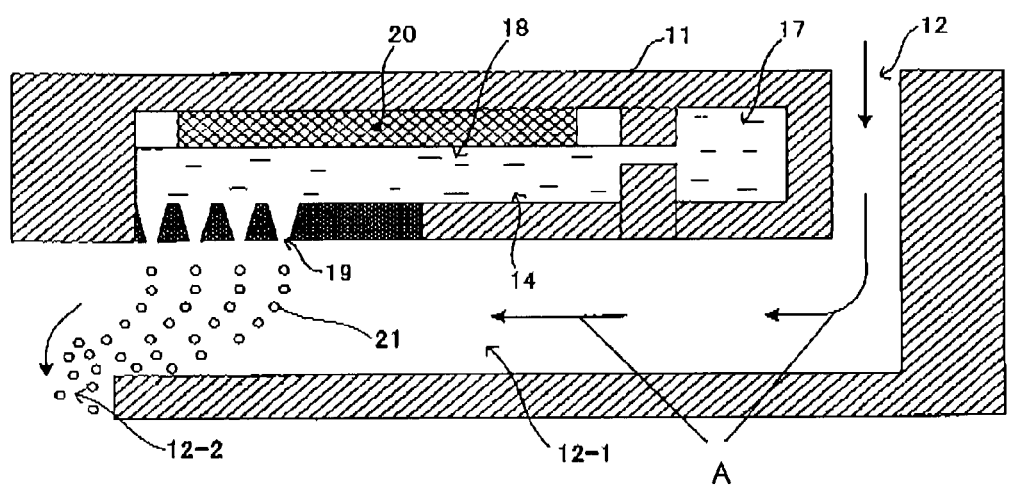
FIG. 30 is a diagram illustrating yet still another example of a liquid droplet ejection head.

FIGS. 29A and 29B are diagrams illustrating still yet another example of a liquid droplet ejection head. Example 14 illustrated in the figure is an example when the liquid droplet ejection head has the same configuration as in Example 13, however, the drive frequency is changed. The drive frequency was set to 516 kHz. In the case of Example 14, a standing wave in a resonance mode of N=4 was formed.

Example 15

FIGS. 20A and 20B are diagrams illustrating an example of a liquid droplet ejection head. In FIG. 20A, as illustrated in Example 15, Example 15 is one example of a standing wave in the case where two ejection holes 19 are formed in a liquid column resonance-generating liquid chamber 18 on a fixed end side thereof, and a reflection wall is provided on the side of a liquid feed path in the liquid column resonance-generating liquid chamber 18. It can be considered that the standing wave is in a resonance mode of N=2 at both ends thereof. Note that the drive frequency was set to 328 kHz. Example 15 illustrates the result of driving using a frequency with a peaked resonance (resonance peak). The term "resonance peak" is a node of a speed resonance standing wave in a resonance state, and an antinode of driving at a resonance peak frequency, i.e., a state in which the pressure is in the highest condition, liquid droplets are experimentally ejected, and it can be determined as a frequency at which the speed of ejection is the maximum, as illustrated in FIG. 17.

—Preparation of Colorant Dispersion Liquid—

First, a carbon black dispersion liquid was prepared as a colorant. A carbon black (REGAL 400, produced by Cabot Corp.) (17 parts by mass), a pigment dispersant (3 parts by mass), and ethyl acetate (80 parts by mass) were subjected to a primary dispersion by using a mixer having a mixing blade, AJISPER PB821, produced by Ajinomoto Fine-Techno Co., Inc., was used as the pigment dispersant. A dyno mill was employed to finely disperse, by way of a powerful shearing force, the primary dispersion liquid, and a secondary dispersion liquid was prepared, in which aggregates of 5 μm or greater in size were completely removed.

—Preparation of Wax Dispersion Liquid—

Next, a wax dispersion liquid was prepared. A carnauba wax (18 parts by mass), a wax dispersant (2 parts by mass), and ethyl acetate (80 parts by mass) were subjected to a primary dispersal by using a mixer having a mixing blade. The primary dispersion liquid was heated to 80° C. while being mixed, thereby melting the carnauba wax, whereupon the temperature of the solution was lowered to room temperature, and a wax particle was precipitated therefrom such that a maximum diameter of the wax particle was 3 μm or smaller.

As the wax dispersant, a substance was used wherein a styrene-butyl acrylate copolymer was grafted upon a polyethylene wax. A dyno mill was employed to further finely disperse, by way of a powerful shearing force, the dispersion liquid, thereby adjusting such that a maximum diameter of the wax particle was 1 μm or smaller.

—Preparation of Toner Composition Dispersion Liquid—

Next, a toner composition dispersion liquid was prepared, which was formed from a composition to be described hereinafter, wherein the binder resin serving as a resin, the colorant dispersion liquid, and the wax dispersion liquid were added. The mixer having a mixing blade was used for mixing for 10 minutes of a polyester resin (produced by DIC Corp.) (100 parts by mass) as the binder resin, the colorant dispersion liquid (30 parts by mass), the wax dispersion liquid (30 parts by mass), and ethyl acetate (840 parts by mass), and uniformly dispersed. Neither the pigment nor the wax particles were aggregated by way of a dilution of the solvent.

—Production of Toner—

The resulting toner composition liquid was stored in a toner production apparatus illustrated in FIG. 13, which had having the above-mentioned liquid ejection head illustrated in FIG. 14. An air stream was caused to generate in the same direction as the direction to which liquid droplets proceed, by an air stream path 12. After preparation of a dispersion liquid, liquid droplets were ejected under the following conditions, followed by drying and solidifying the liquid droplets, to thereby produce toner base particles.

[Conditions for Producing Toner]
  Specific gravity of dispersion liquid: $\rho=1.1888$ [g/cm$^3$]
  Flow rate of dry air: 30.0 L/min
  Inside temperature of device: 27° C. to 28° C.
  Drive frequency: 328 kHz
  Peak value of voltage sine wave applied: 10.0 V
  The diameter of liquid droplets formed was 11.8 μm.

The toner particles that had been solidified by drying were subjected to a soft X-ray irradiation to eliminate electric charge therefrom and then collected by suction through a filter having fine pores of 1 μm. When the particle density distribution of the collected particles was measured under a measuring condition that was mentioned hereinafter by a flow particle imaging analyzer, i.e., an FPIA-2000, the toner base particles were found to have a weight average particle diameter, i.e., D4, of 5.5 μm, and a number average particle diameter, i.e., Dn, of 5.2 μm, and a D4/Dn ratio of 1.06.

Following is a description relating to a measurement method that uses the flow particle image analyzer. As an instance of a measurement of the toner, the toner particle, and the external application agent, by way of the flow particle image analyzer, FPIA-2000 flow particle image analyzer, manufactured by TOA MEDICAL ELECTRONICS, INC. can be used.

The measurement applied a filter to remove particulate debris, and as a result, a quantity of droplets of a nonionic surfactant, preferably CONTAMINON N, manufactured by Wako Pure Chemical Industries Co., Ltd., was added to 10 mL of water wherein the quantity of particles was less than or equal to 20 particles (equivalent circle diameter: greater than or equal to 0.60 μm and less than 159.21 μm, for example), within a measurement range in 10$^{-3}$ cm$^3$ of water. Furthermore, a measurement sample (5 mg) was added to the solution, a dispersion treatment was performed for one minute, using a UH-50 ultrasound dispersal device, manufactured by STM, under a condition of 20 kHz, and 50 W/cm$^3$, and furthermore, the dispersion treatment was performed for a total of 5 minutes, thereafter a sample dispersion liquid was employed, having a particle density of from 4,000 particles/10$^{-3}$ cm$^3$ to 8,000 particles/10$^{-3}$ cm$_3$, (a particle corresponding to a range of an approximate circle equivalent diameter of the assessment was targeted), and the particle density distribution of the particle having an approximate circle equivalent diameter greater than or equal to 0.60 μm and less than 159.21 μm was measured.

The measurement sample dispersion liquid was passed through a flow path, which expanded in a direction of a flow of the toner, and which included a flat, compressed, transparent flow cell, (thickness: about 200 μm). In order to form a light path that intersects and passed through the thickness of the flow cell, a strobe and a CCD camera was installed so as to be located on respectively opposite sides with respect to the flow cell. While the sample dispersion liquid flowing, the strobe light was projected at ⅟30 second intervals, in order to obtain an image of the particle that flows through the flow cell, and as a result, each respective particle thereupon was photographed as a two-dimensional image having a parallel fixed range within the flow cell. The diameter of the circle having a same surface area as the approximate circle equivalent diameter was computed, from a surface area of the two dimensional image of each respective particle thereupon.

It would be possible to measure the approximate circle equivalent diameter of 1,200 or more particles within approximately one minute, and it would be possible to measure a proportion, i.e., a quantity as a percentage, of the particles that have the approximate circle equivalent diameter that is quantified and regulated by a distribution of the approximate circle equivalent diameter. It is possible to obtain a result, i.e., a frequency percentage and a cumulative percentage, as shown in Table 1, wherein the range between 0.06 μm and 400 μm is divided into 226 channels, such that one octave is divided into 30 channels. With regard to an actual measurement, the measurement of the particles is performed with the range of the approximate circle equivalent diameter being greater than or equal to 0.60 μm and less than 159.21 μm.

(External Treatment)

After the toner base particles that had been dried and solidified and then collected by a cyclone, a hydrophobized silica (H2000, produced by Clariant Japan K.K.) (1.0% by mass) was externally added thereto, using a HENSCHEL MIXER (manufactured by Mitsui Mining Co., to thereby produce a toner.

(Preparation of Carrier)

A silicone resin (SR2406, produced by TORAY Dow Corning Silicone Co., Ltd.) serving as a material for a coating layer was dispersed in toluene to prepare a coating layer dispersion liquid, and then a core material (ferrite particles having average particle diameter of 50 μm) was spray-coated with the coating layer dispersion liquid, baked, and cooled to thereby produce a carrier with the coating layer of 0.2 μm in thickness.

—Production of Developer—

The carrier (96 parts by mass) was mixed with the resulting toner (4 parts by mass) to produce a two-component developer.

<Thin Line Reproducibility>

The developer was loaded into a modified version of a commercially available copier, i.e., an IMAGIO NEO 271, manufactured by Ricoh Company Ltd., a development device portion whereof having been modified, and a run performed thereupon employing Ricoh 6000 Paper with an image occupied rate of 7%. A fine line portion of a 10th image at an initial stage of the run, and of a 30,000th image thereof, was compared with a source document, which were examined at 100× magnification under an optical microscope, and evaluated at four grades, A, B, C and D by for a state of a line not being properly copied, in comparison with a sample in stages. The image quality is denoted from best to worst as follows: "A>B>C>D" wherein the grade "D" denotes a level of image reproducibility that is unusable as a viable product.

The line reproducibility evaluation results of Examples 16 to 27 (Examples subsequent to Example 15) are also shown in Table 1.

TABLE 1

|  | The number of ejection holes | Drive frequency (kHz) | Number average particle diameter (μm) | D4/DN | Thin line reducibility |
|---|---|---|---|---|---|
| Ex. 15 | 2 | 328 | 5.2 | 1.06 | A |
| Ex. 16 | 10 | 377 | 5.2 | 1.05 | A |
| Ex. 17 | 24 | 417 | 4.3 | 1.06 | B |
| Ex. 18 | 4 | 344 | 4.9 | 1.04 | A |
| Ex. 19 | 23 | 160 | 5.8 | 1.09 | B |
| Ex. 20 | 24 | 468 | 5.2 | 1.12 | B |
| Ex. 21 | 24 | 395 | 5.2 | 1.01 | A |
| Ex. 22 | 8 | 344 | 5.0 | 1.03 | A |
| Ex. 23 | 24 | 261 | 5.3 | 1.08 | B |
| Ex. 24 | 24 | 516 | 3.9 | 1.09 | A |
| Ex. 25 | 2 | 328 | 4.6 | 1.05 | A |
| Ex. 26 | 2 | 238 | 4.8 | 1.09 | A |
| Ex. 27 | 2 | 328 | 4.4 | 1.05 | A |

Example 16

FIGS. 22A and 22B are diagrams illustrating another example of a liquid droplet ejection head. Example 16 illustrated in the figure is one example of a standing wave in the case where ten ejection holes 19 are formed in a liquid column resonance-generating liquid chamber 18 on a fixed end side thereof, and a reflection wall is provided on the side of a liquid common feed path in the liquid column resonance generating liquid chamber 18. Note that the drive frequency was set to 377 kHz. Therefore, as compared with Example 15 illustrated in FIG. 20, this liquid droplet ejection head was configured to have a loosely fixed end.

Example 17

FIGS. 22A and 22B are diagrams illustrating still another example of a liquid droplet ejection head. Example 17 illustrated in the figure is one example of a standing wave in the case where 24 ejection holes 19 are formed in a liquid column resonance-generating liquid chamber 18 on a fixed end side thereof, and a reflection wall is provided on the side of a liquid common feed path in the liquid column resonance-generating liquid chamber 18. Note that the drive frequency was set to 417 kHz. Therefore, as compared with Example 15 illustrated in FIG. 20, the leading end side which was regarded as a fixed end in the liquid column resonance-generating liquid chamber 18, a standing wave in a resonance mode of N=3, which is close to a standing wave formed at an open end, was formed.

Example 18

FIGS. 23A and 23B are diagrams illustrating still yet another example of a liquid droplet ejection head. Example 18 illustrated in the figure is one example of a standing wave in the case where four ejection holes 19 are formed in a liquid column resonance-generating liquid chamber 18 on a fixed end side thereof, and a reflection wall is provided on the side of a liquid common feed path in the liquid column resonance generating liquid chamber 18. Note that the drive frequency was set to 344 kHz. Therefore, as compared with Example 15 illustrated in FIG. 20, this liquid droplet ejection head had a relatively loosely fixed end under the influence of apertures of the ejection holes, in which a standing wave in a resonance mode of N=2 was formed.

Example 19

FIGS. 24A and 24B are diagrams illustrating still yet another example of a liquid droplet ejection head. Example 19 illustrated in the figure is one example of a standing wave in the case where the numerical aperture of toner ejection holes 19 is locally increased, the ejection holes 19 are present near the liquid common feed path side and has a closed end at the other side of the liquid droplet ejection head. Thus, a standing wave in a resonance mode of N=1, which is a standing wave formed with closed both ends, was formed, and as compared to a pressure distribution in a region provided with the toner ejection holes arranged near the liquid common feed path side, a pressure distribution in a region provided with the toner ejection holes arranged near the fixed end side was formed flat. Note that the drive frequency was set to 160 kHz.

Example 20

FIGS. 25A and 25B are diagrams illustrating still yet another example of a liquid droplet ejection head. Example 20 illustrated in the figure is one example of a standing wave in the case where 36 ejection holes 19 are formed in a liquid column resonance-generating liquid chamber 18 on a fixed end side thereof, and thus the toner ejection holes 19 are formed to an extent of about one-third of the length of the liquid column resonance-generating liquid chamber 18. In Example 20, whereas a standing wave in a resonance mode of N=2 was formed, this liquid droplet ejection head had a loosely fixed end. Note that the drive frequency was set to 468 kHz.

Example 21

FIGS. 26A and 26B are diagrams illustrating still yet another example of a liquid droplet ejection head. Example 21 illustrated in the figure is one example of a standing wave in the case where the liquid droplet ejection head includes a liquid resonance flow path and an aperture pattern of ejection holes each having the same configuration as in Example 20, and the frequency was set to be slightly low. Note that the drive frequency was set to 395 kHz. In a pattern of a resonance standing wave in this case, a pressure distribution is, as illustrated in FIG. 28A, further equalized at a region where the toner ejection holes are closely arranged. As compared with Example 20, a ratio of D4/DN became small, i.e., the particle size distribution was further equalized. As illustrated, even when the resonance patterns have the same configuration, the particle distribution can be optimized by appropriately determining the drive frequency in a region where a resonance is generated.

Example 22

FIGS. 27A and 27B are diagrams illustrating still yet another example of a liquid droplet ejection head. Example 22 illustrated in the figure is one example of a standing wave in the case where four toner ejection holes are arranged on each of the fixed end side and the liquid common feed path side. As just in the case of Example 15, a standing wave in a resonance mode of N=2 was formed. With this arrangement of the toner ejection holes, the liquid could be ejected, in a uniform amount, from all the toner ejection holes. Note that the drive frequency was set to 344 kHz.

Example 23

FIGS. 28A and 28B are diagrams illustrating still yet another example of a liquid droplet ejection head. In Example 23 illustrated in the figure, the cross-sectional area of a liquid common feed path is greater than that of a liquid column resonance generating liquid chamber, and the liquid droplet ejection head has, on the liquid common feed path side, an open end. In this case, a standing wave in a resonance mode of N=1 was formed. Note that the drive frequency was set to 261 kHz.

Example 24

FIGS. 29A and 29B are diagrams illustrating still yet another example of a liquid droplet ejection head. Example 24 illustrated in the figure is an example when the liquid droplet ejection head has the same configuration as in Example 23, however, the drive frequency is changed. The drive frequency was set to 516 kHz. In the case of Example 24, a standing wave in a resonance mode of N=4 was formed.

Example 25

FIGS. 30A to 30E are diagrams illustrating still yet another example of a liquid droplet ejection head. The liquid droplet ejection head of Example 25 illustrated in the figure is an example where an air stream path 12, through which an air generated by an air stream generation unit described in Example 15 is passed, has a different configuration. The direction of the air stream path 12, i.e., the direction to which air stream is passed, in Example 15 is the same as the direction to which the liquid droplets are ejected, however, the air stream path 12 in Example 25 includes a first air flow path 12-1 and a second air flow path 12-2 which is formed in communicate with the first air flow path 12-1 and connected to a vapor phase in a chamber 81 in a dry-collection unit 30. The direction of the first air flow path 12-1 is a direction which is substantially orthogonal to the direction to which liquid droplets are ejected, and the direction of the second air flow path 12-2 is a direction which is substantially orthogonal to the direction of the first air flow path 12-1 and the same direction as the direction to which liquid droplets are ejected. Note that the air flow rate was 20 m/s at a region near the toner ejection holes; the number average particle diameter was 4.6 µm, and D4/DN was 1.05.

Example 26

Figure 31:
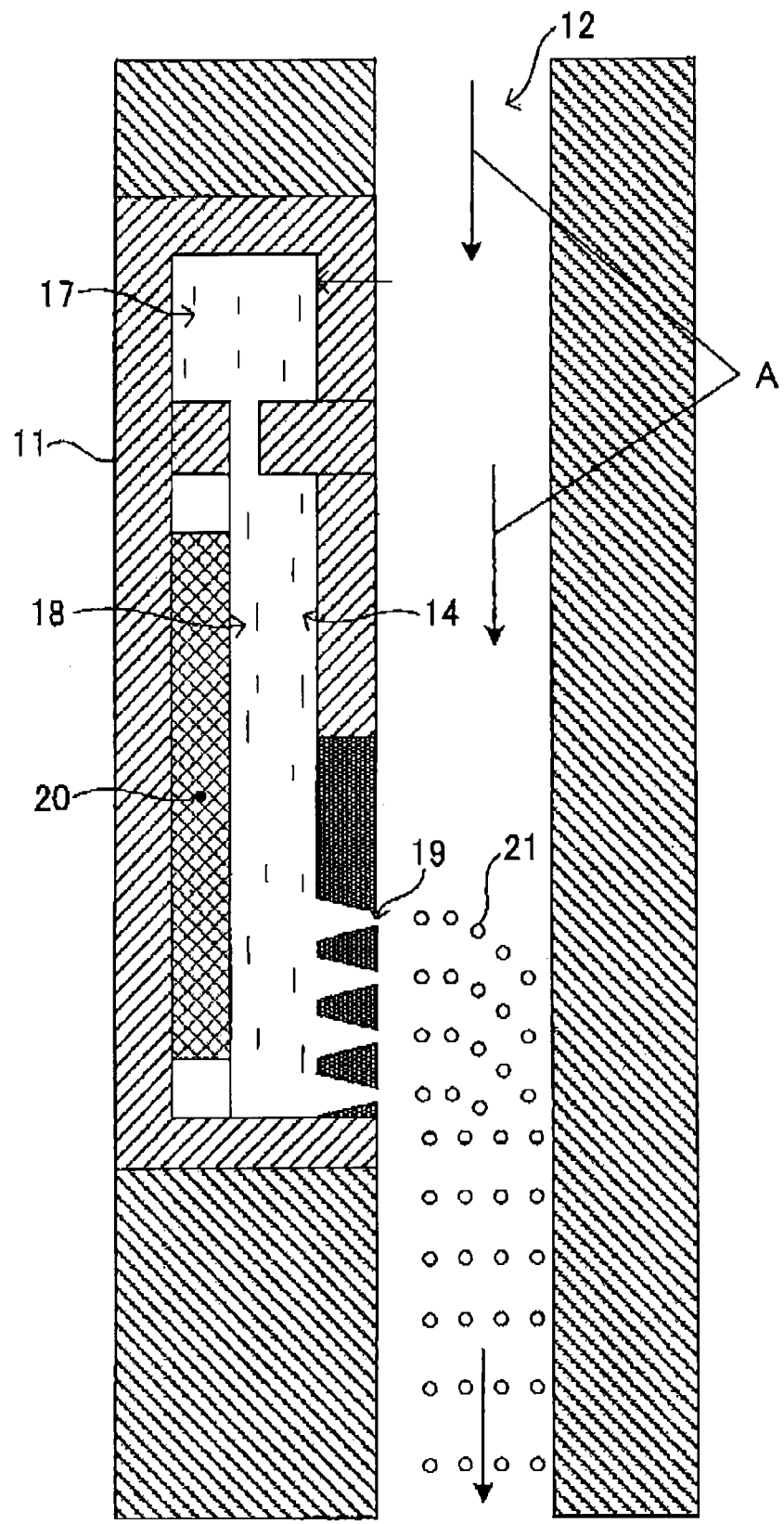
FIG. 31 is a cross-sectional diagram illustrating still another configuration of a liquid droplet ejection head in a liquid droplet forming unit.
Figure 32A:
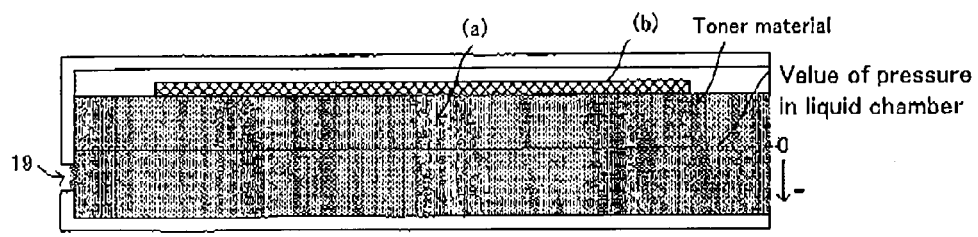
FIGS. 32A to 32E are each cross-sectional diagram illustrating the appearance of liquid droplet behavior in a toner liquid droplet head in a conventional toner production apparatus.
Figure 32B:
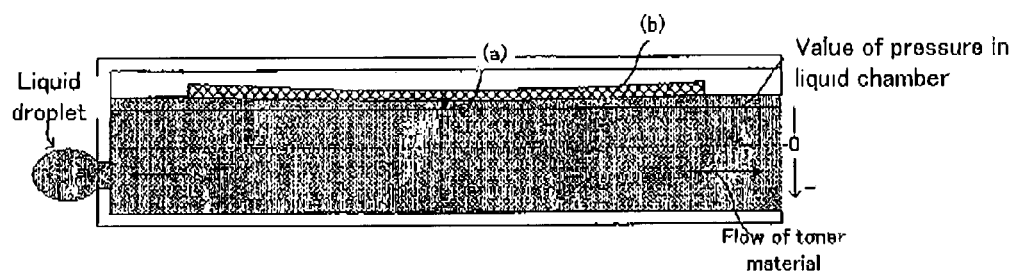
Figure 32C:
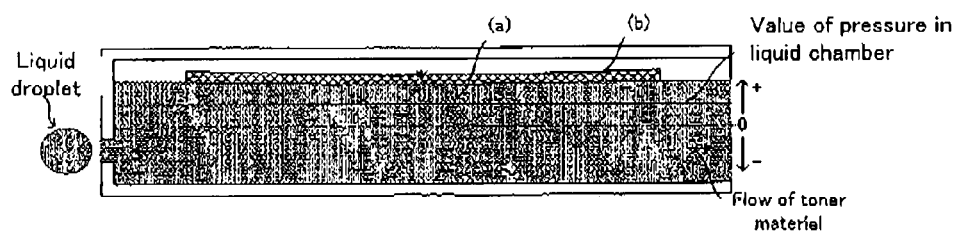
Figure 32D:
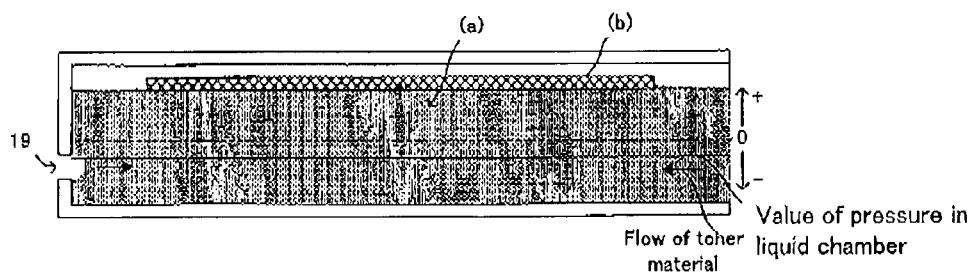
Figure 32E:
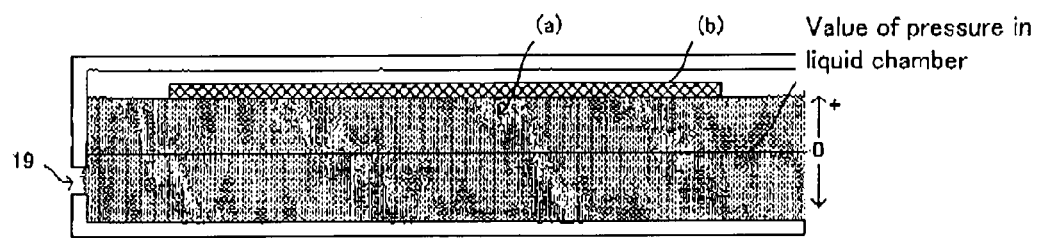

FIG. 31 is a diagram illustrating still yet another example of a liquid droplet ejection head. The liquid droplet ejection head of Example 26 illustrated in the figure is an example where an air stream path 12, through which an air generated by an air stream generation unit described in Example 15 is passed, has a different configuration. The direction of the air stream path 12, i.e., the direction to which air stream is passed, in Example 15 is the same as the direction to which the liquid droplets are ejected, however, the direction of the air stream path 12 in Example 26 is a direction substantially orthogonal to the direction to which liquid droplets are ejected, and is the same direction as the air stream flows in the vapor phase I a chamber 31 in a dry-collection unit 30. Note that the air flow rate was 20 m/s at a region near the toner ejection holes; the number average particle diameter was 4.8 µm, and D4/DN was 1.09.

Example 27

Whereas the air stream in Example 26, illustrated in FIG. 31 was an air stream generated by pressure application by an air stream generating unit, the air stream in Example 27 was an air stream generated by suction forth, using an sucking unit disposed, for example, on the side of the dry collection unit 30. As for the configurations other than described above, Example 27 has to the same as in Example 26. Note that the air flow rate was 16 m/s at a region near the toner ejection holes; the number average particle diameter was 4.8 µm, and D4/DN was 1.09.

REFERENCE SIGNS LIST

1: toner production apparatus
10: liquid droplet ejection apparatus (Liquid droplet forming unit)
11: liquid droplet ejection head
12: air stream path
12-1: first air flow path
12-2: second air flow path
13: material housing container
14: toner composition liquid
15: liquid circulation pump
16: liquid feed path
17: liquid common feed path
18: liquid column resonance-generating liquid chamber
19: ejection hole
20: vibration generating unit
21: liquid droplets
22: liquid return pipe
30: dry-collection unit
31: chamber
32: toner collection part
33: downward air stream
34: toner collection tube
35: toner reservoir part
100: inkjet recording apparatus
104: recording head

The invention claimed is:

1. A liquid droplet ejecting method, the method comprising:

applying a vibration to a liquid in a liquid column resonance-generating liquid chamber, in which an ejection hole is formed, to form a standing wave through liquid column resonance;
wherein the vibration applied to the liquid has a frequency f satisfying Equation (2):

$$N \times c/(4L) \leq f \leq N \times c/(4Le) \tag{2};$$

L represents a length of the liquid column resonance-generating liquid chamber in a longitudinal direction thereof;
Le represents a distance between an end of the liquid column resonance-generating liquid chamber on a liquid feed path side and a center part of the ejection hole nearest to the end of the liquid column resonance-generating liquid chamber;
c represents a sound speed of the liquid; and
N is a natural number;
and wherein the Le and L satisfy Le/L>0.6; and ejecting the liquid from the ejection hole, which is formed in a region corresponding to an antinode of the standing wave, to form liquid droplets.

2. The liquid droplet ejecting method according to claim 1, wherein the ejection hole is formed in plurality with respect to at least one region corresponding to the antinode.

3. The liquid droplet ejecting method according to claim 1, wherein the ejection hole is formed in plurality for each of the liquid column resonance-generating liquid chambers.

4. The liquid droplet ejecting method according to claim 1, wherein at least part of both ends of the liquid column resonance-generating liquid chamber in a longitudinal direction thereof is provided with a reflection wall surface.

5. The liquid droplet ejecting method according to claim 1, wherein the vibration is a high frequency vibration having a frequency of 300 kHz or higher.

6. The liquid droplet ejecting method according to claim 1, wherein a drive signal from a vibration generating unit excites the vibration generating unit by pulse groups which is primarily composed of a liquid column resonance frequency depending on the length of the liquid column resonance-generating liquid chamber in the longitudinal direction thereof.

7. The liquid droplet ejecting method according to claim 6, wherein:
the pulse groups are divided into three pulse parts of a preparatory pressure generating pulse part, a drive main pulse part, and a residual vibration undoing pulse part;
the preparatory pressure generating pulse part is present at a leading edge of the pulse groups and excites the liquid in the liquid column resonance-generating liquid chamber to allow the liquid to remain in a state of not flying the liquid droplets;
the drive main pulse part is an application pulse which follows the preparatory generating pulse part and ejects the liquid from the ejection hole; and
the residual vibration undoing pulse part is an application pulse immediately after the drive main pulse part and includes a frequency component having a phase opposite to that of a main frequency component of the drive main pulse part.

8. A liquid droplet ejection apparatus comprising:
a liquid column resonance-generating liquid chamber in a part of which an ejection hole is formed; and
a vibration generating unit configured to apply a vibration to a liquid,
wherein the vibration is applied to the liquid in the liquid column resonance-generating liquid chamber by the vibration generating unit to form a standing wave through liquid column resonance, and the liquid is ejected from the ejection hole corresponding to an antinode of the standing wave;
wherein the vibration applied to the liquid has a frequency f satisfying Equation (2):

$$N \times c/(4L) \leq f \leq N \times c/(4Le) \qquad (2);$$

L represents a length of the liquid column resonance-generating liquid chamber in a longitudinal direction thereof;
Le represents a distance between an end of the liquid column resonance-generating liquid chamber on a liquid feed path side and a center part of the ejection hole nearest to the end of the liquid column resonance-generating liquid chamber;
c represents a sound speed of the liquid; and
N is a natural number;
and wherein the Le and L satisfy Le/L>0.6.

9. An inkjet recording apparatus, which ejects a liquid from at least one ejection hole to form the liquid into liquid droplet by the method of claim 1.

10. The liquid droplet ejecting method of claim 1, which is suitable for ejecting a liquid from at least one ejection hole to form the liquid into liquid droplets.

11. The liquid droplet ejection apparatus of claim 8, which is suitable for ejecting a liquid from at least one ejection hole to form the liquid into liquid droplets.

12. An inkjet recording apparatus, comprising the liquid droplet apparatus of claim 8.

* * * * *